United States Patent [19]

Ryan

[11] 4,156,906

[45] May 29, 1979

[54] BUFFER STORE INCLUDING CONTROL APPARATUS WHICH FACILITATES THE CONCURRENT PROCESSING OF A PLURALITY OF COMMANDS

[75] Inventor: Charles P. Ryan, Phoenix, Ariz.

[73] Assignee: Honeywell Information Systems Inc., Waltham, Mass.

[21] Appl. No.: 853,982

[22] Filed: Nov. 22, 1977

[51] Int. Cl.² .............................................. G06F 13/00
[52] U.S. Cl. ..................................................... 364/200
[58] Field of Search ......................... 364/200 MS File

[56] References Cited

U.S. PATENT DOCUMENTS

| | | | |
|---|---|---|---|
| 3,588,839 | 6/1971 | Belady et al. | 364/200 |
| 3,611,315 | 10/1971 | Muano et al. | 364/200 |
| 3,693,165 | 9/1972 | Reiley et al. | 364/200 |
| 3,699,533 | 10/1972 | Hunter | 364/200 |
| 3,786,427 | 1/1974 | Schmidt et al. | 364/200 |

*Primary Examiner*—Harvey E. Springborn
*Attorney, Agent, or Firm*—Faith F. Driscoll; Nicholas Prasinos; Ronald T. Reiling

[57] ABSTRACT

A data processing system comprises a data processing unit coupled to a cache unit which couples to a main store. The cache unit includes a store having a plurality of word locations arranged into a number of groups or sets of blocks of word locations, a data directory for storing addresses within a plurality of locations corresponding in number to the number of groups and a control directory including a plurality of multibit locations corresponding in number to the number of groups of blocks. The cache unit further includes an input command buffer for storing commands received by the data processing unit and control logic circuits. The control logic circuits include decoder circuits operative to set to a predetermined state the contents of a predetermined bit of the control directory multibit locations identified by the memory command when the data directory indicates that the information does not reside in the cache unit store. The control logic circuits include circuits for forwarding the command to main store. In response to each subsequent read command generated by the data processing unit, the control and data directories are accessed and upon detecting that the predetermined bit of a control directory multibit location associated with the block specified by such command, the control logic circuits generate signals to inhibit the processing unit from performing further operations and the cache unit from transferring a duplicate command to the main store.

31 Claims, 29 Drawing Figures

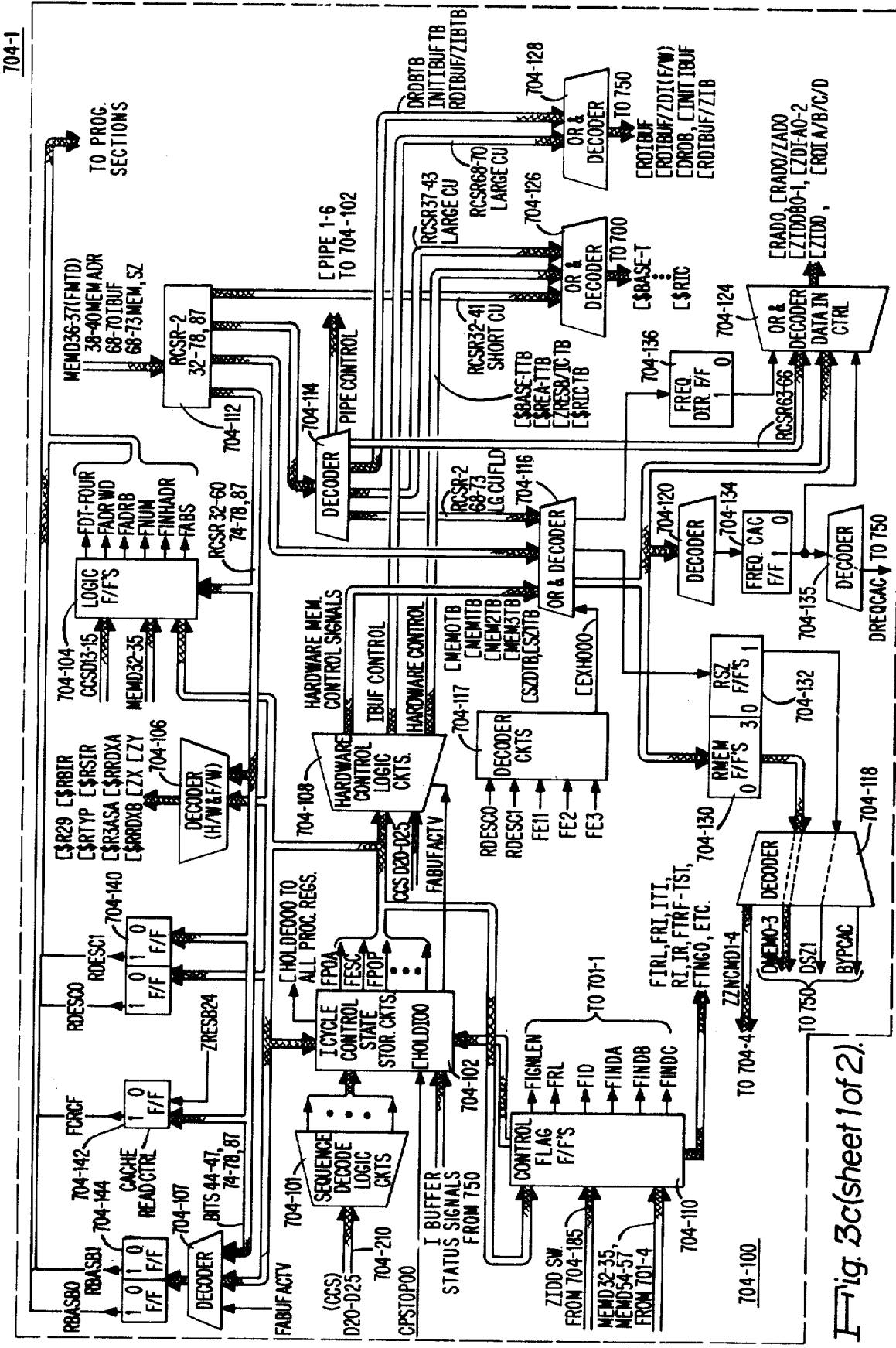
Fig. 3c (sheet 1 of 2).

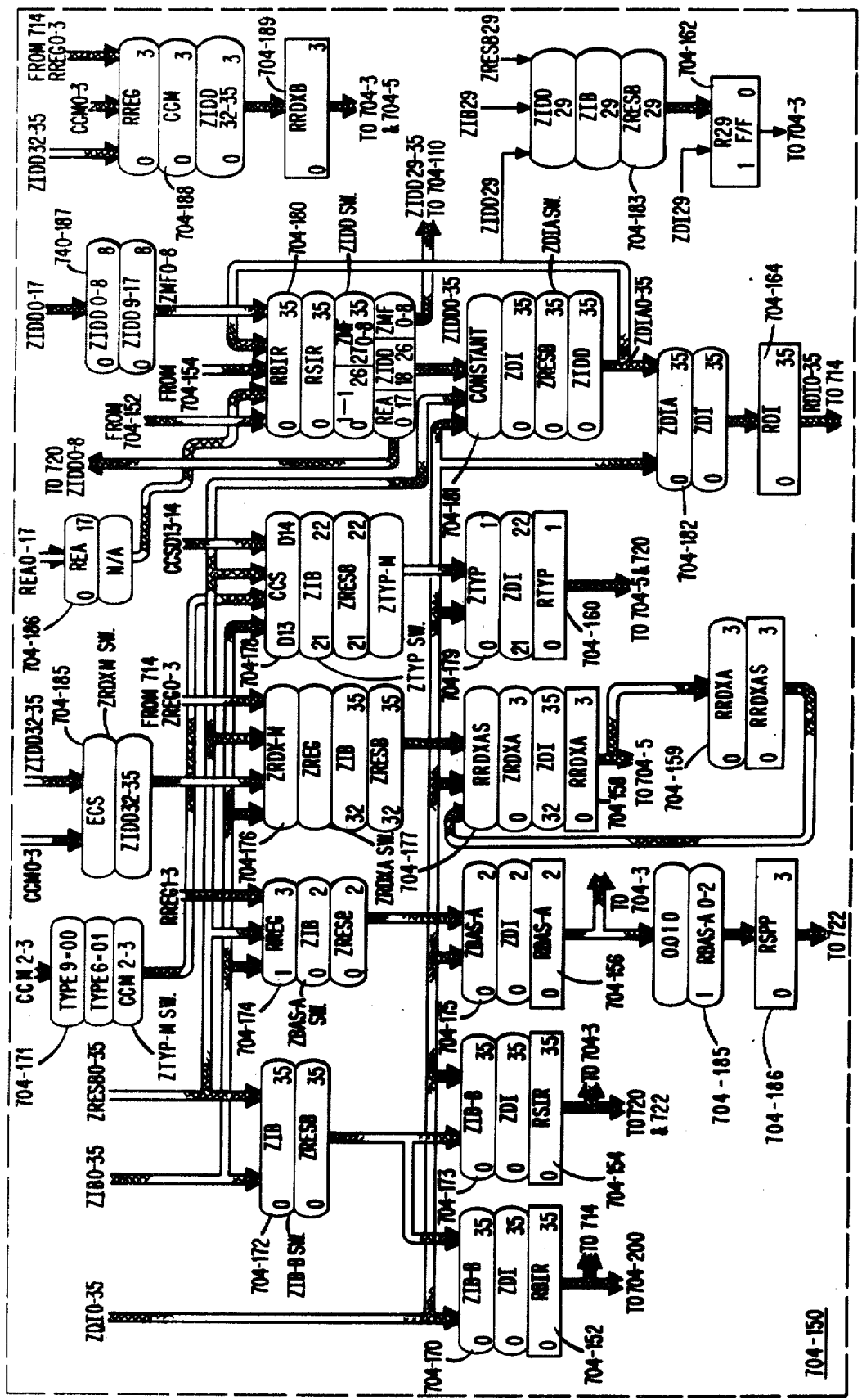
Fig. 3c (sheet 2 of 2).

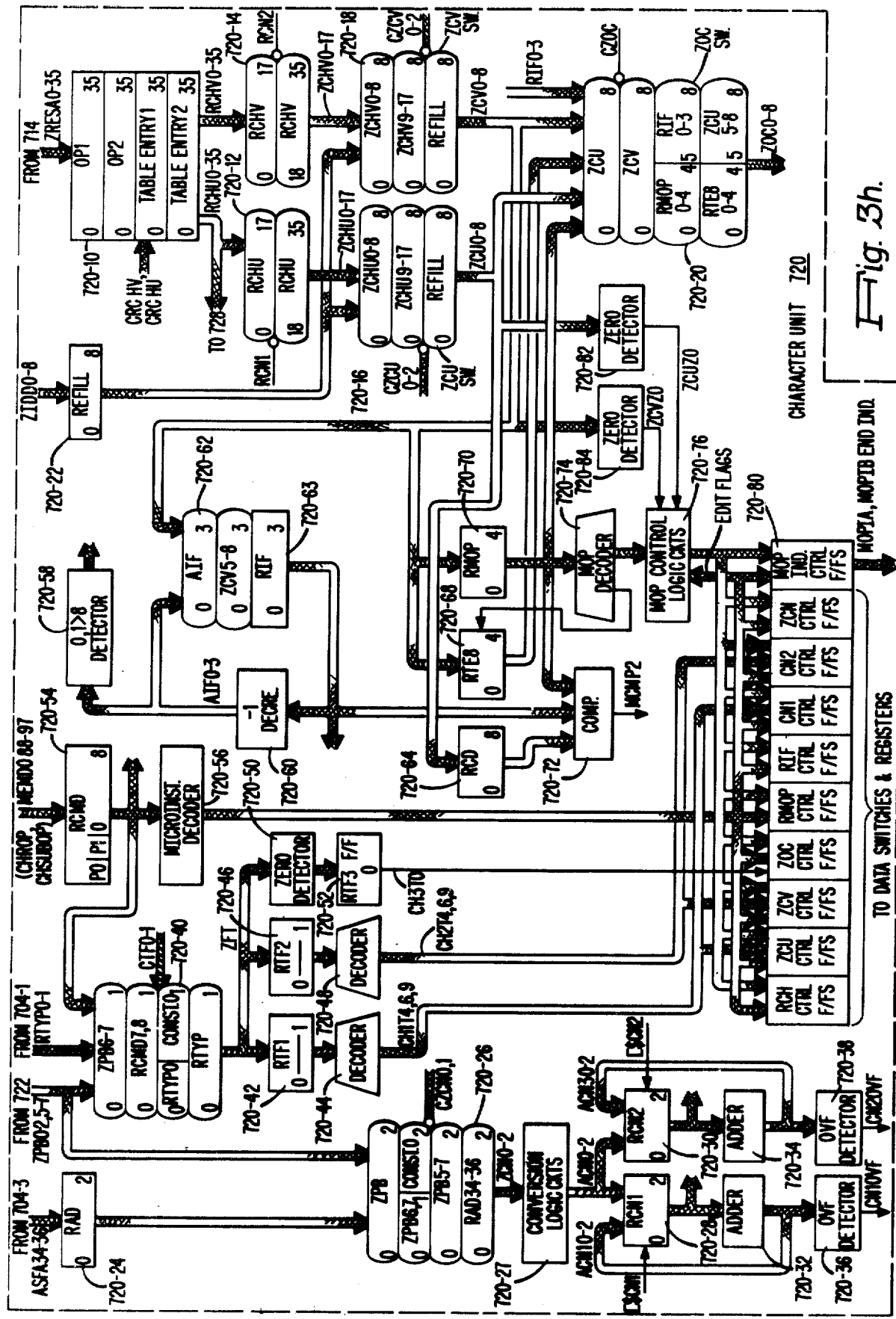

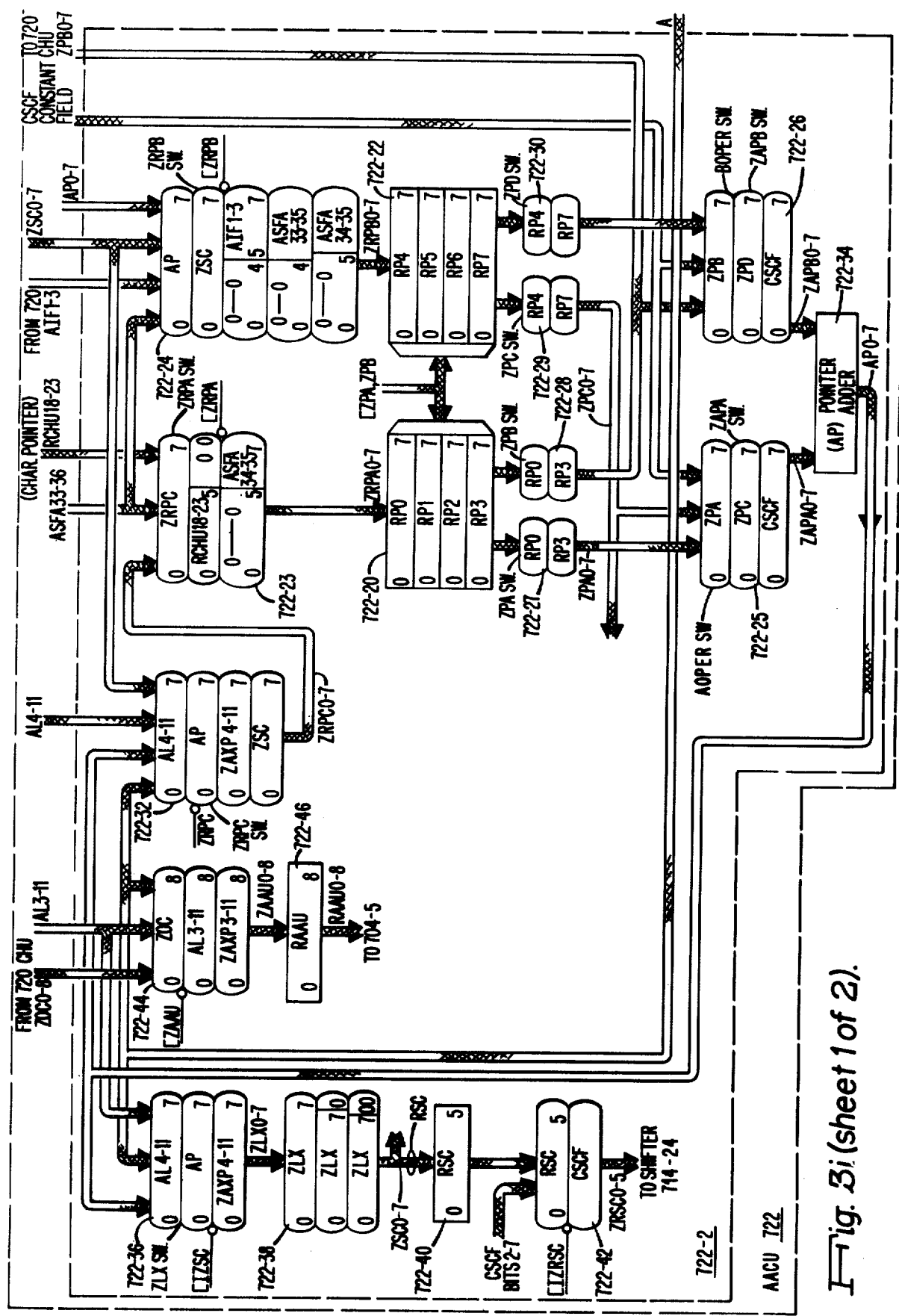
Fig. 3i (sheet 1 of 2).

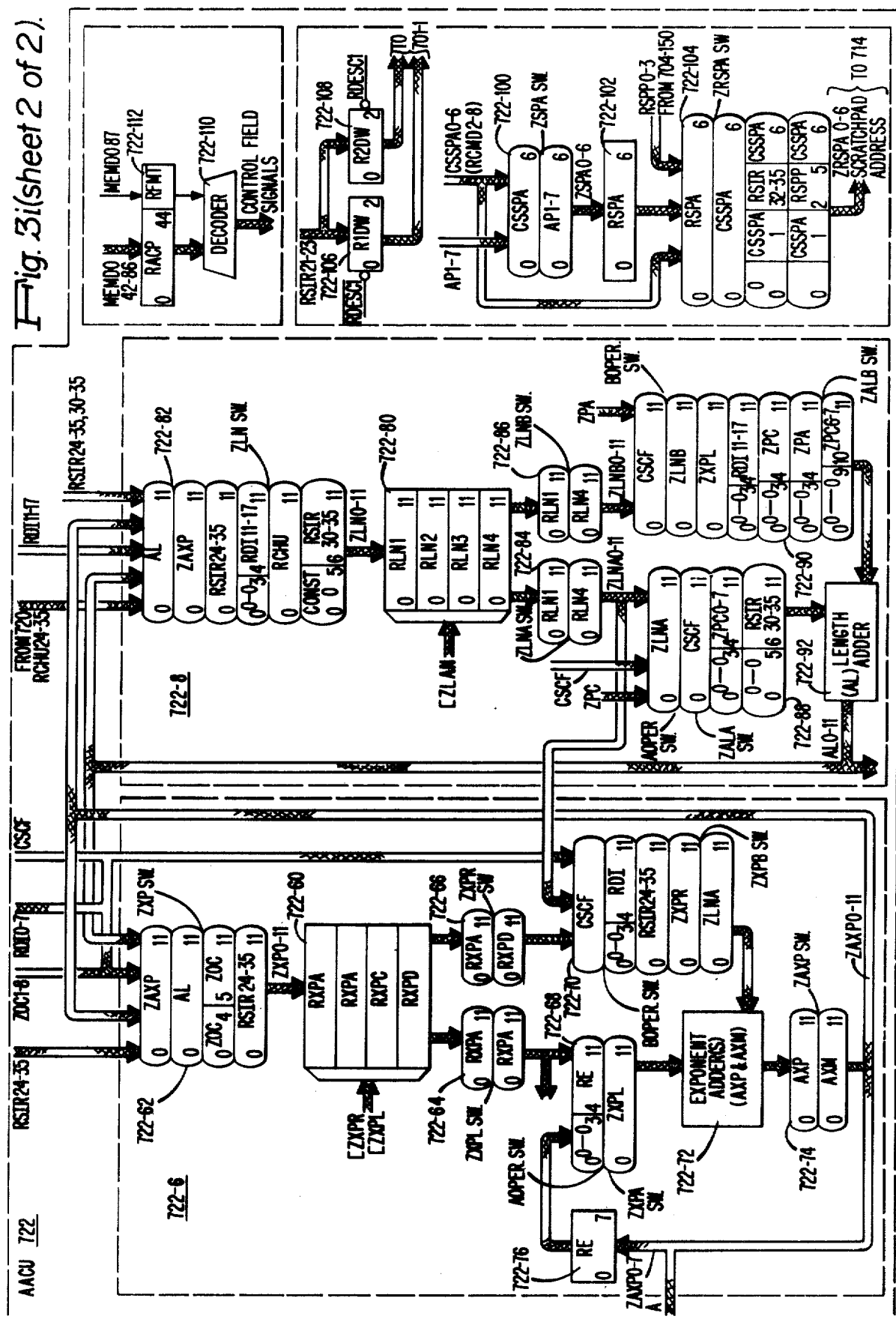
Fig. 3i (sheet 2 of 2).

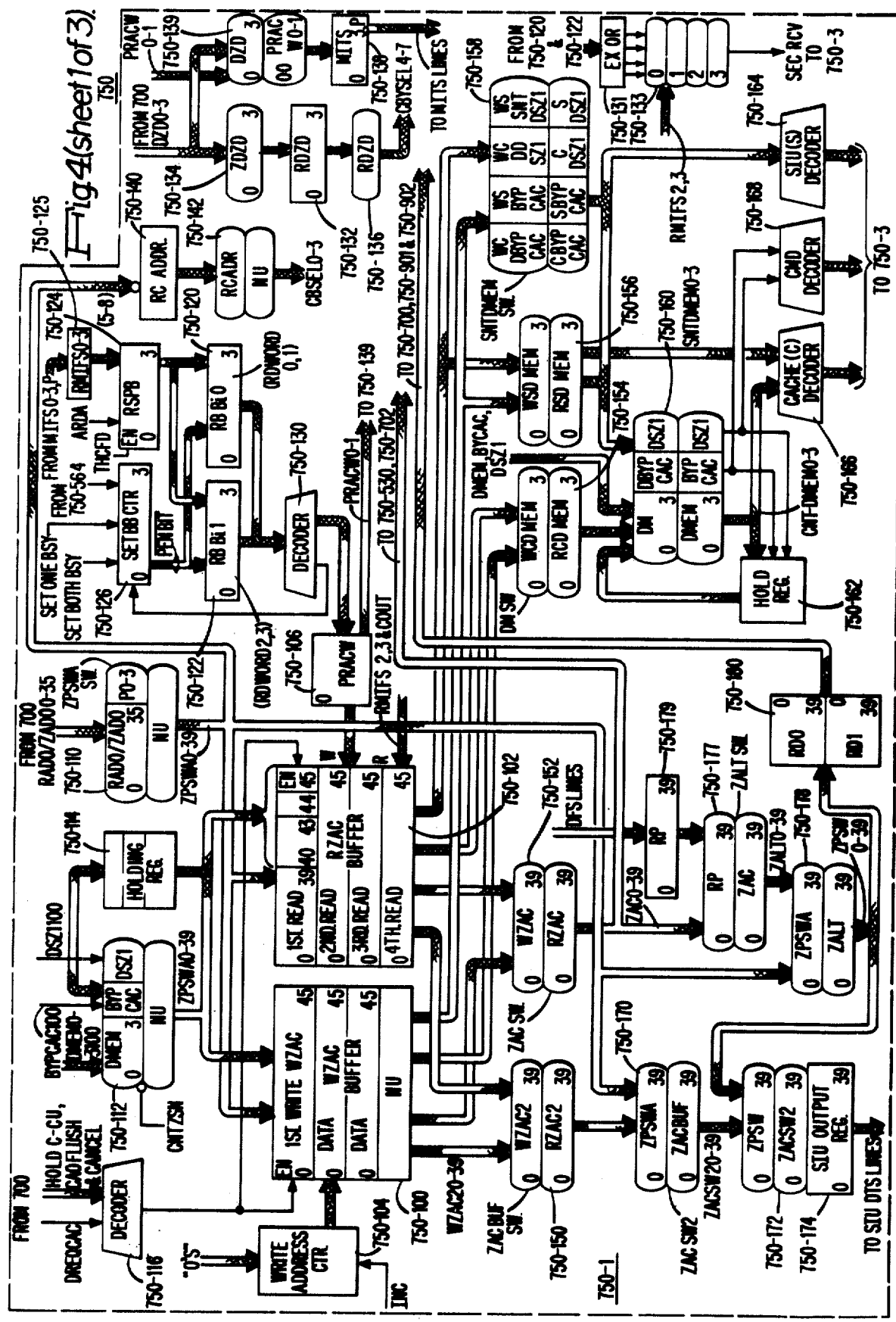

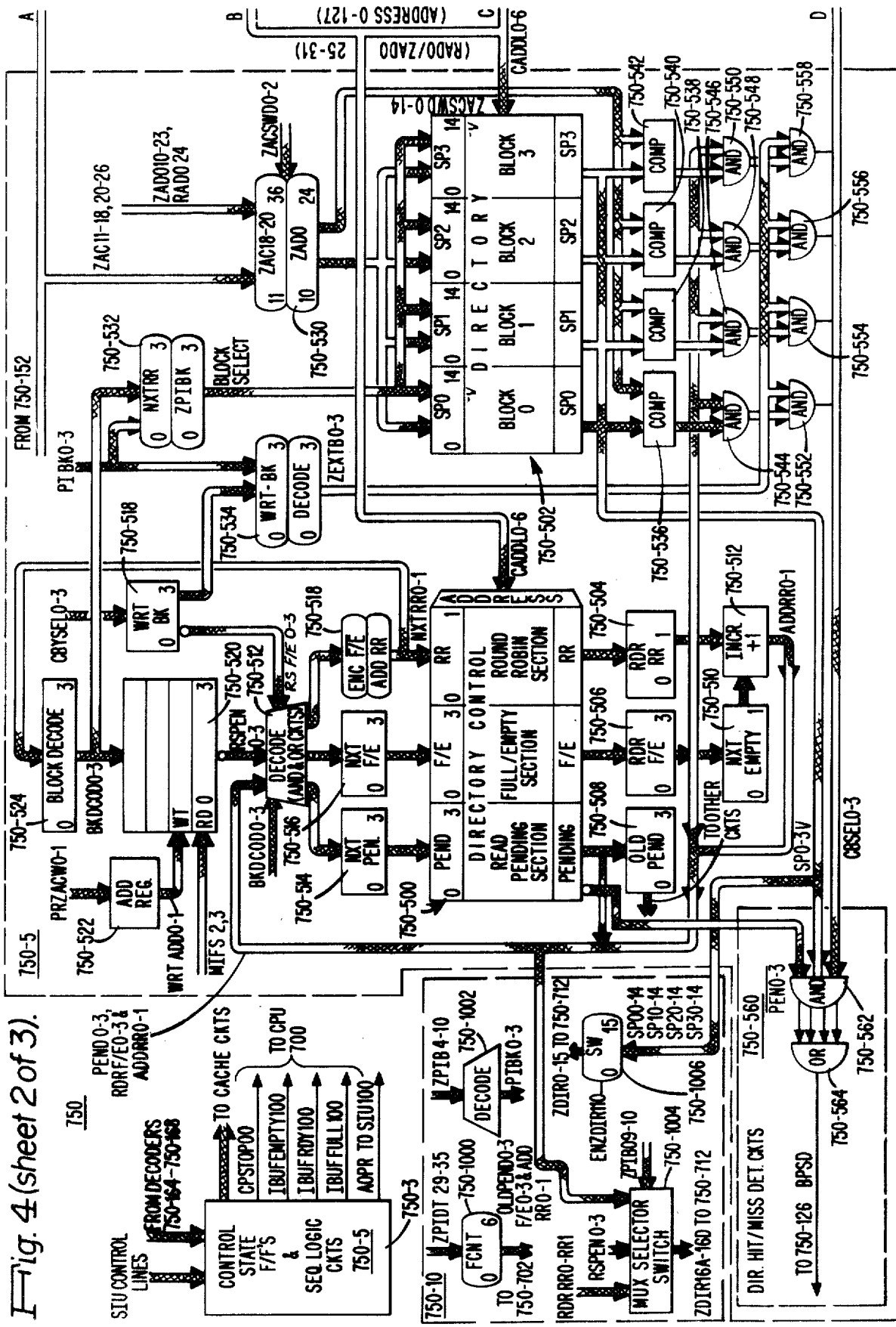
Fig. 4 (sheet 2 of 3).

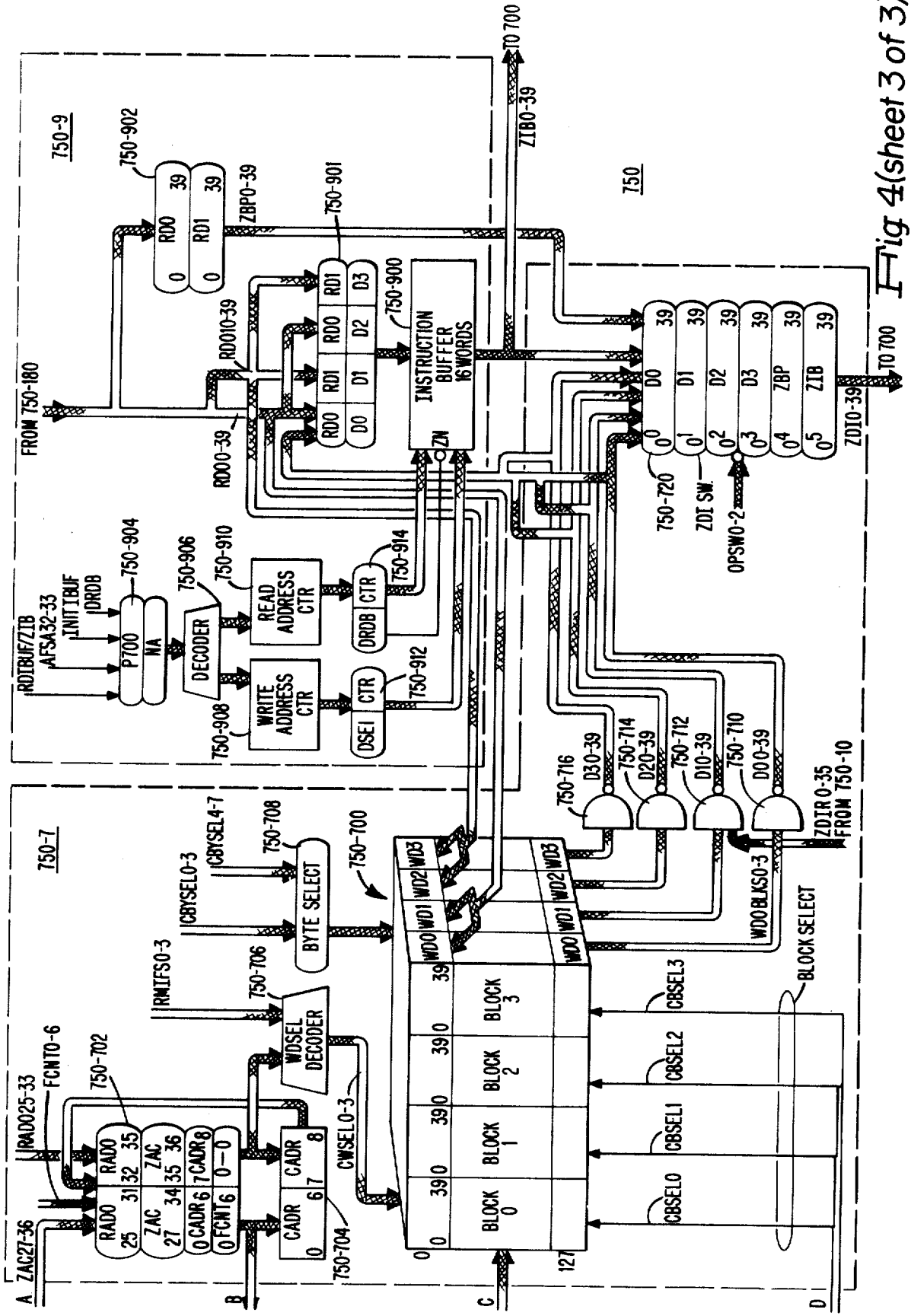
Fig 4(sheet 3 of 3).

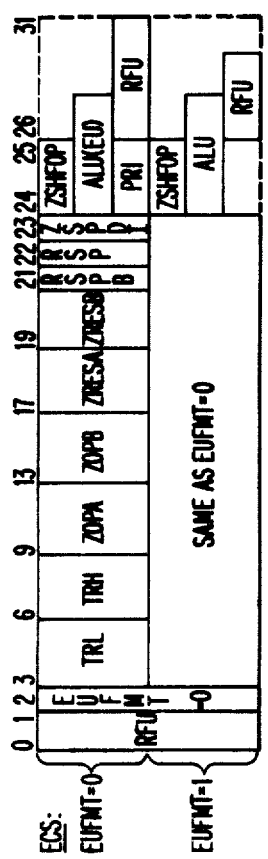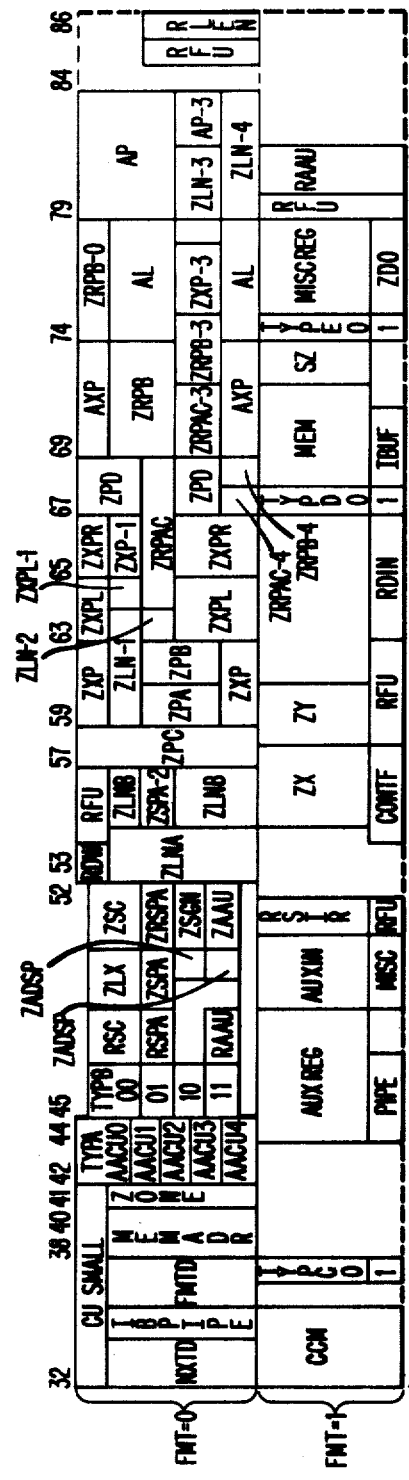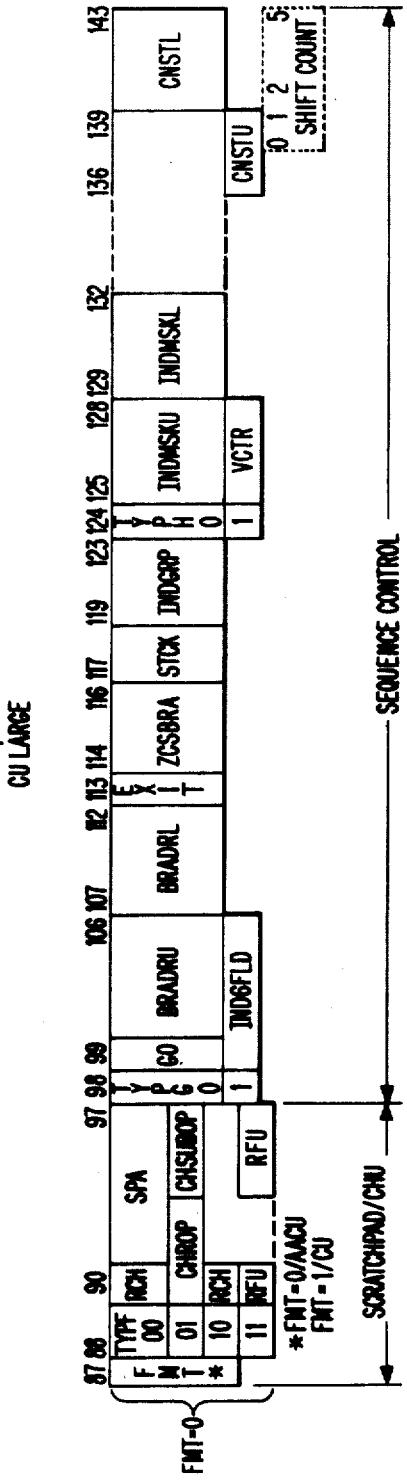
Fig. 6b.

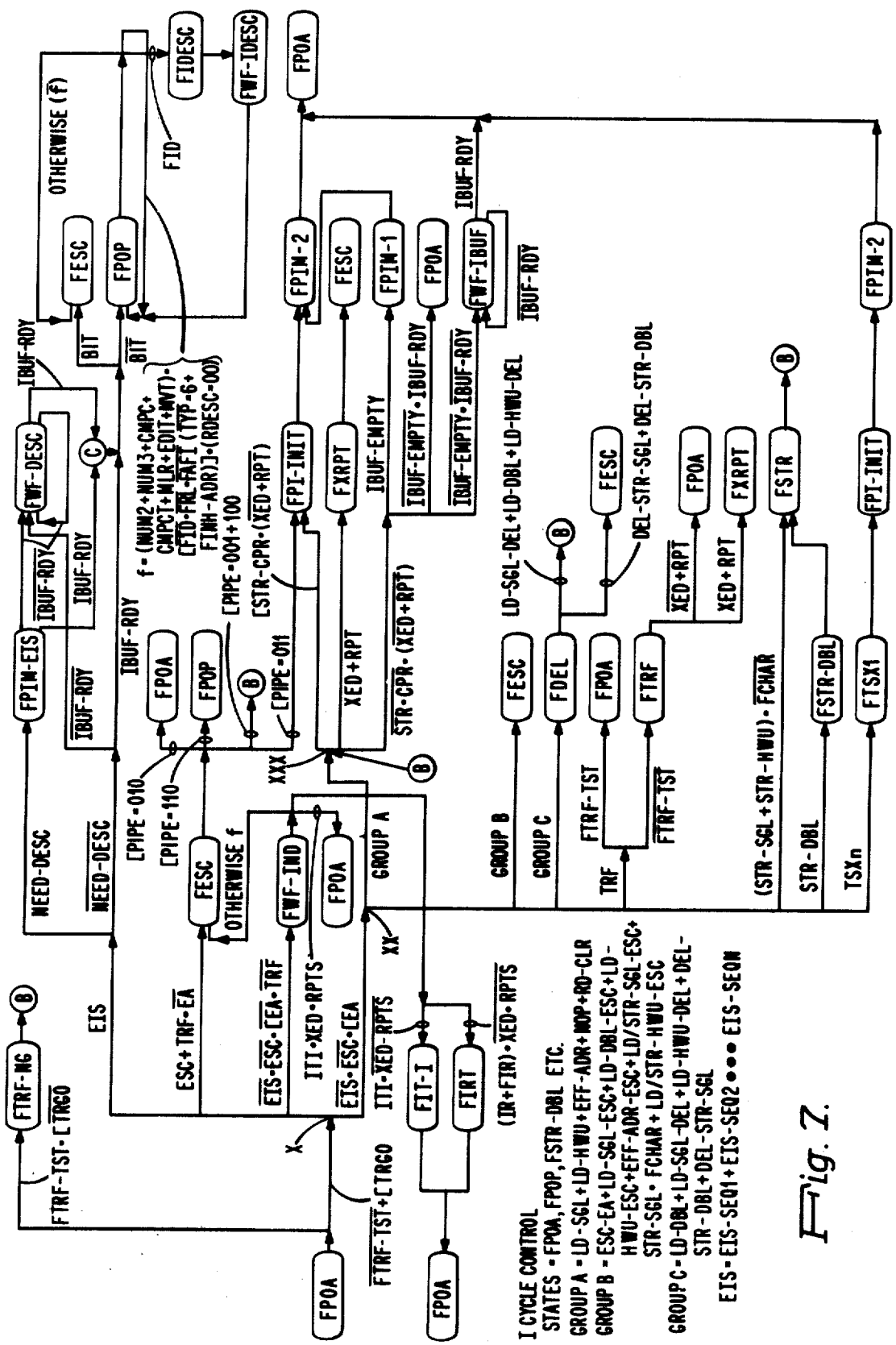
Fig. Z.

SINGLE WORD INSTRUCTION FORMAT

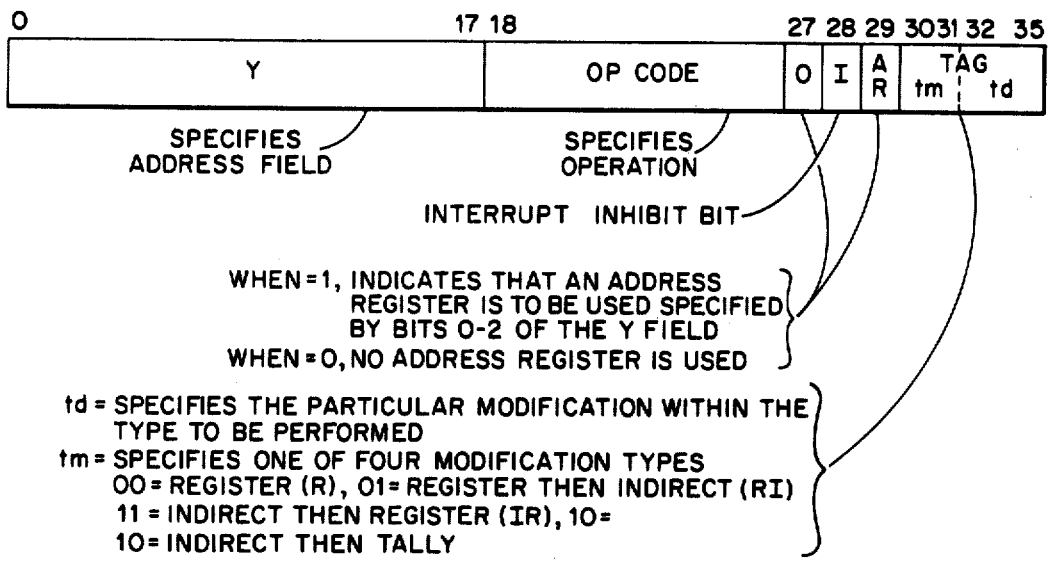

WHEN = 1, INDICATES THAT AN ADDRESS
REGISTER IS TO BE USED SPECIFIED
BY BITS 0-2 OF THE Y FIELD
WHEN = 0, NO ADDRESS REGISTER IS USED td = SPECIFIES THE PARTICULAR MODIFICATION WITHIN THE TYPE TO BE PERFORMED
tm = SPECIFIES ONE OF FOUR MODIFICATION TYPES
00 = REGISTER (R), 01 = REGISTER THEN INDIRECT (RI)
11 = INDIRECT THEN REGISTER (IR), 10 =
10 = INDIRECT THEN TALLY

*Fig. 9a.*

MODIFICATION FIELD FORMAT

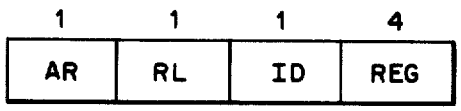

AR – ADDRESS REGISTER SPECIFIER
  0 – NO ADDRESS REGISTER USED
  1 – BITS 0-2 OF THE OPERAND DESCRIPTOR ADDRESS FIELD Y SPECIFY THE ADDRESS REGISTER TO BE USED IN COMPUTING THE EFFECTIVE ADDRESS FOR THE OPERAND

RL – REGISTER OR LENGTH
  0 – OPERAND LENGTH IS SPECIFIED IN THE N FIELD OF THE OPERAND DESCRIPTOR
  1 – LENGTH OF OPERAND IS CONTAINED IN A REGISTER WHICH IS SPECIFIED BY A CODE IN THE N-FIELD (BITS 32-35) OF THE OPERAND DESCRIPTOR IN THE FORMAT OF REG

ID – INDIRECT OPERAND DESCRIPTOR
  0 – THE OPERAND DESCRIPTOR FOLLOWS THE INSTRUCTION WORD IN ITS SEQUENTIAL STORE LOCATION
  1 – THE OPERAND DESCRIPTOR LOCATION CONTAINS AN INDIRECT WORD WHICH POINTS TO THE OPERAND DESCRIPTOR
  ONLY ONE LEVEL OF INDIRECTION IS ALLOWED

REG – ADDRESS MODIFICATION REGISTER SELECTION FOR R TYPE MODIFICATION OF THE OPERAND DESCRIPTOR ADDRESS FIELD

*Fig. 9c.*

MULTIWORD INSTRUCTION FORMAT

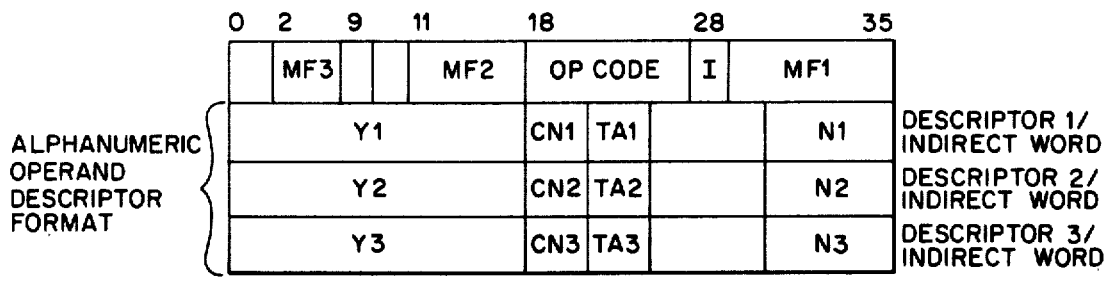

FIELDS MF1, MF2 & MF3 DESCRIBE THE ADDRESS MODIFICATIONS TO BE PERFORMED FOR DESCRIPTORS 1, 2 & 3 RESPECTIVELY

OP CODE - SPECIFIES THE OPERATION TO BE PERFORMED

I = THE INTERRUPT INHIBIT BIT

Y1, Y2 & Y3 = ORIGINAL DATA WORD ADDRESSES FOR DESCRIPTORS 1, 2 & 3

CN1, CN2 & CN3 = CODES THAT DEFINE THE ORIGINAL CHARACTER NUMBERS WITHIN DATA WORDS REFERENCED BY THE ORIGINAL ADDRESSES Y1, Y2 & Y3

TA1, TA2 & TA3 = CODES THAT DEFINE WHICH TYPES OF ALPHANUMERIC CHARACTERS ARE IN DATA FOR DESCRIPTORS 1, 2 & 3 RESPECTIVELY

| CODE | DATA TYPE |
|------|-----------|
| 00 | 9 BIT |
| 01 | 6 BIT |
| 10 | 4 BIT |
| 11 | ILLEGAL |

N1, N2 & N3 = EITHER THE NUMBER OF CHARACTERS OR BITS IN THE DATA STRING OR 4 BIT CODES (32-35) WHICH SPECIFY REGISTERS THAT CONTAIN THE NUMBER OF CHARACTERS OR BITS

*Fig. 9b.*

INDIRECT WORD FORMAT

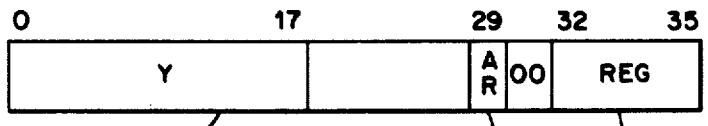

*Fig. 9d.*

BUFFER STORE INCLUDING CONTROL APPARATUS WHICH FACILITATES THE CONCURRENT PROCESSING OF A PLURALITY OF COMMANDS

RELATED PATENT APPLICATIONS

1. "Data Processing System Programmable Pre-Read Capability" invented by John E. Wilhite, William A. Shelly and Charles P. Ryan, Ser. No. 853,944, filed on Nov. 22, 1977 and assigned to the same assignee as named herein.

BACKGROUND OF THE INVENTION

1. Field of Use

The present invention relates to data processing systems having memory systems which include a high speed buffer store or cache unit.

2. Prior Art

It is well known that many data processing systems each include a main memory or main store and high speed low capacity buffer store or cache, each of which is positioned between the system's data processing unit and its main memory. In such systems, an associative memory normally is used to store the block addresses for indicating which blocks are stored or reside in the cache or buffer store. When a fetch or read request occurs, the associative memory is interrogated to determine whether the block containing the addressed word resides in cache. If not, the word together with associated words of a block are fetched from main store and read into cache or buffer store.

Generally recognized are the cost advantages of having the cache or buffer store contain a limited number of blocks to minimize the size of associative memory. However, others have recognized certain disadvantages resulting from such storage limitations in the case of block transfers. In overcoming such disadvantages, one high speed memory system provides a high degree of overlap or concurrency wherein additional accesses to the memory system may be executed after a block transfer has been initiated. U.S. Pat. No. 3,588,829 is an example of one such system.

In providing such overlap, it is possible to receive more than one request specifying fetching data from the same block. To avoid the generation of multiple commands to main memory or backing store, additional comparison circuits or associative memory circuits together with a multiplicity of control bits are included to detect conflicting requests. During additional cycles, comparisons are made and the results are stored to be used to control the fetching of commands. Such arrangements have found to result in increased cost and complexity. Moreover, such arrangements are unable to process a variety of different types of commands which give rise to increases of overlap.

Accordingly, it is a primary object of the present invention to provide a buffer store or cache arrangement which permits a high degree of overlap with minimal increases in cost and complexity.

It is a further object of the present invention to provide a low cost buffer store or cache capable of executing a variety of different types of memory commands without requiring the issuance of duplicate commands.

SUMMARY OF THE INVENTION

The above objects of the present invention are achieved in a preferred embodiment of the memory system of the present invention. The memory system includes a cache unit having a plurality of word locations arranged into a number of groups of blocks of word locations, a data directory including a plurality of locations corresponding in number to the number of groups and a control directory including a plurality of multibit locations corresponding in number to the number of blocks. The system further includes an input buffer for storing a plurality of memory commands, generated by a data processing unit and control logic circuits. The control logic circuits include decoder circuit means coupled to the buffer and to the control directory.

The decoder circuit means is operative to selectively set one of bit locations identified by the memory command to a predetermined state. This occurs when the command calls for an operation which cannot be completed immediately but which must remain outstanding for a certain minimum length of time. During the processing of subsequently received commands, the contents of the control directory are accessed. When a next memory command is received which specifies information requested by previous commands and the contents of control directory bit location indicate whether the operation which has been initiated is still pending or outstanding. When the contents indicate that the operation is outstanding, the control circuits signal the processor to stop its operation in the cases where the information requested is needed immediately. The control circuits further include control sequencing circuits. When all of the information required to complete the pending operation has been stored in the cache unit, the control sequencing circuits automatically reexecute such next command and enable processor to continue operation.

By referencing the contents of the control directory during the normal command processing in parallel with the data directory, the system is able to detect the presence of conflicting commands and prevent the issuance of duplicate commands. Additionally, the arrangement permits the processing of certain commands generated by the processor which do not necessitate stopping processor operation. A system which includes such a capability is the subject of the aforementioned patent application "Data Processing System with Programmable Preread Capability" referenced as a related patent application.

Further, the arrangement of the present invention provides status as to the completion of those operations being processed.

BRIEF DESCRIPTION OF THE DRAWINGS

FIGS. 3a through 3i show in greater detail the different blocks of FIG. 2.

FIG. 4 shows in greater detail the cache unit 750 of FIG. 2.

FIG. 6b illustrates the format of the microinstruction words of the execution control store of FIGS. 2 and 3.

FIG. 7 is a state diagram used in describing the hardware sequencing of the apparatus of the present invention.

FIGS. 9a through 9d illustrate the formats of certain types of instructions used in describing the operation of the present invention.

DESCRIPTION OF THE PREFERRED EMBODIMENT GENERAL DESCRIPTION

Figure 1:
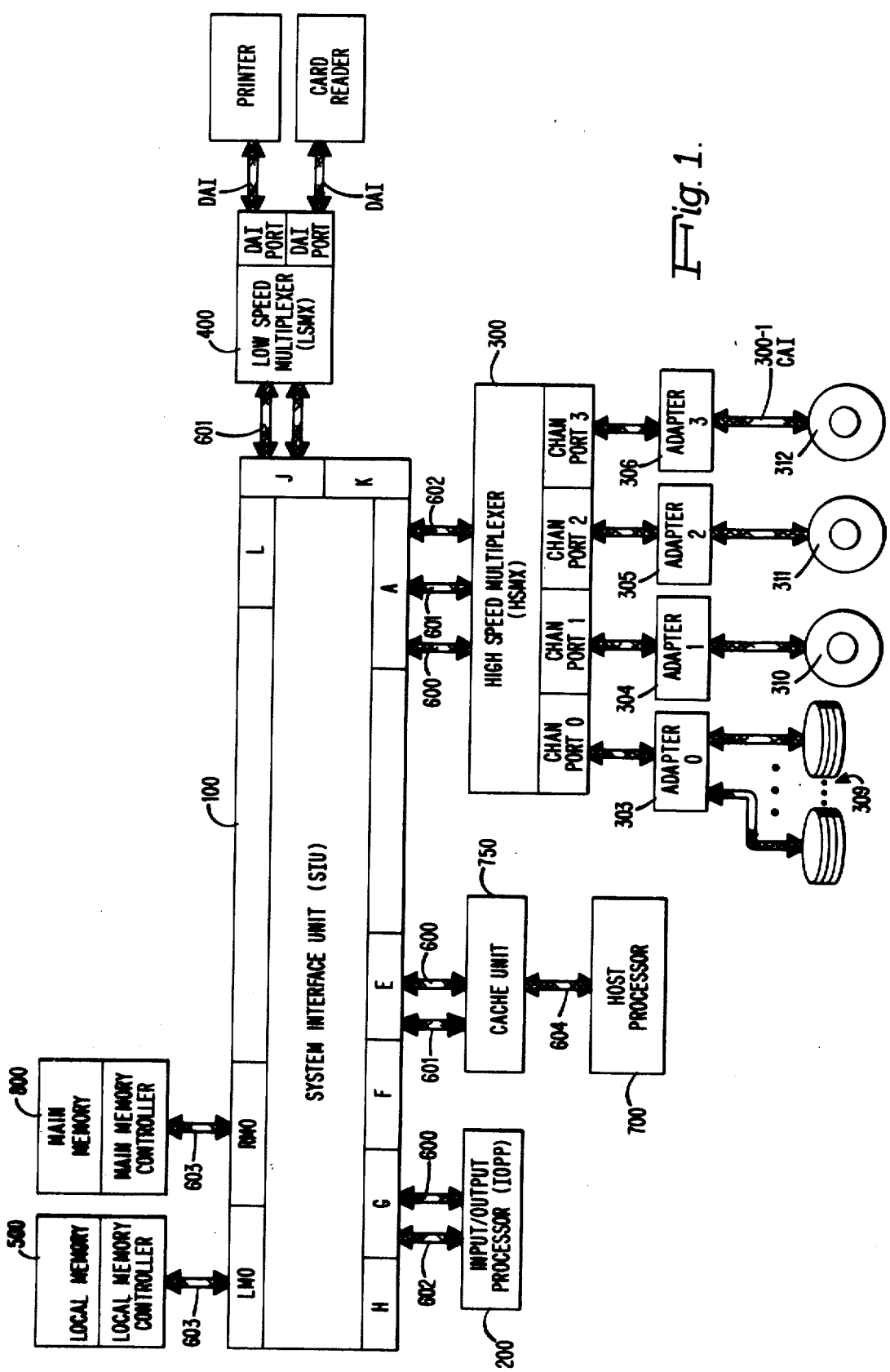
FIG. 1 illustrates in block form a system employing the principles of the present invention.

As seen from FIG. 1, the system which incorporates the principles of the present invention includes at least 1 input/output processor (IOPP) 200, a system interface unit (SIU) 100, a high-speed multiplexer (HSMX) 300, a low-speed multiplexer (LSMX) 400, a host processor 700, a cache memory 750, at least one memory module corresponding to a local memory module 500, and at least one memory module corresponding to a remote memory module 800. Different ones of these modules connect to one of a number of ports of the system interface unit 100 through a plurality of lines of different types of interfaces 600 through 603. More specifically, the input/output processor 200, the cache memory 750, and the high-speed multiplexer 300 connect to ports G, E and A, respectively, while the low-speed multiplexer 400, local memory module 500, and main memory module 800 connect to ports J, LMO and RMO, respectively. The host processor 700 connects to the cache memory 750.

The input/output system of FIG. 1 can be viewed as including a number of "active modules", "passive modules" and "memory modules". The IOP processor 200, host processor 700 and high-speed multiplexer 300 serve as active modules in that each has the ability to issue commands. The active modules normally connect to ports A through H while the host processor 700 connects to port E through the cache unit 750 via interfaces 604 and 600. A plurality of passive modules are connected to three ports J, K and L. These modules correspond to the low-speed multiplexer 400 and the system interface unit 100 and are units capable of intercepting and executing commands applied to the lines of interface 601 as described herein. The last group of modules constitutes local memory modules, and main memory modules capable of executing two different types of commands applied to the lines of interface 603.

The input/output system of FIG. 1 normally functions as an input/output subsystem responsive to input-/output instructions issued by the host processor 700. Ports E and F include interfaces for enabling connection of either multiplexer or processor modules of FIG. 1. These interfaces are described in greater detail herein.

For the purpose of the present invention, host processor 700 is conventional in design and may take the form of those units described in U.S. Pat. No. 3,413,613. In the preferred embodiment, the input/output processor 200 initiates and terminates channel programs required for the execution of input/output instructions, processes interrupt requests received from the system interface unit 100, and directly controls unit record peripheral devices coupled to low-speed multiplexer 400. The processor 200 connects to port G via the data interface 600 and interrupt interface 602.

The low-speed multiplexer 400, for the purposes of the present invention can be considered conventional in design, provides for attachment of low-speed peripheral devices via peripheral adapters, each of which couples to the lines of a device adapter interface (DAI). The interface and adapter may take the form of those units described in U.S. Pat. No. 3,742,457, which is assigned to the assignee of the present invention. The low-speed devices include card readers, card punches and printers. As seen from FIG. 1, the multiplexer 400 connects to port J via the programmable interface 601.

The high-speed multiplexer 300 directly controls transfers between the groups of disk devices and tape devices 309 through 312, which connect to different ones of the channel adapters 303 to 306. Each of the channel controller adapters 303 through 306 which can connect up to a maximum of 16 devices to a different one of the channel ports 0 through 3 via the interface lines of a channel adapter interface (CAI) 300-1. The high-speed multiplexer 300 connects to port A corresponding to a data interface 600, a programmable interface 601 and an interrupt interface 602.

For the purposes of the present invention, each of the channel controller adapters 302 through 305 may be considered in design and take the form of controller adapters described in the aforementioned U.S. Pat. No. 3,742,457.

System Interfaces

Before describing in detail the processor 700 and cache unit 750, constructed in accordance with principles of the present invention, each of the interfaces 600 through 604 discussed previously will now be described with reference to FIG. 5a through 5e.

Figure 5A:
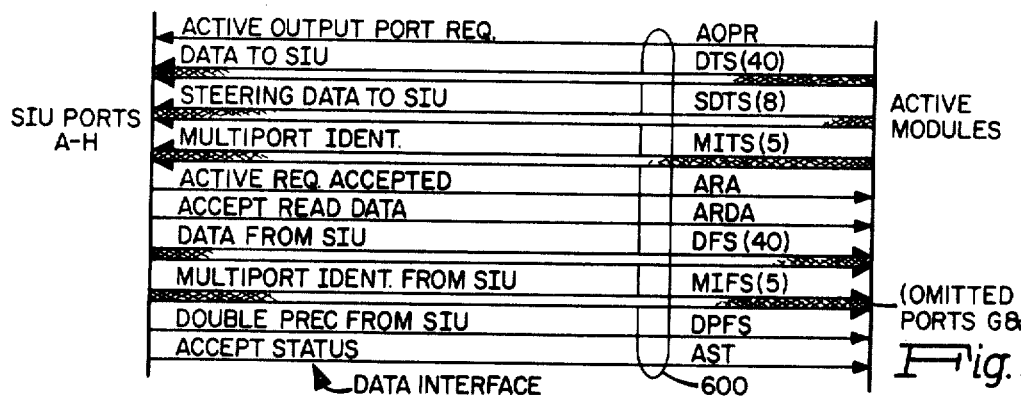
FIGS. 5a through 5e show the lines which comprise different ones of the interfaces of FIG. 1.

Referring first to FIG. 5a, it is seen that this figure discloses the lines which constitute the data interface 600 which is one of the interfaces which provides for exchange of information between an active module and the system interface unit 100. Exchange is accomplished by controlling the logical stages of various signal lines in accordance with pre-established rules implemented through a sequence of signals termed a "dialog".

As seen from FIG. 5a, the interface includes an active output port request line (AOPR), a plurality of data to SIU lines (DTS 00-DTS 35, P0-P3), a plurality of steering data to SIU lines (SDTS 0-6, P), an active request accepted line (ARA), an accept read data line (ARDA), a plurality of data from SIU bus lines (DFS 00-35, P0-P3), a plurality of multiport identifier from SIU lines (MIFS 0-3, P), a double precision from SIU line (DPFS), and an accept status line (AST). The description of the interface lines are given in greater detail in the section to follow.

| Designation | DATA INTERFACE LINES Description |
|---|---|
| AOPR | The active output port request line is an unidirectional line which extends from each of the active modules to the SIU 100. When set, this line signals the SIU that the module requests a transfer path over which commands or data are to be transmitted. |
| DTS 00-35, P0-P3 | The data path lines are a four byte wide unidirectional path (four to 10 bit bytes) that extends between each of the active modules and the SIU and are used for transferring commands or data from each active module to the SIU 100. |
| SDTS 0-6, p | The steering data to SIU lines extend from each active module to the SIU 100. These lines are used to apply steering control information to the SIU 100 when the line |

DATA INTERFACE LINES -continued

| Designation | Description |
|---|---|
| | AOPR is set. Steering control information consists of seven bits and a parity bit which are coded as follows: |
| | (a) The state of bit 0 indicates the type of command applied to the DTS lines (whether the command is a programmable interface command or a memory command). |
| | (b) Bits 1–4 are coded to indicate which one of the modules is to receive and interpret the memory command (commands are interpreted only by memory modules and programmable interface commands shall be interpreted by all modules except input/output processor 200). |
| | (c) The state of bit 5 indicates whether one or two words of the command information is to be transferred between the requesting active module and the designated receiving module (one word specifies a single precision transfer and two words specifies a double precision transfer). |
| | (d) The state of bit 6 indicates the direction of transfer between the requesting module and the designated receiver module. |
| | (e) Bit P is a parity bit generated by the requesting active module which is checked by apparatus included within the SIU 100. |
| MITS 0–3, P | The four multiport identifier to SIU lines extend from active module to the SIU 100. These lines are coded to indicate which subchannel or port within an active module caused the setting of line AOPR. |
| ARA | The active request accepted line extends from the SIU 100 to each of the active modules. This line is set to indicate that the designated receiving module has accepted the active module's request which allows the active module to remove the requested information from the data interface lines. |
| ARDA | The accept read data line extends from the SIU to each of the active modules. This line is set by the SIU 100 to indicate to the active module that it is to accept the previously requested data from a designated module. |
| DFS 00–35, P0–P3 | The data from SIU lines are another set of data path lines which are a four byte wide unidirectional path (four 10 bit bytes) which extends from the SIU to each active module. These sets of lines are used by the SIU 100 to convey read type data to a designated one of the active modules. |
| MIFS 0–3, P | The four multiport identifier lines plus odd parity line extend from the SIU 100 to each of the active modules. These lines are coded to indicate which port or subchannel on the active module is to accept the data of a previous read operation from the SIU 100. |
| DPFS | The double precision from SIU line extends from the SIU to each of the active modules. The state of this line indicates whether one or two words of read data are to be accepted by the active module to complete a transfer (read command). |
| AST | The accept status line extends from the SIU 100 to each active module. The state of this line which is mutually exclusive of line ARDA, signals the active module that it should accept status information applied to the DFS lines. |

Figure 5B:
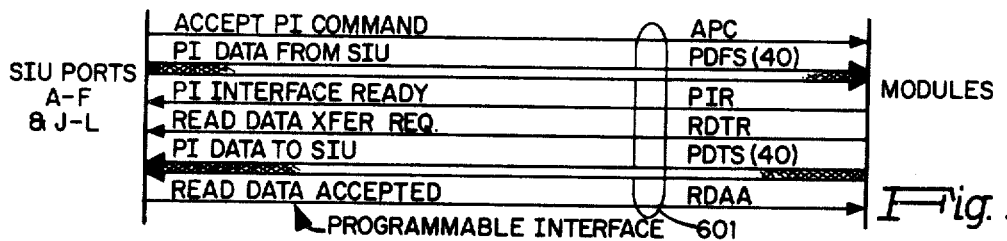

The lines of the programmable interface 601 shown in FIG. 5b provide for transfer of command information from an active module and a designated module. The transfer is accomplished by controlling the logic of states of the various signal lines in accordance with pre-established rules implemented through a sequence of signals termed dialog. The programmable interface includes an accept programmable interface command line (APC), a plurality of programmable interface data from SIU lines (PDFS 00-35, P0-P3), a programmable interface ready line (PIR), a read data transfer request line (RDTR), a plurality of programmable interface data to SIU lines (PDTS 00-35, P0-P3) and a read data accepted line (RDAA). The description of the interface lines are given in greater detail herein.

PROGRAMMABLE INTERFACE LINES

| Designation | Description |
|---|---|
| APC | The accept programmable interface command line extends from the SIU 100 to each receiving module. When set, this line signals the module that command information has been applied to the PDFS lines of the interface by the SIU and is to be accepted by the module. |
| PDFS 00–35, P0–P3 | The programmable interface data from SIU lines are a four byte wide unidirectional path (four 10 bit bytes) that extend from the SIU 100 to each module. These lines apply programmable interface information from the system interface unit to a designated receiving module. |
| PIR | The programmable interface ready line extends from each module to the SIU. When set, this line indicates that the module is ready to accept a command to be applied to line PDFS. |
| PDTS 00–35, P0–P3 | The programmable interface data to the SIU lines are a four byte wide unidirectional path (four 10 bit bytes) that extends from each module to the SIU 100. These lines are used to transfer programmable interface information to the SIU. |
| RDTR | The read data transfer request line extends from each module connected to the programmable interface to the SIU 100. When set, this line indicates that the previously requested read data is available for transfer to a module and has been applied to the lines PDTS by the module. |
| RDAA | The read data accepted line extends from the SIU 100 to each module. When set, the line indicates to the module that the data applied to the lines PDTS has been accepted and that the module may remove the information from these lines. |

Figure 5C:
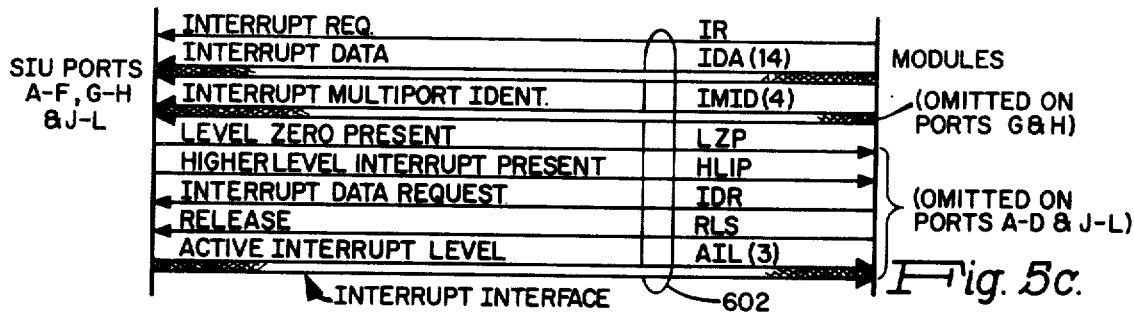

A further interface is the interrupt interface 602 of FIG. 5c which provides for interrupt processing by the input/output processor 200. That is, the interface enables the transfer of interrupt information by an active module to the SIU 100 as well as the transfer of interrupt information by the SIU 100 to the input/output processor 200 for processing. Similar to the other interfaces, the transfer of interrupt requests is accomplished by controlling the logical states of the various signal lines in accordance with pre-established rules implemented through a sequence of signals termed "dialog".

The interface includes an interrupt request line (IR), a plurality of interrupt data lines (IDA 00-11, P0-P1) and a plurality of interrupt multiport identifier lines (IMID 00-03) for modules connected to ports A through L. For modules connected to ports G and H, the interrupt interface further includes a level zero present line (LZP), a higher level interrupt present line (HLIP), an interrupt data request line (IDR), a release line (RLS) and a plurality of active interrupt level lines (AIL 0-2). As seen from FIG. 5c, the interrupt interface ports G and H do not include an interrupt multiport identifier line. The description of the interrupt interface lines are given in greater detail herein.

| INTERRUPT INTERFACE LINES | |
|---|---|
| Designation | Description |
| IR | The interrupt request line extends from each module to the SIU 100. When set, this line indicates to the SIU that it requires service. |
| IDA 0-3, P0<br>IDA 4-11, P1 | The interrupt data lines extend from an active module to the SIU 100. These lines are coded to contain control information required to be transferred to the input/output processor when an interrupt request has been accepted by the processor. These bits are coded as follows:<br>(a) The state of bit 0 specifies to the SIU 100 which of the two processors (i.e., processor number) is to process the interrupt request.<br>(b) Bits 1-3 are coded to indicate the priority or level number of the interrupt request to the SIU 100.<br>(c) Bit P0 is a parity bit for bits 0-3.<br>(d) Bits 4-8 are coded to provide a portion of an address required to be generated by the input/output processor 200 for referencing the correct procedure for processing the interrupt (i.e., an interrupt control block number ICBN).<br>(e) Bit P1 is a parity bit for bits 4-11. |
| IMID 00-03 | The interrupt multiport identifier lines extend from each active module to the SIU 100. These lines are coded to identify which specific subchannel of the active module has requested interrupt service. |
| LZP | The level zero present line extends from the SIU 100 to the input/output processor 200. When set, this line indicates that there is a highest priority (level 0 interrupt) request being directed to the processor 200 by the SIU 100. |
| HLIP | The higher level interrupt present line extends from the SIU to the input/output processor. When set, this line indicates that there is an interrupt request having a higher level or priority than the procedure or process being executed by the processor 200. |
| IDR | The interrupt data request line extends from the input/output processor 200 to the SIU 100. When set, this line indicates that interrupt data is to be sent to the processor on lines DFS by the SIU 100. |
| RLS | The release line extends from the input/output processor 200 to the SIU 100. This line when set indicates that the processor 200 has completed execution of the current procedure. |
| AIL 0-2 | The active interrupt level lines extend from the SIU to the input/output processor 200. These lines are coded to designate the interrupt level number of the procedure being executed by the processor 200. |

Figure 5D:
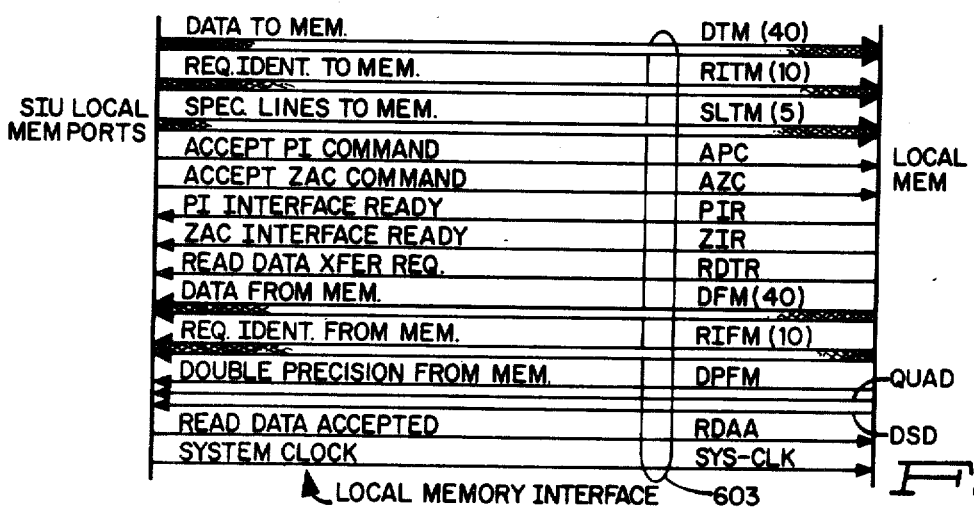

A next set of interface lines utilized by certain ones of the modules of FIG. 1 corresponds to the local memory interface lines of FIG. 5d. The local memory interface 603 provides for exchanging information between local memory 500 and the modules of the system. The exchange is accomplished by controlling logical states of the various signal interface lines in accordance with pre-established rules implemented through a sequence of signals termed a "dialog". The local memory interface includes a plurality of data to memory lines (DTM 00-35, P0-P3), a plurality of request identifier to memory lines (RITM 0-7, P0-P1), a plurality of specification lines to memory lines (SLTM 0-3, P), an accept P1 command line (APC), an accept ZAC command line (AZC), a P1 interface ready line (PIR), a ZAC interface ready line (ZIR), a read data transfer request line (RDTR), a plurality of data from memory lines (DFM 00-35, P0-P3), a plurality of request identifier from memory lines (RIFM 0-7, P0-P1), a double precision from memory lines (DPFM), a QUAD line, a read data accepted line (RDAA) and a system clock line (SYS-CLK).

Memory and programmable interface commands are transferred out of the same physical data lines of the interface. The interface does not include a set of lines for processing interrupt requests and therefore the modules connected to the local memory by the SIU 100 cannot directly cause a memory interrupt. The description of the local memory interface lines are given in greater detail herein.

| LOCAL MEMORY INTERFACE LINES | |
|---|---|
| Designation | Description |
| DTM 00-35, P0-P3 | The data path lines constitute a four btye wide unidirectional path (36 information lines and four odd parity lines) that extends from the SIU 100 to the local memory 500. These lines are used to transfer memory or programmable interface commands to the local memory 500. |
| RITM 0-3, P0<br>RITM 4-7, P1 | The requestor identifier to memory lines constitute two groups of four lines which extend from the SIU 100 to the local memory 500. These lines are coded to convey information to the local memory identifying the module which initiated the command and are used to return the data requested to the proper module. |
| SLTM 0-3, P | The specification lines to memory extend from the SIU 100 to the local memory 500 and include two port number selection lines, a read/write to memory line, a double precision to memory line and a parity line. The information signals applied to these lines are coded as follows.<br>(a) Bits 0-1 are port number selection bits coded to specify which port or subchannel within the attached module is to receive or interpret the memory command sent to the module.<br>(b) Bit 2 is a read/write to memory bit which is included in the steering control information received from the active module which is forwarded by the SIU to the local memory 500 when a new command is sent to the memory by the SIU 100. The state of this bit indicates the direction of data transfer.<br>(c) Bit 3 is a double precision to memory bit coded to specify the amount of data to be transferred. It is also included in the steering control information provided by the active module which is forwarded to the local memory module 500 by the SIU 100 when a new command is sent to the memory module. |
| AZC | The accept ZAC command line extends from the SIU 100 to the local memory module |

LOCAL MEMORY INTERFACE LINES

| Designation | Description |
|---|---|
|  | 500. When set, this line signals the local memory module 500 to accept the ZAC command and control information applied to the other lines by the SIU 100. The setting of this interface line is mutually exclusive with the accept P1 command interface line. |
| APC | The accept programmable interface command line, as described in connection with the programmable interface, extends from the SIU 100 to the local memory module 500. When set, this line indicates that the command information applied to the lines DTM is to be accepted by the local memory module 500. |
| PIR/ZIR | The programmable interface ready line/ZAC interface ready line extends from the local memory module 500 to the SIU 100. When set, each line signals the SIU 100 that the local memory module 500 is capable of accepting a programmable interface (PI)/memory (ZAC) command. |
| RDTR | The read data transfer request line extends from the local memory module 500 to the SIU 100. This line when set indicates that the read type data previously requested by a ZAC or PI command is available along with the necessary control information to be sent to the module requesting the data. |
| DFM 00-35, P0-P3 | The data from memory lines are a four byte wide unidirectional bus which extends from the local memory module 500 to the SIU 100. These lines are used to return read requested type data to an active module via the SIU 100. |
| RIFM 0-3, P0<br>RIFM 4-7, P1 | The two groups of requestor identifier from memory lines extend from the local memory module 500 to the SIU 100. These lines are coded for directing the read data back from module 500 to the requesting module. |
| DPFM and QUAD | The double-precision from memory line and QUAD line extend from the local memory module 500 to the SIU 100. These lines are coded to indicate the number of words to be transferred via the SIU 100 to the requesting module during read data transfer request time interval. These lines are coded as follows:<br>QUAD  DPFM<br>0      0      one word, single precision<br>0      1      two words, double precision<br>1      X<br>(don't care)    four words |
| DSD | The read data/status identifier line extends from the local memory module 500 to the SIU. The state of this line signals the SIU 100 whether the information applied to the lines DFM is read data or status information when the RDTR is set. When set, the line indicates status information of one or two words (QUAD=0) is being transferred. When reset to a binary ZERO, the line signals that up to four words of data are being transferred, the number being specified by the coding of lines QUAD and DPFM. |
| RDAA | The read data accepted line as mentioned in connection with the programmable terminal extends from the SIU 100 to the local memory module. When set, this line signals the memory module that the data applied on the interface lines by the local memory module has been accepted and that the local memory module may remove data from these lines. |
| SYS-CLK | The system clock line is a line which extends from the SIU 100 to each module of the system. This line is connected to a clock source included within the input/output processor 200 to synchronize the operations of each memory module from a common system clock source. |

Figure 5E:
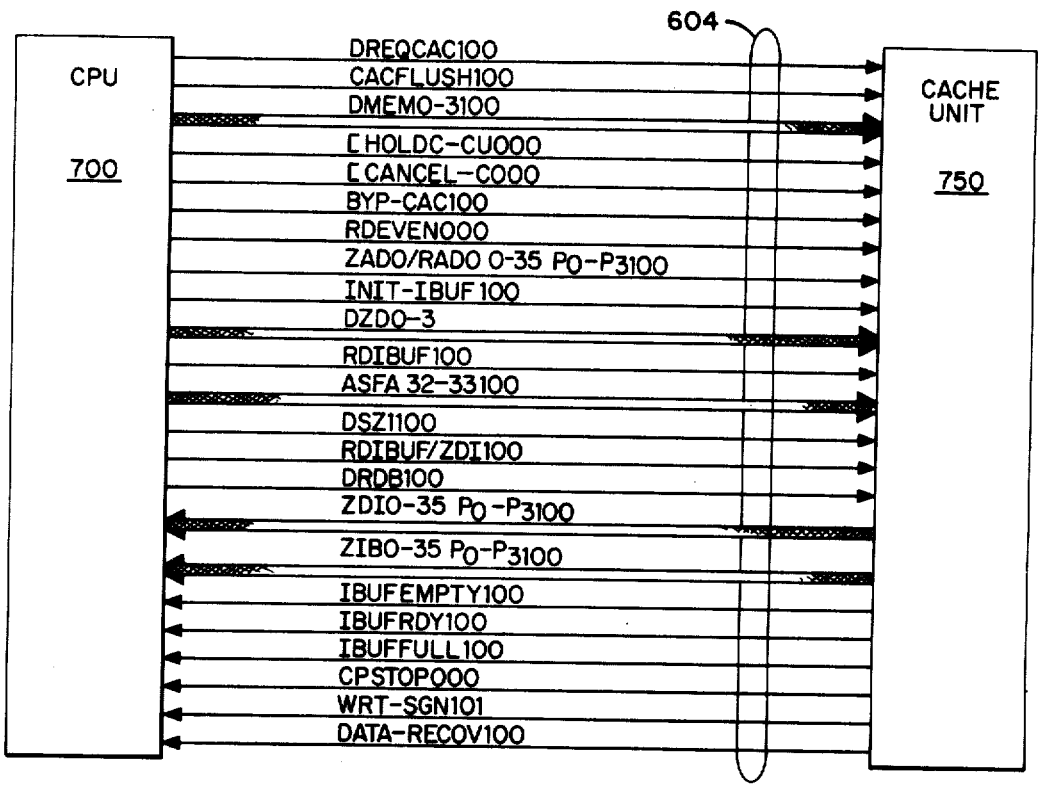

A last set of interface lines utilized as an internal interface between the cache unit 750 and central processor 700 corresponds to the cache/CPU interface lines of FIG. 5e. The interface 604 provides for exchanging information and control signals between the processor 700 and the cache unit 750. The exchange is accomplished by controlling the logical states of the various signal interface lines. The cache/CPU interface includes a plurality of data to processor lines (ZDI 0-35, P0-P3), a plurality ZAC and write data lines (ZADO 0-23, RADO 24-35, P0-P3), a processor request signal line (DREQ-CAC), a plurality of cache command lines (DMEM 0-3), a hold cache line (HOLD-C-CU), a cancel line (CANCEL—C), a flush line (CAC-FLUSH), a read request line (RD-EVEN), a read instruction buffer line (RD-IBUF), a read data buffer line (DRDB), an initialization pointer line (INIT-IBUF), a plurality of instruction lines (ZIBO-35,P0-P3), a plurality of address pointer lines (ASFA-32-33), a control line (DSZ), a read I-buffer data line (RD-IBUF/ZDI), a plurality of zone bit lines (DZD 0-3), a bypass cache line (BYP-CAC), a write signal line (WRT-SGN), an instruction buffer empty line (IBUF-EMPTY), an instruction buffer ready line (IBUF-RDY), an instruction buffer full line (IBUF-FULL), a CP stop line (CP-STOP), and a CP control line (DATA-RECOV).

Instructions, cache commands and data are forwarded to the cache unit 750 via different ones of these lines. Additionally, the operation of the processor 700 is enabled or disabled by certain ones of these lines as explained herein. The description of the CP/cache interface lines are given in greater detail herein.

CP/CACHE INTERFACE LINES

| Designation | Description |
|---|---|
| DREQ-CAC | This line extends from the processor 700 to Cache unit 750. When the DREQ-CAC is set to a binary ONE, a ZAC command is transferred to the cache 750. In the case of a write ZAC command, write data words are transferred in the one or two cycles following the ZAC command and data words are sen from the processor 700 through the cache 750 without modification, to the SIU 100. |
| DMEM 0,1,2,3 | These lines extend from the processor 700 to cache 750. These lines are coded to designate the command that the cache 750 is to execute. The coding is as follows:<br>DMEM=0000 no op No action is taken and no cache request is generated.<br>DMEM=0001 Direct The direct command enables the processor 700 to perform a direct transfer of an operand value without action on the part of the cache 750. Hence, no cache request is generated by this type of command.<br>DMEM=0010 0-3 - Address Wraparound Command (ADD-WRAP) The address wraparound command is executed in 2 cycles. At the start of the first cycle, data and command information is transferred to the cache 750. The processor 700 is then turned off before the next clock interval. During the second cycle, the |

CP/CACHE INTERFACE LINES

| Designation | Description |
|---|---|
| | processor is turned on and at the end of the cycle the data given to it is made available to the processor 700. |
| DMEM=0100 0-3 - Load Instruction Buffer Instruction Fetch 1 (LD-IBUF-IF1) | The load instruction buffer command is executed in one cycle. At the start of the cycle, address and command information is transferred to the cache 750. At the end of the cycle, the block specified by the address is written into the instruction buffer at a previously designated instruction buffer address, and the addressed word is transferred to the processor 700 via the ZDI lines 0-35. |
| DMEM=0101 0-3 - Load Instruction Buffer Instruction Fetch 2 (LD-IBUF-IF2) | The load instruction buffer command is executed in one cycle. At the start of the cycle, address and command information is transferred to the coche 750. At the end of the cycle, the block specified by the address is written into the instruction buffer at the previously designated instruction buffer address. |
| DMEM=0110 - Load Quad | The load quad is executed in one cycle. Same as IF2 but data goes to another portion of the I Buffer. |
| DMEM=0111 0-3 - Preread (PR-RD) | The preread command is executed in a variable number of cycles with a minimum of one. At the start of the first cycle, address and command information are transferred to cache 750. During the first cycle, when the address specified is that of a block which is in the cache 750, the preread operation terminates and no other action is taken. If the addressed block is not in the cahce 750, then at the end of the first cycle, the request is transferred to the main memory. When the requested block has been read from main memory, the data is stored in the cache 750. |
| DMEM=1000 0-3 - Read Single (RD-SNG) | The read single command is executed in one cycle. At the start of the cycle, address and command information are given to the cache 750 and at the end of the cycle the data made available to processor 700. |
| DMEM=1001 0-3 - Read Clear (RD-CLR) | The read clear command is executed in a variable number of cycles with a minimum of 9. At the start of the first cycle, address and command information are transferred to the main memory, and the processor is turned off. During the second cycle, when the addressed word is contained in a cache the block containing the word is fetched from the cache 750. When the requested word has been read from main memory and transferred to the cache 750, then the processor is turned on. |
| DMEM=1010 0-3 - Read Double Odd (RD-DBL-O) (line DSZ is a binary ZERO) | The read double odd command is executed in two cycles. At the start of the first cycle, address and commandinformation are transferred to the cache 750. At the end of the first cycle, the word at the odd address is made available to the processor 700. At the end of the second cycle, the word at the even address is made available to the processor. |
| DMEM=1010 0-3 - Read Double Even (RD-DBL-E) (line DSZ is a binary ONE) | The read double even command is executed in two cycles. At the start of the first cycle, address and command information are transferred to cache 750. At the end of the first cycle the word at the even address is made available to the processor 700. At the end of the second cycle, the word at the odd address is made available to the processor 700. |
| DMEM=1011 0-3 - Read Remote (RD-RMT) | The road remote command is executed in a variable number of cycles, with a minimum of 10. At the start of the first cycle, address and command information are transferred to cache 750. At the end of the first cycle, the request is transferred to the main memory and the processor 700 is turned off. When the requested word pair has been fetched from memory, processor 700 is turned on and the data is made available to it. |
| DMEM=1100 0-3 - Write Single (WRT-SNG) | The write single command is executed in two cycles. At the start of the first cycle, address and command information is transferred to the cahce 750. At the start of the second cycle, the data is transferred to the cache 750. During the second cycle, the data is written into the cache 750, if the block which contains the addressed word is stored in the cache 750. During the end of the second cycle, the write request and the data is transferred to the main memory. |
| DMEM=1110 0-3 - Write Double (WRT-ABL) | The write double command is executed in three cycles. At the start of the first cycle, address and command information are transferred to the cache 750. At the start of the second (third) cycle the even (odd) data word is transferred to the cache 750. During the third cycle, the data is written into the cache, if the block which contains the addressed word pair is stored in the cache 750. At the end of the third cycle, the write request and both data words will have been passed on to the main memory. |
| DMEM=1111 0-3 - Write Remote (WRT-RMT) | The write remote command is executed in three cycles. At the start of the first cycle, address and command information are transferred to the cache 750. At the end of the first cycle, the request is transferred to the main memory. During the next two cycles, the 2 data words are transferred to the cache 750 which transfers same to main memory. |
| HOLD-C-CU | This line extends from processor 700 to cache 750. When set to a binary ONE, this control signal specifies that the cache 750 is to assume a HOLD state for requests or data transfers. |
| CANCEL-C | This line extends from processor 700 to cache 750. When set to a binary ONE, this control signal aborts any request made to cache 750. |
| CAC-FLUSH | This line extends from processor 700 to cache 750. When set to a binary ONE, it starts a flush of the cache 750. |
| RD-EVEN | This line extends from processor 700 to cache 750. When the cache makes a double word request to the SIU, the even word is saved in a special register. When RD-EVEN line is set to a binary ONE, the contents of this register is gated onto the ZDI lines. |
| ZADO 0-23, PADO 24-35 P0-P3 | These 40 unidirectional lines extend from processor 700 to cache 750. The lines are used to transfer ZAC command and |

| Designation | Description |
|---|---|
| | write data words to the cache 750. |
| RD-IBUF | This line extends from the processor 700 to cache 750. When set to a binary ONE, the line causes an instructin buffer out pointer to increment for processing a next instruction in accordance with the state of a line DRDB as follows. |
| DZD 0-3 | These four lines extend from processor 700 to cache 750. These lines transfer odd word zone bit signals for write double commands. |
| BYP-CAC | This line extends from processor 700 to cache 750. When set to a binary ONE, this line causes the cache 750 to request data words from main memory for read type instructions. |
| WRT-SGN | This line extends from the cache 750 to processor 700. It is used to signal the processor 700 during write commands that the cache 750 has completed the transfer of ZAC commands and data words of the SIU 100. |
| ASFA 32-33 | These two lines extend from processor 700 to cache 750. These lies are coded to specify the next word of a block stored in the I buffer to be read out to the processor 700 when the I buffer is initialized under hardware control via the INIT IBUF line. |
| INIT-IBUF | The initialize instruction buffer command is executed in one cycle. At the end of the cycle, a buffer in pointer is reset to ZEROS and the buffer out pointer is loaded with an initial value. |
| DSZ1 | This line extends from the processor 750 to cache 750. The state of this line specifies to cache 750 the order in which words are to be sent to the processor 700 when a read double command is performed. |
| DRDB100 | This line extends from the processor 700 to cahce 750. It is used as the most significant bit of the I Buffer read address. |
| RD-IBUF/ZDI | This line extends from processor 700 to cache 750. It causes the cache 750 to apply the data on the ZIB lines to the ZDI lines. |
| ZDI 0-35 P0, P1, P2, P3 | These 40 unidirectional lines extend from cache 750 to processor 700. They apply data from the cache 750 to the processor 700. |
| ZIB 0-35 P0, P1, P2, P3 | These 40 unidirectional lines extend from cache 750 to processor 700. They apply instructions from the cache Instruction Buffer to the processor 700. |
| I BUF-EMPTY | This line extends from cache 750 to processor 700. When set to a binary, ONE, this line indicates that the Instruction Buffer contains no instructions at this time. |
| I BUF-RDY | This line extends from cache 750 to processor 700. When set to a binary ONE, the line indicates that the Instruction Buffer contains at least one instruction. |
| I BUF-FULL | This line extends from cache 750 to processor 700. This line indicates that the Instruction Buffer contains more than four instructions or it has at least one instruction and an outstanding instruction fetch request line. |
| CP STOP | This line extends from cache 750 to processor 700. When forced to a binary ONE state, the line signals that as a result of special conditions detected within the cahce unit 750, the processor 700 is required to wait or halt its operation while the cache unit 750 resolves the special conditions. |
| DATA-RECOV | This line extends from the cache 750 to processor 750. It is used to re-strobe processor registers following the stopping of the processor 700 in response to the detectin of a cache miss condition |

While FIGS. 5a through 5e show lines which connect the different modules of the system of FIG. 1 to SIU 100 in addition to the connection to processor 700 and cache unit 750, it will be appreciated that other lines are also included for signalling other conditions, as for example, certain error conditions and operational conditions. For further descriptions of the various modules of FIG. 1, reference may be made to U.S. Pat. No. 4,000,487. Now, the processor module 700 and cache unit 750 wil be described in greater detail.

GENERAL DESCRIPTION OF PROCESSOR 700-FIG. 2

Figure 2:
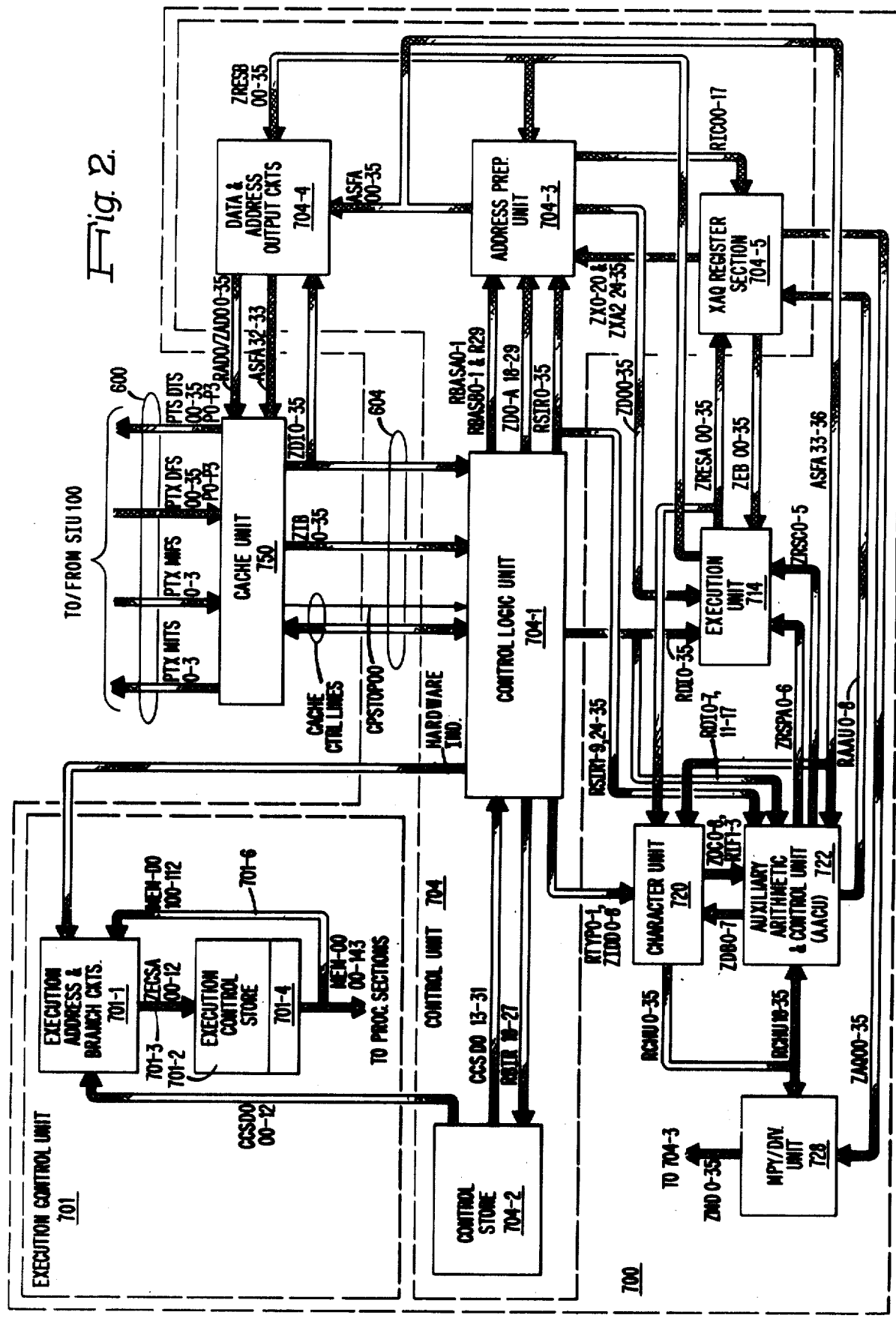
FIG. 2 shows in block diagram form the host processor 700 and the cache memory 750 of FIG. 1.

Referring to FIG. 2, it is seen that the host processor 700 includes an execution control unit 701, a control unit 704, an execution unit 714, a character unit 720, an auxiliary arithmetic and control unit (AACU) 722, a multiply-divide unit 728, which are interconnected as shown. Additionally, the control unit 704 has a number of interconnections to the cache unit 750 as shown.

The execution control unit 701 includes an execution control store address preparation and branch unit 701-1, and an execution control store 701-2. The store 701-2 and unit 701-1 are interconnected via buses 701-3 and 701-6 as shown.

The control unit 704 includes a control logic unit 704-1, a control store 704-2, an address preparation unit 704-3, data and address output circuits 704-4, an XAQ register section 704-5 which interconnect as shown.

As seen from FIG. 2, the SIU interface 600 provides a number of input lines to the cache unit 750. The lines of this interface have been described in detail previously. However, in connection with the operation of cache unit 750, certain ones of these lines are specially coded as follows.

1. MITS 0-3 for Reads are coded as follows:
    bits 0-1=00;
    bits 2-3=Read ZAC buffer address;
    For Write Operation bit 0-3=Odd word zone
2. MIFS lines are coded as follows:
    bit 0=0;
    bit 1=0 even word pairs (words 0,1);
    bit 1=1 odd word pairs (words 2,3);
    bits 2-3=ZAC buffer address to memory.

As concerns the interface lines DFS 00-35, P0-P3, these lines convey read data to cache unit 750. The lines DTS 00-35, P0-P3, are used to transfer data from cache 750 to the SIU 100. Additionally, the SIU interface 602 provides a number of input lines to the cache unit 750 which convey information in the form of PI commands. These commands are forwarded through the cache unit 750 to a group of control logic circuits via a set of internal interface lines some of which are shown in FIG. 4. These circuits can be considered comparable to the circuits disclosed in U.S. Pat. Nos. 4,006,466 and 4,017,836. The control logic circuits in turn forward command control signals via the lines ZPIB 9-16 for decoding by the cache section 750-100 for reading and writing cache registers and memory as explained herein. Also, the circuits forward address signals to section 750-100 via the lines ZPIDT 29-35. The utilization of the above lines will be explained in greater detail with respect to FIG. 4.

The control unit 704 provides the necessary control for performing address preparation operations instruction fetching/execution operations and the sequential control for various cycles of operation and/or machine states. The control generated by logic circuits and by the execution control unit 701 for the various portions of the control unit 704.

The register section 704-5 includes a number of program visible registers such as index registers, an accumulator register, and quotient register. This section will be discussed in greater detail with reference to FIG. 3. Other program visible registers such as the instruction counter and address registers are included within the address preparation unit 704-3.

As seen from FIG. 2, the section 704-5 receives signals from unit 704-3 representative of the contents of the instruction counter via lines RIC 00-17. Also, lines ZRESA 00-35 apply output signals from the execution unit 714 corresponding to the results of operations performed upon various operands. The section 704-5 also receives an output signal from the auxiliary arithmetic and control unit via lines RAAU0-8.

The section 704-5 provides signals representative of the contents of one of the registers included within the section as an input to the address preparation unit 704-3. The address preparation unit 704-3 forwards the information through a switch to the execution unit 714 via the lines ZDO 0-35. Similarly, the contents of certain ones of the registers contained within section 704-5 can be transferred to the execution unit 714 via the lines ZEB 00-35. Lastly, the contents of selected ones of these registers can be transferred from section 704-5 to the multiply/divide unit 728 via the lines ZAQ 00-35.

The address preparation unit 704-3 generates addresses from the contents of various registers contained therein and applies the resultant logical, effective and/or absolute addresses for distribution to other units along the lines ASFA 00-35. The address preparation unit 704-3 receives the results of operations performed on a pair of operands by the execution unit 714 via the lines ZRESB 00-35. The unit 704-3 receives signals representative of the contents of a pair of base pointer registers from the control logic unit 701 via the lines RBASA and RBASB0-1. Outputs from the multiply/divide unit 728 are applied to the address preparation unit 704-3. Lastly, the contents of a secondary instruction register (RSIR) are applied as input to the unit 704-13 via the lines RSIR 00-35.

The data and address output circuits 704-4 generate the cache memory address signals which it applies to the cache unit 750 via the lines RADO/ZADO 00-35. These address signals correspond to the signals applied to one of the sets of input lines ZDI 00-35, ASFA 00-35 and ZRESB 00-35 selected by switches included within the circuits of block 704-4. Also, word address signals are applied via the lines ASFA 32-33. These circuits will be further discussed herein in greater detail.

The control logic unit 704-1 provides data paths which have an interface with various units included within the cache unit 750. As described in greater detail herein, the lines ZIB 00-35 provide an interface with an instruction buffer included within the cache 750. The lines ZDI 00-35 are used to transfer data signals from the cache 750 to the control logic unit 704-1. Other signals are applied via the other data and control lines of the cache-CP interface 604. These lines include the CP stop line shown separately in FIG. 2.

As seen from FIG. 2, the control logic unit 704-1 provides a number of groups of output signals. These output signals include the contents of certain registers, as for example, a basic instruction register (RBIR) whose contents are applied as an input to control store 704-2 via the lines RBIR 18-27. The control logic unit 704-1 receives certain control signals read out from control store 704-2 via the lines CCSDO 13-31.

The control logic unit 704-1 also includes a secondary instruction register (RSIR) which is loaded in parallel with the basic instruction register at the start of processing an instruction. The contents of the secondary instruction register RSIR 00-35, as previously mentioned, are applied as inputs to the address preparation unit 704-3. Additionally, a portion of the contents of the secondary instruction register are applied as inputs to the auxiliary arithmetic control unit 722 via the lines RSIR 1-9 and 24-35.

The control store 704-2 as explained herein provides for an initial decoding of program instruction op-codes and therefore is arranged to include a number of storage locations (1024), one for each possible instruction op-code.

As mentioned, signals applied to lines RBIR 18-27 are applied as inputs to control store 704-2. These signals select one of the possible 1024 storage locations. The contents of the selected storage location are applied to the lines CCSDO13-31 and to CCSDO 00-12 as shown in FIG. 2. The signals supplied to lines CCSDO 00-12 correspond to address signals which are used to address the execution control unit 701 as explained herein.

The remaining sections of processor 700 will now be briefly described. The execution unit 714 provides for instruction execution wherein unit 714 performs arithmetic and/or shift operations upon operands selected from the various inputs. The results of such operations are applied to selected outputs. The execution unit 714 receives data from a data input bus which corresponds to lines RDI 00-35 which have as their source the control logic unit 704-1. The contents of the accumulator and quotient registers included within section 704-5 are applied to the execution unit 714 via the lines ZEB 00-35 as mentioned previously. The signals applied to the input bus lines ZDO 00-35 from the address preparation unit 704-3 are applied via switches included within the execution unit 714 as output signals to the lines ZRESA 00-35 and ZRESB 00-35, as shown in FIG. 2. Additionally, execution unit 714 receives a set of scratch pad address signals from the auxiliary arithmetic and control unit 722 applied via the lines ZRSPA 00-06. Additionally, the unit 722 also provides shift information to the unit 714 via the lines ZRSC 00-05.

The character unit 720 is used to execute character type instructions which require such operations as translation and editing of data fields. As explained herein, these types of instructions are referred to as extended instruction set (EIS) instructions. Such instructions which the character unit 720 executes include the move, scan, compare type instructions. Signals representative of operands are applied via lines ZRESA 00-35. Information as to the type of character position within a word and the number of bits is applied to the character unit 720 via the input lines ZDB 00-07.

Information representative of the results of certain data operations is applied to the unit 722 via the lines ZOC 00-08. Such information includes exponent data and data in hexadecimal form. The character unit 720 applies output operand data and control information to the unit 722 and the unit 728 via the lines RCHU 00-35.

The auxiliary arithmetic and control unit 722 performs arithmetic operations upon control information such as exponents used in floating point operations, calculates operand lengths and pointers and generates count information. The results of these operations are applied to execution unit 714 via the lines ZRSPA 00-06 and lines ZRSC 00-06 as mentioned previously. Information signals corresponding to characters such as 9-bit characters, 6-bit characters, decimal data converted from input hexadecimal data, quotient information and sign information are applied to section 704-5 via the lines RAAU 00-08.

As seen from FIG. 2, the unit 722 receives a number of inputs. Character pointer information is applied via the lines ASFA 33-36. EIS numeric scale factor information and alphanumeric field length information are applied to the unit 722 via the lines RSIR 24-35. Other signals relating to fetching of specific instructions are applied via the lines RSIR 01-09. Exponent signals for floating point data are applied to the unit 722 via the lines ZOC 00-08 while floating point exponent data signals from unit 704-1 are applied via the lines RDI 00-08. Shift count information signals for certain instructions (e.g. binary shift instructions) are applied to the unit via the lines RDI 11-17. As concerns the input signals applied to the lines RCHU 00-35, lines 24-35 apply signals corresponding to the length of EIS instruction fields while 18-23 apply address modification signals to the unit 722.

The last unit is the multiply/divide unit 728 which provides for high-speed execution of multiply and divide instructions. This unit may be considered conventional in design and may take the form of the multiply unit described in U.S. Pat. No. 4,041,292 which is assigned to the same assignee as named herein. The unit 728 as seen from FIG. 2 receives multiplier dividend and divisor input signals via the lines RCHU 00-35. The multiplicand input signals from register section 704-5 are applied via the lines ZAQ 00-35. The results of the calculations performed by the unit 728 are applied as output signals to the lines ZMD 00-35.

As mentioned previously, the cache unit 750 transfers and receives data and control signals to and from the SIU 100 via the data interface line 600. The cache unit 750 transfers and receives data and control signals to and from the processor 700 via the lines of interface 604. Lastly, the cache unit 750 receives address and data signals from the circuits 704-4 via the lines RADO/-ZADO 00-35 and the lines ASFA 32-33.

DETAILED DESCRIPTION OF THE PROCESSOR 700

The various sections which comprise the processor 700 illustrated in FIG. 2 will now be discussed in greater detail with respect to FIGS. 3a through 3i.

Figure 3A:
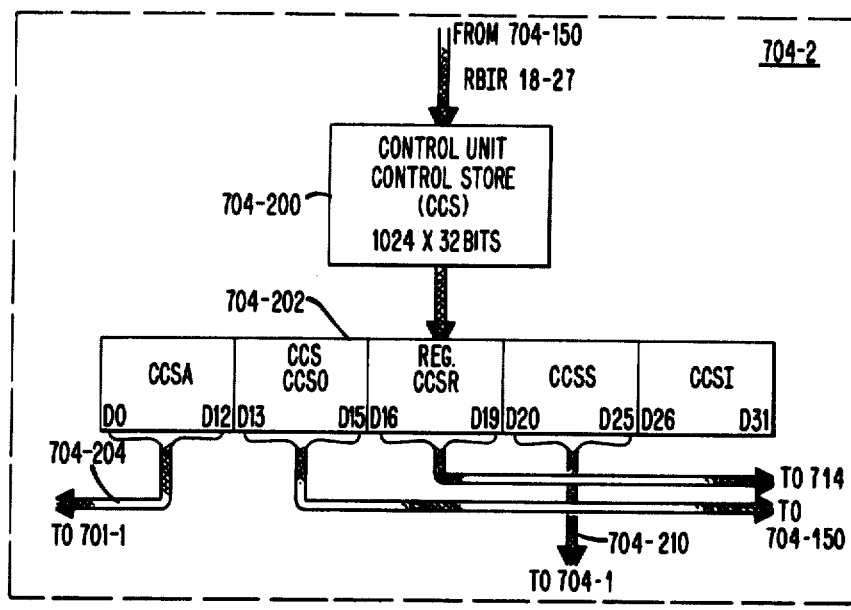
Figure 3E:
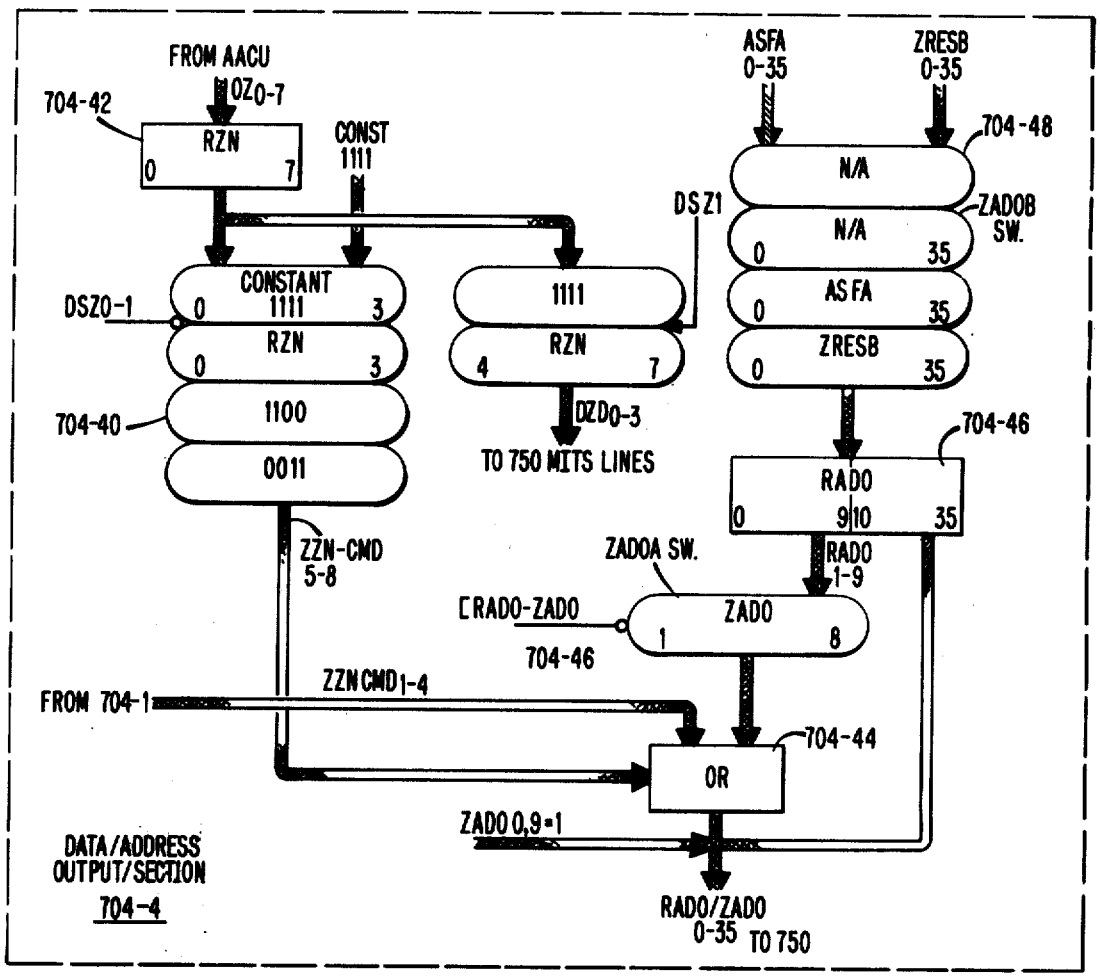
Figure 3B:
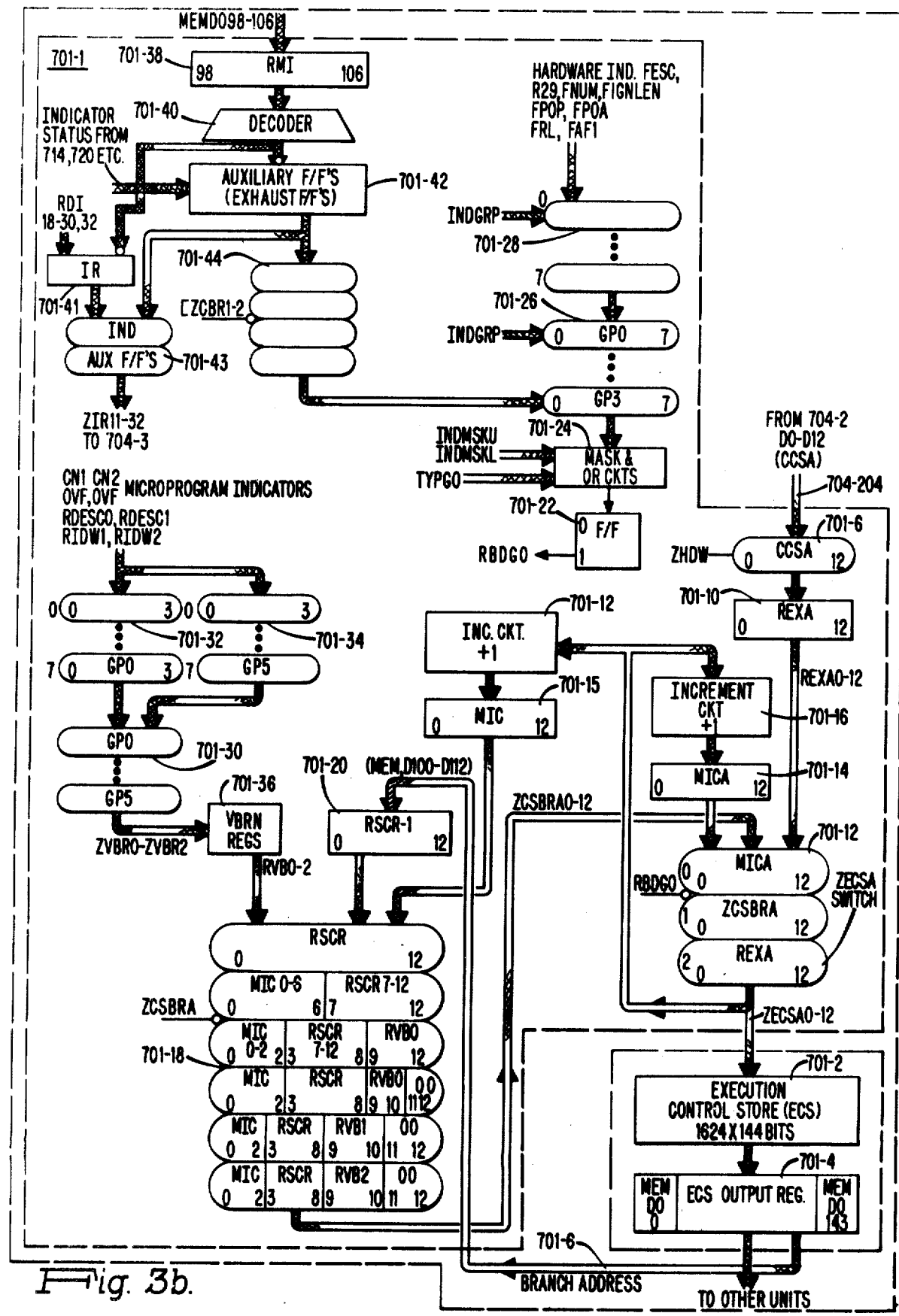

Referring to FIGS. 3a and 3b, it is seen that the processor includes two control stores: (1) the control unit control store (CCS) 704-200 which forms part of the control unit 704; and (2) the execution control store (ECS) 701-3 which is included within the execution control unit 701.

The cache oriented processor 700 of the preferred embodiment of the present invention includes a three stage pipeline. This means that the processor 700 requires at least three processor cycles to complete the processing of a given program instruction and can issue a new instruction at the beginning of each cycle. Hence, a number of program instructions may be in some stage of processing at any given instant of time.

In the preferred embodiment of the processor 700 includes the following stages: an instruction cycle (I) wherein instruction interpretation, op-code decoding and address preparation take place; a cache cycle (C) wherein access to the cache unit 750 is made ensuring high performance operation; and, an execution cycle (E) wherein instruction execution takes place under microprogram control.

As concerns control, during the I cycle, the op-code of the instruction applied via lines RBIR 18-27 is used to access a location within control store 704-2. During a C cycle, the accessed contents from control store 704-2 are applied to lines CCS DO 00-12 and in turn used to access one of the storage locations of the execution control store 701-2. During the C cycle, the microinstructions of the microprogram used to execute the instruction are read out from the execution control store 701-2 into a 144-bit output register 701-4. The signals designated MEMDO 00-143 are distributed to the various functional units of processor 700. During an E cycle, the processor executes the operation specified by the microinstructions.

Figure 6A:
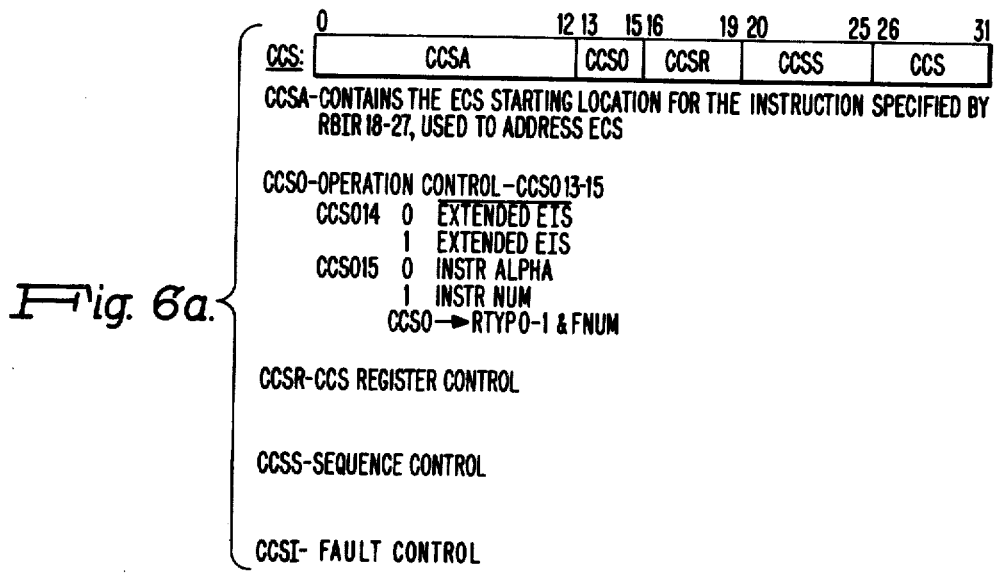
FIG. 6a illustrate the format of the control store control unit of FIG. 1 in accordance with the teachings of the present invention.

Referring specifically to FIG. 2, it is seen that the control store 704-2 includes a control unit control store (CCS) 704-200 which is addressed by the op-code signals applied to the lines RBIR 18-27. The CCS 704-200, as mentioned previously, includes 1024 storage locations, the contents of which are read out into an output register 704-202 during an I cycle of operation. FIG. 6a shows schematically the format of the words stored within the control store 704-200.

Referring to FIG. 6a, it is seen that each control unit control store word includes five fields. The first field is a 13-bit field which contains an ECS starting address location for the instruction having an op-code applied to lines RBIR 18-27. The next field is a three bit field (CCS$\phi$) which provides for the control of certain operations. The bit interpretations of this field depend upon its destination and whether it is decoded by specific logic circuits or decoded under microprogram control. The next field is a 4-bit field which provides for certain register control operations.

The next field is a 6-bit sequence control field which is coded to specify a sequence of operations to be performed under hardwired logic circuit control as well as the type of cache operation. In the present example, this field is coded as $75_8$. The last field is a 6-bit indicator field which is not pertinent to an understanding of the present invention.

As seen from FIG. 3a, signals corresponding to the CCSA field of a control unit control store word are applied via a path 704-204 as an input to the execution generation circuits 701-7. Signals corresponding to the CCSR field are applied as an input to the execution unit 714 via path 704-206. Additionally, the same signals are applied as an input to the address preparation unit 704-3 via another path 704-208.

Signals representative of the sequence control field apply as an input to the sequence control logic circuits 704-100 via path 704-210. As explained herein, these circuits decode the sequence control field and generate signals for conditioning the cache unit 750 to perform the operation designated.

As mentioned previously, the execution address generation circuit 701-1 receives an input address which corresponds to field CCSA from the control store 704-2. As seen from FIG. 3b, these circuits include an input address register 701-10 whose output is connected to one position of a four position switch 701-12 designated ZECSA. The output of the switch serves as an address source for the control store 701-2. The first position of the switch 701-12 is connected to receive an address from the MICA register 701-14. The contents of register 701-14 are updated at the end of each cycle to point to the location within the ECS control store following the location whose contents were read out during that cycle.

The second position selects the address produced from the ZCSBRA branch address selector switch 701-18. The third position selects the address of the first microinstruction in each microprogram provided by the CCS control store which is loaded into the REXA register 701-10. When the CCS output is not available at the termination of a microprogram, a predetermined address (octal address 14) is automatically selected.

The first position of branch switch 701-18 receives signals corresponding to a branch address read out from store 701-2 into register 701-4 which is in turn forwarded to a return control register 701-20. The second, third and fourth positions of switch 701-18 receives signals from RSCR register 701-20, an MIC register 701-15 and the contents of a number of vector branch registers 701-36. The MIC register 701-15 stores an address which points to the microinstruction word following the microinstruction word being executed. This address corresponds to address from switch 701-12 incremented by one by an increment circuit 701-12.

The vector branch registers include a 4-bit vector branch register 0 (RVB0), a 2-bit vector branch register 1 (RVB1) and a 2-bit vector branch register 2 (RVB2). These registers are loaded during a cycle of operation with address values derived from signals stored in a number of different indicator flip-flops and registers applied as inputs to the number of groups of input multiplexer selector circuits 701-32 and 701-34. The outputs of the circuits 701-32 and 701-34 are applied as inputs to two position selector circuits 701-30. These circuits in turn generate the output signals ZVBR0, ZVBR1 and ZVBR2 which are stored in the registers 701-36.

The switch 701-36 provides an address based upon the testing of various hardware indicator signals, state flip-flop signals selected via an INDGRP field. The branch decision is determined by masking (ANDING) the selected indicator set with the INDMSKU and INDMSKL fields of a microinstruction word. If a vector branch is selected, INDMSKU is treated as 4 ZERO bits. The "OR" of the 8 bits is compared to the state defined by the TYPG and GO microinstruction fields. The hardware signals are applied via a number of data selector circuits 701-28 only one of which is shown whose outputs are in turn applied as inputs to a further five position multiplexer selector circuit 701-26. The output of the multiplexer circuit 701-26 feeds a comparison circuit which "ands" the indicator signals with the mask signals to produce the resulting signals MSKCBR0-7.

The signals MSKCBR0-7 are applied to another comparison circuit which "ands" the signals with the condition branch test signals TYPGGO to set or reset a branch decision flip-flop 701-22 which produces a signal RBDGO whose state indicates whether branching is to take place. The output signal RBDGO is applied as a control input to the first two positions of switch 701-12. When the branch test condition is not met (i.e., signal RBDGO=0), then the incremented address from the MICA register 701-14 is selected.

In some instances, as seen herein, it is not possible to test the state of an indicator on the cycle following its formation. For this reason, history registers HR0-HR7, not shown, are provided for register storage of the Group 2 indicators. The states of such stored indicators are selected and tested in a manner similar to that of the other indicators (i.e., mask fields).

Additionally, the unit 701-1 includes a number of indicator circuits, certain ones of these are used to control the operation of certain portions of the processor 700 when the strings being processed by certain types of instructions have been exhausted. These indicator circuits are included in block 701-42 and are set and reset under the control of a field within the microinstruction word of FIG. 6a (i.e., IND6 field). The bits of this field read out from the ECS output register 701-4 are applied to an RMI register 701-38 for decoding by a decoder 701-40. Based upon the state of status indicator signals received from the various processor units (e.g. 714, 720, 722, etc.), the appropriate ones of the auxiliary flip-flops are switched to binary ONE states. The outputs of these flip-flops are applied via the different positions of a 4 position switch 701-44 to the GP3 position of switch 701-26 for testing. The same outputs are applied to a second position of a ZIR switch 701-43 for storage via the ZDO switch 704-340. The ZIR switch 701-43 also receives indicator signals from an indicator register (IR) 701-41. This register is loaded via the RDI lines 18-30 and 32 in response to certain instructions.

The indicator status signals for example include the outputs of the different adder circuits (AL, AXP) of the unit 720. These signals will set different ones of a number of exhaust flag flip-flops designated FE11, FE12, FE13, FE1E, FE2E, FE2 and FE3. The FE1E and FE2E flip-flops are set during any FPOA cycle of any instruction. These flip-flops in turn cause the FE11, FE12 and FE13 flip-flops to be set when the outputs from the AL or AXP adder circuits of unit 720. The setting and resetting of these indicators will be described herein in further detail in connection with the description of operation. However, the exhaust flag flip-flops pertinent to the example given herein are set and reset in accordance with the following Boolean expressions.

SET: FE1E=FPOA+IND6FLD field.
RESET: FE1E=IND6FLD field.
SET: FE2E=FPOA+IND6FLD field.
RESET: FE2E=IND6FLD field.
SET: FE11=IND6FLD field·FE1E (ALES+AXPES+DESC1·APO−4=0)+IND6FLD field·FE1E·DESC1·(APO-5=0+APZN+ALZN-)+IND6FLD field.
RESET: FE11=FPOA+IND6FLD field.
SET: FE12=IND6FLD field·FE1E·(ALES+AXPES+FE13).
RESET: FE12=FPOA+IND6FLD field.
SET: FE13=IND6FLD field·FE1E·ALES+IND6FLD field.
RESET: FE13=FPOA+IND6FLD field.
SET: FE2=IND6FLD field·FE2E·ALES+IND6FLD field·FE2E·DESC2·(APO−4=-

0+APO-5=0+APZN+ALZN)+(IND6FLD
field) FE2E·DESC2+IND6FLD.
RESET: FE2=FPOA+IND6FLD field.
SET: FE3=IND6FLD field·DESC3·(APO−4=-
0+APO−5=0+APZN+ALZN)+IND6FLD
field·DESC3+IND6FLD.
RESET: FE3=FPOA+IND6FLD field.
Wherein IND6FLD indicates a particular code;
ALES=AL=0 or $\overline{AL-C}$;
AXPES=AXP=0 or $\overline{AXP-C}$;
APZN=APO−7≦0; and,
ALZN=ALO−11≦0.

The ZCSBRA switch 701-18 is normally enabled when the branch decision flip-flop RBD was set to a binary ONE in the previous cycle. The first position selects a 13-bit branch address from the current microinstruction applied via the RSCR register 701-20. The branch address enables any one of the locations of the ECS control store to be addressed directly. The second position selects the concatenation of the 6 low order address bits from the current microinstruction applied via MIC register 701-15 and the 7 upper bits of the branch address from the current microinstruction applied via the RSCR register 701-20. This permits branches within a 64-word page defined by the contents of the MIC register 701-15 (current location+1).

The third position selects the concatenation of 4 low order bits from the RVBO vector branch register, 6 bits from the branch field of the current microinstruction stored in RCSR register and the 3 upper bits of the address stored in the MIC register. This permits 16-way branches. The fourth position selects the concatenation of the 2 low order ZEROS with 4 bits from the vector branch register RVBO with the 4 most significant bits of the branch address field of the current microinstruction and the 3 upper bits of the current address stored in the MIC register. This permits 16-way branches with 3 control store locations between each adjacent pair of destination addresses.

The fifth position selects the concatenation of 2 low order ZEROS with 2 bits from vector branch register RVB1, with the 6 bits of the branch address of the current microinstruction and the upper 3 bits from the MIC register. This permits branches with 4 possible destinations with 3 control store locations between each adjacent pair of destination addresses.

The sixth position selects the concatenation of 2 low order ZEROS with 2 bits from vector branch register RVB2 with the 6 bits of the branch address of the current microinstruction and the upper 3 bits from the MIC register. This permits 4-way branches with 3 control store locations between each adjacent pair of destination addresses.

The output of switch 701-12 addresses a specific location within control store 701-2 which causes the read out of a microinstruction word having a format illustrated in FIG. 6B. Referring to that Figure, it is seen that this microinstruction word is coded to include a number of different fields which are used to control the various functional units within processor 700. Only those fields which are related to the present example will be described herein.

| Bits | Field | Description |
|---|---|---|
| Bits 0-1 | | Reserved for Future Use. |
| Bit 2 | EUFMT | Defines which format the EU is to operate with. EUFMT-O specifies a first microinstruction format while EUFMT = 1 specifies an alternate microinstruction format. |
| Bits 3-5 | TRL | TR Low Write Control. Write control of EU temporary registers TR0-TR3. 0XX No change / 100 Write TR0 / 101 Write TR1 / 110 Write TR2 / 111 Write TR3 |
| Bits 6-8 | TRH | TR High Write Control. Write control of EU temporary registers TR4-TR7. 0XX No change / 100 Write TR4 / 101 Write TR5 / 110 Write TR6 / 111 Write TR7 |
| Bits 9-12 | ZOPA | ZOPA Switch Control. Selects the output of ZOPA switch. (0) 0000 TR0 / (1) 0001 TR1 / (2) 0010 TR2 / (3) 0011 TR3 / (4) 0100 TR4 / (5) 0101 TR5 / (6) 0110 TR6 / (7) 0111 TR7 / (8-11) 10XX RDI / (12) 1100 ZEB / (13) 1101 ZEB / (14) 1110 ZEB / (15) 1111 0 (disable) |
| Bits 13-16 | ZOPB | ZOPB Switch Control. Selects the output of ZOPB switch. |
| Bits 17-18 | ZRESA | ZRESA Switch Control. Selects the output of ZRESA switch. 00 ALU / 01 Shifter / 10 Scratchpad/RDI switch / 11 ZDO |

-continued

| | | |
|---|---|---|
| Bits 19-20 | ZRESB | ZRESB Switch Control. |

Selects the output of ZRESB switch.
- 00 ALU
- 01 Shifter
- 10 Scratchpad/RDI switch
- 11 ZDO

| | | |
|---|---|---|
| Bit 21 | RSPB | Scratchpad Buffer Strobe Control. |

Strobes RSPB with ZRESB data.
- 0 No strobe
- 1 Strobe RSPB

| | | |
|---|---|---|
| Bit 22 | RSP | Scratchpad Write Control. |

- 0 Read scratchpad
- 1 Write scratchpad

| | | |
|---|---|---|
| Bit 23 | ZSPDI | Scratchpad/RDI Switch Control. |

Selects the output of the Scratchpad/RDI switch.
- 0 Scratchpad output
- 1 RDI

| | | |
|---|---|---|
| Bits 24-25 | ZSHFOP | Shifter Operand Switch Control. |

Selects the left operand to the Shifter.
- 00 ZOPA output
- 01 EIS output
- 10 0
- 11 Select 0 or −1 depending on bit 0 of right operand to Shifter.

| | | |
|---|---|---|
| Bits 24-27 | ALU | ALU Function Control. |

Selects the operation applied to the two inputs (A and B) to the ALU.

| | | |
|---|---|---|
| Bits 24-29 | N/A | |
| Bits 26-31 | RFU | Reserved for Future Use. |
| Bits 30-31 | ZALU | ALU Switch Control. |

Selects the output of ZALU switch.

| | | |
|---|---|---|
| Bits 32-33 | NXTD | Next Descriptor Control. |

Strobes RBASB and RDESC registers.
- 00 RBASB←00
  RDESC←00
- 01 RBASB←01
  RDESC←01
- 10 RBASB←Alt
  RDESC←10
- 11 No strobes (default)

| | | |
|---|---|---|
| Bits 32-35 | CCM | Control constant field referenced by the CONTF field. |
| Bits 34-35 | IBPIPE | IBUF/Pipeline Control. |

Selects the reading of IBUF or the pipeline operation.
- 00 No operation
- 01 Read IBUF/ZDI (Alt)
- 10 Type 1 Restart Release or
- 11 Type 4 Restart Wait

| | | |
|---|---|---|
| Bits 36-37 | FMTD | |

Selects the loading of various CU registers and indicates the interpretation to be given to the MEMADR field for small CU control.
- 00 No operation
- 01 RADO←ASFA
- 10 RADO←ZRESB
- 11 RADO←ASFA

| | | |
|---|---|---|
| Bits 38-40 | MEMADR | Cache Control. |

Selects cache operations. The complete interpretation for this control is a function of the FMTD control.
- 000 No operation
- 001 Read Sgl
- 010 Load Quad
- 011 Preread
- 100 Write Sgl
- 101 Write Dbl
- 110 Read Sgl Trans (for FMTD = 11 only)
- 111 Write Sgl Word (for FMTD = 11 only)

| | | |
|---|---|---|
| Bit 41 | ZONE | Zone Control. |

Indicates zone or no zone for small CU control.
- 0 No zone
- 1 Zone

| | | |
|---|---|---|
| Bits 42-44 | TYPA | Type A Flag. |

Indicates the type A overlayed fields being used.
- 000 Type A = 0 fields
- .
- .
- .
- 100 Type A = 4 fields -continued

| | | |
|---|---|---|
| Bits 44–46 | PIPE | Pipeline Control |
| | | Selects the type of restart to be initiated. |
| | 000 | No operation |
| | 001 | Type 1 Restart and Release |
| | 010 | Type 2 Restart |
| | 011 | Type 3 Restart |
| | 100 | Type 4 Restart |
| | 101 | Type 5 Release |
| | 110 | Type 6 Restart |
| Bits 44–47 | AUXREG | Auxiliary Register Write Control |
| | | Selects an auxiliary register or combinations to be strobed with data selected by the AUXIN control field. |
| | (0) 0000 | No strobe |
| | (1) 0001 | RRDXA |
| | (2) 0010 | R29 |
| | (3) 0011 | R29, RRDXA, FRL, RID |
| | (4) 0100 | RRDXB |
| | (5) 0101 | RTYP |
| | (6) 0110 | RBASA |
| | (7) 0111 | RBASA, RTYP |
| | (8) 1000 | RBASB |
| | (9) 1001 | RDESC |
| | (10) | RBASA, R29, RRDXA |
| Bits 45–46 | TYPB | Type B Flag. |
| | | Indicates the Type B overlayed fields being used. |
| | 00 | Type B = 0 fields |
| | . | |
| | . | |
| | . | |
| | . | |
| | . | |
| | 11 | Type B = 3 fields |
| Bit 47 | RSC | RSC Strobe Control. |
| | | Strobes the RSC register. (Shift Count) |
| Bit 47 | RSPA | RSPA Strobe Control. |
| | | Strobes the RSPA register. |
| Bits 47–48 | N/A | |
| Bit 47 | RAAU | RAAU Strobe Control. |
| | | Strobes RAAU register. |
| Bits 48–49 | ZLX | ZLX Switch Control. |
| | | Selects the output of the ZLX switch. |
| Bits 48–49 | ZSPA | ZSPA Switch Control. |
| | | Selects the output of the ZSPA switch. |
| Bits 48–50 | AUXIN | Auxiliary Register Input Control. |
| | | Selects data to be strobed into auxiliary register(s). |
| Bit 49 | ZADSP | ZADSP Switch Control. |
| | | Selects the output of ZADSP switch. |
| Bits 50–52 | ZSC | ZSC Switch Control. |
| | | Selects the output of ZSC switch. |
| Bits 50–52 | ZRSPA | ZRSPA Switch Control |
| | | Selects the output of ZRSPA switch. |
| Bits 50–52 | ZAAU | ZAAU Switch Control. |
| Bit 51 | RSIR | RSIR Register Strobe. |
| | | Strobes the RSIR register as a function of the AUXIN field. |
| Bit 53 | RDW | R1DW, R2DW Register Strobe. |
| | | Strobes the R1DW or R2DW register as a function of the RDESC register. |
| Bits 53–54 | ZLNA | ZLNA Switch Control. |
| | | Selects output of ZLNA switch. |
| Bits 54–57 | CONTF | Miscellaneous Flip-Flop Control. |
| | | Selects one of four groups of control flip-flops to be set or reset by the control constant field (CCM). The flip-flops include those of blocks 704-104 and 704-110. |
| Bits 55–56 | ZLNB | ZLNB Switch Control. |
| | | Selects the output of ZLNB switch. |
| Bits 55–56 | ZSPA(2) Type A = 2) ZSPA Switch, RSPA Register Control. | |
| | | Selects ZSPA switch output and strobes RSPA register. |
| Bits 57-58 | ZPC | ZPC Switch Control. |
| | | Selects the output of ZPC switch. |
| Bits 59–62 | ZXP | ZXP Switch, RXP Register Bank Control. |
| | | Selects ZXP switch output and the RXP register into which it will be written. |
| Bits 59–63 | ZLN(1) | ZLN Switch, RLN Register Bank (Type A = 1) Control. |
| | | Selects ZLN switch output and the RLN register into which it will be written. |

| | | |
|---|---|---|
| Bits 59-60 | ZPA | ZPA Switch Control. |
| | | Selects the output of ZPA switch. |
| | | 00 = RP0 |
| | | . |
| | | . |
| | | . |
| | | 11 = RP3 |
| Bits 61-62 | ZPB | ZPB Switch Control. |
| | | Selects the ouptut of ZPB switch. |
| | | 00 = RP0 |
| | | . |
| | | . |
| | | . |
| | | 11 = RP3 |
| Bits 63-64 | ZXPL | ZXPL Switch Control. |
| | (Type A = 0) | |
| | | Selects the output of ZXPL switch. |
| | | 00 = RXPA |
| | | . |
| | | . |
| | | . |
| | | 11 = RXPD |
| Bit 63 | ZLN(2) | ZLN Switch, RLN Register Bank |
| | (Type A = 2) | Control. |
| | | Selects ZLN switch output and the RLN register into which it will be written. |
| Bits 63-66 | RDIN | RDI In Control. |
| | | Selects the data to be strobed into the RDI register and selects one of the modification control fields (MF$_1$ - MF$_3$, TAG) of an instruction word. RDI strobe may also be controlled by the MISCREG field. |
| Bit 64 | ZXPL(1) | ZXPL Switch Control. |
| | (Type A = 1) | |
| | | Selects the output of ZXPL switch. |
| Bits 64-68 | ZRPAC | ZRPA Switch, ZRPC Switch, RP0-3 |
| | (Type A = 2) | Register Bank Control. |
| | | Selects ZRPC and ZRPA switch outputs and the RP0-3 register into which the ZRPA output will be written. |
| Bits 65-66 | ZXPR | ZXPR Switch Control. |
| | (Type A = 0) | |
| | | Selects the output of ZXPR switch. |
| Bits 65-66 | ZXP(1) | ZXP Switch, RXP Register Bank |
| | (Type A = 1) | Control. |
| | | Selects ZXP switch output and the RXP register into which it will be written. |
| Bits 67-68 | ZPD | ZPD Switch Control. |
| | (Type A = 0) | |
| | | Selects the outut of ZPD switch. |
| Bit 67 | ZRPAC(4) | ZRPA Switch, ZRPC Switch, RP0-3 |
| | (Type A = 4) | Register Bank Control. |
| | | Selects CP4 from ZRPA switch and strobes the RP1 register. |
| Bit 67 | TYPD | Type D Flag. |
| | | Type D Flag which indicates type D overlayed fields. |
| Bit 68 | ZRPB(4) | ZRPB Switch, RP4-7 Register |
| | (Type A = 4) | Bank Control. |
| | | Selects 0 from ZRPB switch and strobes the RP4 register. |
| Bits 68-71 | MEM | Cache Memory Control. |
| | | Selects the cache operation in conjunction with the SZ control. |
| | | (0) 0000 No operation |
| | | . |
| | | . |
| | | . |
| | | (15) 1111 Write Remote |
| Bits 68-70 | IBUF | IBUF Read Control. |
| | | Selects the destination of IBUF data when reading IBUF. |
| Bits 69-73 | AXP | ZXPA Switch, ZXPB Switch, AXP |
| | (Type A = 0) | Adder, ZAXP Switch, RE Register Control. |
| | | Selects ZXPA and ZXPB switch outputs, the AXP adder function applied to them, and the ZAXP switch output. Also strobes the RE register. |
| Bits 69-73 | ZRPB | ZRPB Switch, RP4-7 Register |

-continued

| | |
|---|---|
| | (Type A = 1) Bank Control.<br>Selects ZRPB switch output and the RP4-7<br>register into which it will be written. |
| Bits 69-71 | ZRPAC-3  ZRPA Switch, ZRPC Switch, RP0-3<br>(Type A = 3)  Register Bank Control.<br>Selects ZRPC and ZRPA switch outputs and the<br>RP0-3 register into which the ZRPA output will<br>be written. |
| Bits 72-74 | ZRPB(3)  ZRPB Switch, RP4-7 Register<br>(Type A = 3)  Bank Control.<br>Selects ZRPB switch output and the RP4-7<br>register into which it will be written. |
| Bits 72-73 | SZ  Size/Zone Cache Control.<br>Controls cache operations in conjunction with<br>the MEM control field. |
| Bits 74-78 | ZRPB(0)  ZRPB Switch, RP4-7 Register<br>(Type A = 0)  Bank Control.<br>Selects ZRP switch output and the RP4-7 regis-<br>ter into which it will be written. |
| Bits 74-78 | AL  ZALA Switch, ZALB Switch, AL<br>(Type A = 1)  Adder Control.<br>Selects ZALA and ZALB switch outputs and the<br>AL adder function applied to them. |
| Bit 74 | TYPE  Type E Flag.<br>Type E flag which indicates the type E over-<br>layed fields. |
| Bits 75-77 | ZXP(3)  ZXP Switch, RXP Register Bank<br>(Type A = 3)  Control.<br>Selects ZXP switch output and the RXP register<br>into which it will be written. |
| Bits 75-78 | MISCREG  Miscellaneous Register Control.<br>Selects various operations on miscellaneous<br>registers (e.g. RBIR, RDI, RLEN, RSPP). |
| Bits 75-78 | ZDO  ZDO Switch Control.<br>Selects the output of the ZDO switch. |
| Bit 78 | ZIZN  ZIZN Switch Control.<br>Selects the output of ZIZN switch. |
| Bits 79-83 | AP  ZAPA Switch, ZAPB Switch, AP<br>Adder Control<br>Selects ZAPA and ZAPB switch output and the<br>AP adder function applied to them. |
| Bits 79-81 | ZLN(3)  ZLN Switch, RLN Register Bank<br>(Type A = 3)  Control.<br>Selects ZLN switch output and the RLN register<br>into which it will be written. |
| Bits 79-83 | ZLN(4)  ZLN Switch, RLN register Bank<br>(Type A = 4)  Control.<br>Selects ZLN output and the RLN register into<br>which it will be written. |
| Bits 80-81 | RAAU  RAAU/RE Register Strobe.<br>Selects the data to be strobed into the RAAU<br>and RE registers by controlling several<br>switches and adders in the unit 722. |
| Bits 82-83 | AP(3)  ZAPA Switch, ZAPB Switch,<br>(Type A = 3)  AP Adder Control.<br>Selects ZAPA and ZAPB switch outputs and the<br>AP adder function applied to them. |
| Bit 84 | ZRSC  ZRSC Switch Control.<br>(Type A = 0)<br>Selects the output of ZRSC Switch. |
| Bits 85-86 | N/A |
| Bit 86 | RLEN  RLEN Strobe Control.<br>(Type A = 3)<br>RLEN strobes are also controlled by hardware<br>or by the MISCREG field. |
| Bit 87 | FMT  Format Flag.<br>Indicates the type of format. |
| Bits 88-89 | TYPF<br>Indicates the type of overlayed fields.<br>00 = Scratchpad Address<br>01 = Character Unit Control<br>10 = Multiply/Divide Control<br>11 = N/A |
| Bit 90 | RFU  Reserved for Future Use. |
| Bits 90-93 | CHROP  Character Unit Op Code.<br>Selects main operation to be performed by<br>Character Unit and the interpretation to be<br>given to the CHSUBOP field.<br>(0) 0000 No operation<br>(1) 0001 Load Data<br>(2) 0010 MOP Execute<br>(3) 0011 Compare Single<br>(4) 0100 Compare Double |

-continued

|  |  |  |  |
|---|---|---|---|
|  | (5) | 0101 | Load Register |
|  | (6) | 0110 | Update CN |
|  | (7) | 0111 | Undefined |
|  | (8) | 1000 | Set RCH Operation A |
|  | (9) | 1001 | Set RTF1 |
|  | (10) | 1010 | Set RTF2 |
|  | (11) | 1011 | Set RTF3 |
|  | (12) | 1100 | Set RCN1 |
|  | (13) | 1101 | Set RCN2 |
|  | (14) | 1110 | Set Edit Flags |
|  | (15) | 1111 | CH Unit Clear |

Bit 90     RCH     RCH Register Strobe.
Strobes the OP1 RCH register.
Bit 90     RFU     Reserved for Future Use.
Bits 91–97     SPA     Scratchpad Address.
Contains the address that may be used to address the EU scratchpad.
Bits 91–93     N/A
Bits 94–97     CHSUBOP     Character Unit Sub-Op Code.
Selects the detailed function of the Character Unit or it may contain a constant. The interpretation of this field is a function of the CHROP control as shown below.

CHROP = 0000     No Operation

| $CHSUBOP_{0-3}$ |  |
|---|---|
| XXXX | No interpretation |

CHROP = 0001     Load Data Operation

| $CHSUBOP_{0-1}$ | (Suboperation) |
|---|---|
| 00 | OP1 Load by CN1 and TF1 |
| 01 | OP1 Load in Reverse by CN1 and TF1 |
| 10 | OP2 Load by CN2 and TF2 and Test Character |
| 11 | Load Sign |
| $CHSUBOP_{2-3}$ | (Fill Control) |
| 1X | Fill character loaded to ZCU |
| X1 | Fill character loaded to ZCV |

CHROP = 0010     MOP Execute Operation

| $CHSUBOP_{0-1}$ | (Suboperation) |
|---|---|
| 00 | MOP set by CN2 |
| 01 | MOP Execute |
| 10 | Undefined |
| 11 | Undefined |
| $CHSUBOP_{2-3}$ |  |
| XX | No interpretation |

CHROP = 0101     Load Register Operation

| $CHSUBOP_{0-1}$ | (Selects output of RCH) |
|---|---|
| $CHSUBOP_{2-3}$ | (Selects output of ZOC switch) |

CHROP = 1011     Set RTF3 Operation

| $CHSUBOP_{0-1}$ | (Selects data to be inspected for 00, indicating a 9-bit character. |
|---|---|
| $CHSUBOP_{2-3}$ | (Constant Field) |

CHROP = 1110     Set Edit Flags Operation

| $CHSUBOP_{0-3}$ | (Constant selecting flags to be set) |
|---|---|
| 1XXX | Set ES (End suppression) |
| X1XX | Set SN (sign) |
| XX1X | Set Z (zero) |
| XXX1 | Set BZ (Blank When Zero). |

Bits 94–97     RFU     Reserved for Future Use.
Bits 97–97     N/A
Bit 98     TYPG     TYPE G FLAG.
Indicates the type of overlayed fields.
    0 = BRADRU field
    1 = IND6 field
Bit 99     GO     State of Conditional Branch Test.
Bits 99–106     BRADRU     Branch Address Upper.
Bits 99–106     IND6FLD     Indicator Control.
Selects an indicator.
Bits 99–106     Bit 99 = 0 specifies a change indicators instruction.
Bit 99 = 1 specifies a set/reset indicators instruction (set or reset indicated by X bit 0 or 1 respectively.

| Bits 100–104 | 105 = 1 | 106 = 1 |
|---|---|---|
| 0000 |  |  |
| . |  |  |
| . |  |  |
| . |  |  |

|              |         |                          |                   |
|--------------|---------|--------------------------|-------------------|
|              | 1100X   | Exhaust 1                | Exhaust 2         |
|              | 1101X  | Exhaust 3                | N/A               |
|              | 1110X  | Exhaust 1<br>Eff.        | Exhaust 2<br>Eff. |
| Bits 107–112 | BRADRL | BRANCH ADDRESS LOWER.<br>Contains lower portion of an ECS address used for branching. | |
| Bit 113 | EXIT | Selection of Exit Switch Control.<br>Selection of Exit indicates end of microprogram. | |
| Bits 114–116 | ZCSBRA | ZCSBRA Switch Control.<br>Defines the position to be selected in a Control Store Branch Address Switch. | |
| Bits 117–118 | N/A | | |
| Bits 119–123 | INDGRP | Conditional Branch Indicator Group Control.<br>The first two bits (119–120) select the "group" of microprogram indicators. The last three bits (121–123) select the "set" of indicators within each "group". | |
| Bit 124 | TYPH | Type H field.<br>Indicates the type H overlayed fields.<br>0 = INDMSKU<br>··· ··· ··· ··· VCTR field | |
| Bits 125–128 | INDMSKU | Conditional Branch Indicator Mask Upper.<br>Contains the upper 4 bits of the indicator mask in tye H = 0 field. | |
| Bits 125–129 | VCTR | Vector Select.<br>Selects the branching vectors to be strobed into the RVB0, RVB1 and RVB2 registers. The most significant bit (125) determines which of two groups 0 or 1, 2 or 3 and 4 or 5 will be strobed into the RVB0, RVB1 and RVB2 registers respectively. The remaining 3 bits select the vector within each group. | |
| Bits 129–132 | INDMSKL | Conditional Branch Indicator Mask Lower.<br>Contains the lower 4 bits of the indicator mask. | |
| Bits 133–135 | N/A | | |
| Bits 136–139 | CNSTU | Constant Upper.<br>Contains the upper 4 bits of the constant field. | |
| Bits 140–143 | CNSTL | Constant Lower.<br>Contains the lower 4 bits of the constant field. | |

Control Logic Unit 704-1

This unit includes the sequence decode logic circuits 704-100 as mentioned whose outputs feed a plurality of I cycle control state flip-flops of block 704-102. These flip-flops in response to signals from the circuits 704-100 as well as microinstruction signals from register 701-4 (DEMRO38-40 which correspond to the mem address field MEMADR of FIG. 6b) generate the various required I cycle control states required for the execution of program instructions. It is assumed that block 704-102 also includes gate circuits which generate register hold signals [HOLDE00 which are distributed throughout the processor 700.

As seen from FIG. 3c, the I cycle control state flip-flops receive control input signals via control lines including a line CPSTOP00 from cache unit 750. As explained herein, the state of the CPSTOP00 line determines whether processor operation continues in that when the line is forced to a binary ZERO, the hold or enabling signals for the I cycle control state flip-flops and other storage registers are also forced to ZEROS. The hold signals corresponding to signals [HOLDI00 and [HOLDE00 operate to hold or freeze the state of the processor 700. Since no incrementing of the control store address can take, the ECS control store reads out the same microinstruction word. The signals [HOLDI and [HOLDE are set in accordance with the following Boolean expressions: [HOLDI=CACHE HOLD+TERMB (DREQ-IF-DIR)+HOLD REL wherein the state of signal CACHE HOLD corresponds to the state of signal CPSTOP, the states of signals TERMB (DREQ-IF-DIR) are binary ONES during control state FPOA when the cache command specifies an I fetch or direct operation and the signal HOLD REL is a binary ONE until switched to a binary ZERO by the generation of a microprogram release signal; and [HOLD E=[HOLD I.

In accordance with the teachings of the present invention, each of the instructions which comprise the repertoire of the preferred embodiment of the present invention are assigned one of a number of control sequence codes (CCSS) as follows which enable efficient instruction cycle processing. These different classes of hardwired sequences are established to permit the kind of performance desired for the execution of the entire repertoire of instructions listed in Appendix A. The hardwired sequence selected for each instruction is chosen to provide the particular type of performance required for efficient pipeline operation.

The instructions are designated by mnemonics which are listed in an instruction index included in an appendix A. A number of the instructions are described in the publication "Series 60 (Level 66)/6000 MACRO Assembler Program (GMAP)" by Honeywell Information Systems Inc., copyright 1977, order number DD08B, Rev. 0.

| CCS-S | SEQUENCE | INSTRUCTION TYPES |
|---|---|---|
| 000000 | LD-SGL | LDA, LDQ, LCA, LCQ, ADA, ADQ, ADLA, ADLQ, AWCA, AWCQ, SWCA, SWCQ, CMPA, CMPQ, CANA, CANQ, ANA, ANQ, ORA, ORQ, ERA, ERQ, SBA, SBQ, SBLA, SBLQ, LDE, SZN, FSZN, LXLN, LDI |
| 000001 | LD-SGL-DEL | FLD, CNAA, CNAQ, ADE |
| 000010 | LD-SGL-ESC | MPY, MPF, DIV. DVF, CWL, CMG, CMK, FAD, UFA, FSB, UFS, FMP, UFM, FDV, FDI, LDT, FCMP, FCMG, CCD, ADL, XEC, CIOC, LPDBR, LDDSA, LDO, LDPn, LDEAn, PAS, LARn, AARn, NARn, LDWS |
| 000011 | LD/STR-SGL-ESC | ASA, ASQ, AOS, SSA, SSQ, ANSA, ANSQ, ORSA, ORSQ, ERSA, ERSQ, ARAn, ARNn, SARn. |
| 000100 | LD-HWU | LDXn, LCXn, ADXn, ADLXn, SBXn, SBLXn, ANXn, ORXn, ERXn, CMPXn |
| 000101 | LD-HWU-DEL | CNAXn |
| 000110 | LD-HWU-ESC | LBAR, LBER, LMBA, LMBB |
| 000111 | LD/STR-HWU-ESC | ASXn, SSXn, ANSXn, ORSXn, ERSXn |
| 001001 | LD-DBL | LDAQ, LCAQ, ADAQ, ADLAQ, SBAQ, SBLAQ, ANAQ, ORAG, ERAQ, CMPAQ, CANAQ, DFLD |
| 001010 | LD-DBL-ESC | CNAAQ, XED, LDSS, LDAS, LDPS, LDDSD, DFSB, DUFS, DFMP, DUFM, DFDV, DFDI, DFCMP, DFCMG, DFAD, DUFA, QFLD, QFAD, QFSB, QFMP, QSMP, |
| 010000 | STR-SGL | STA, STQ |
| 010001 | STR-HWU | STXn |
| 010010 | STR-DBL | STAQ |
| 010100 | RD-CLR | |
| 011000 | EFF-ADR | EAA, EAQ, EAXn, NEG |
| 011010 | EFF-ADR-ESC | ARS, QRS, LRS, ALS, QLS, LLS, ARL, QRL, LRL, ALR, LLR, QLR, GTB, NEGL |
| 100000 | TRF | TRA, TZE, TNZ, TMI, TPL, TRC, TNC, TOV, TEO, TEU, TTF, TRTN, TRTF, TTN, TMOZ, TPNZ |
| 100100 | ESC | RCCL, LCCL, RPT, RPD, RPL, STCA, STCQ, STBA, STBQ, MMkE, DRL, ILLOC, CCAC, AWD, SWD, A9BD, A4BD, A6BD, ABD, S9BD, S4BD, S6BD, SBD, CAMP, RPN, RIMR, SFR, LLUF, LIMR, RRES, HALT, SDRn, EPAT. |
| 100101 | ESC-LD | MLDA, MLDQ, MLDAQ |
| 100110 | ESC-ST | MSTA, MSTQ, MSTAQ |
| 101000 | NO-OP | NOP |
| 101001 | TSXN | TSXN |
| 101010 | ESC-EA | LREG, SREG, STC1, STC2, FSTR, DFSTR, STE, SBAR, TSS, RET, SPL, LPL, STI, SBER, SMBA, SMBB, SAREG, SXLn, EPAT, EPPRn, CLIMB, STWS, STPn, LAREG, QFSTR, LDDn, FST, DFST, FRD, DRD, FNEG, FNO, STDn, LDAC, LDQC, SZNC, DIS |
| 101100 | DEL-STR-SGL | STT, STZ, SPDBR, STPDW, STPTW, STDSA, STO |
| 101101 | DEL-STR-DBL | STSS, STDSD, STTA, STTD, STPS, STAS, SDZn, QFST |
| 110000 | BIT | CSL, CSR, SZTL, SZTR, CMPB |
| 110001 | MTM-MTR | MTM, MTR |
| 110011 | MRL | MRL |
| 110100 | TCT | TCT |
| 110101 | TCTR | TCTR |
| 110110 | SCAN-FWD | SCM, SCD |
| 110111 | SCAN-REV | SCMR, SCDR |
| 111000 | NUM2 | MVN, MVNX, CMPN, CMPNX, AD2D, AD2DX, SB2D, SB2DX, DV2D, DV2DX, MP2D, MP2DX |
| 111001 | MVT | MVT |
| 111010 | CONV | BTD, DTB |
| 111011 | MLR | MLR |
| 111100 | NUM3 | AD3D, AD3DX, SB3D, SB3DX, MP3D, MP3DX, DV3D, DV3DX |
| 111101 | EDIT | MVE, MVNE, MVMEX |
| 111110 | CMPC | CMPC |
| 111111 | CMPCT | CMPCT |

The different assignable hardwired sequences operate in the following manner.

LD-SGL SEQ

This hardwired sequence causes the control unit to generate the effective address during a FPOA cycle and to cause the cache unit to execute a read single memory cycle of operation. When indirect addressing is specified, control is transferred to an address preparation microprogram routine. The requested data is loaded into the RDI register at the completion of the cache cycle and is then available for use during the execution cycle.

LD-SGL-DEL SEQ

This 2T hardwired sequence is the same as LD-SGL except that a 1T delay state is entered after the FPOA cycle (FPOA→FDEL→FPOA-NEXT).

LD-SGL-ESC SEQ

Same as LD-SGL sequence except the pipeline is stopped after the current FPOA cycle is completed (escape state is entered).

LD-HWU SEQ

Same as LD-SGL sequence except that bits 00–17 of RDI register are loaded from the cache unit. Memory bits 00–17 and zeros are loaded in $RDI_{18-35}$.

LD-HWU-DEL

This 2T hardwired sequence is the same as the LD-HWU sequence except a 1T delay state is entered after state FPOA. The sequence is FPOA→FDEL→FPOA-NEXT.

LD-HWU-ESC

This sequence is the same as the LD-HWU sequence except the pipeline is stopped after the completion of the current FPOA cycle.

LD/STR-SGL-ESC

This sequence is the same as the LD-SGL-ESC sequence except that in addition to normal read checks, a write check is also performed. This sequence is used for "READ-ALTER-REWRITE" types of operation.

LD/STR-HWU-ESC

This sequence is the same as LD/STR-SGL-ESC sequence except that bits 00–17 of the RDI register are loaded from the cache unit memory bits 00–17 and zeros are loaded in $RDI_{18-35}$.

LD-DBL SEQ

This sequence causes the control unit to generate the effective address during a FPOA cycle and causes the cache unit to execute a read double memory cycle of operation. The requested data is returned to the RDI register on two consecutive cycles.

LD-DBL-ESC SEQ

This sequence is the same as the LD-DBL sequence except the escape state is entered after the current FPOA cycle is completed.

STR-SGL SEQ

This 2T sequence (FPOA→FSTR) causes the control unit to generate an effective address and causes the cache unit to execute a write single memory cycle (FPOA) of operation. During the second cycle (FSTR) the register to be stored (as selected by the contents of the RRDX-A register) is transferred to the RADO register as follows ZX→ZDO→ZRESB→RADO.

STR-HWU SEQ

This sequence is the same as the STR-SGL sequence except that the cache unit causes a change only in bits 00–17 of a memory location.

STR-DBL SEQ

This 3T sequence (FPOA→FSTR-DBL→FSTR) causes the control unit to generate an effective address and causes the cache unit to execute a write double memory cycle (FPOA control state) of operation. During the second and third cycles the EVEN and ODD data words (as selected by the contents of the RRDX-A register) are sent to the cache unit.

RD-CLR SEQ

This sequence is the same as the LD-SGL sequence except the cache unit causes the memory location to be read and also cleared.

EFF-ADR SEQ

This sequence causes the control unit to load bits 00–17 of the RDI register with an effective address that is generated during a FPOA cycle while bits 18–35 of the RDI register are loaded with zeros.

EFF-ADR-ESC SEQ

This sequence is the same as the EFF-ADR sequence except the pipeline is stopped after the FPOA cycle (Escape state is entered).

TRF SEQ

This sequence causes the control unit to request two four word blocks of instructions (during FPOA and FTRF control states) for the instruction buffer in preparation for a transfer of control or any branch operation.

ESC SEQ

This sequence causes the pipeline to be stopped after the FPOA cycle. No memory cycles are initiated and there is no address preparation performed.

ESC-LD & ESC-STR SEQS

These sequences are the same as ESC and are used for executing testing operations.

ESC-EA SEQ

This sequence causes the control unit to load a temporary register with an address pointer generated during the FPOA cycle. The pipeline is stopped after FPOA.

DEL-STR-SGL SEQ

This 3T sequence (FPOA-FDEL-FESC) causes the control unit to generate an effective address during state FPOA and then switch to a second FDEL state. This allows the cache unit an extra cycle to fetch the data to be stored. At the completion of FDEL, the cache unit is caused to initiate a write single memory cycle of operation and the hardware switches to FESC state. The data to be written is transferred to the RADO register under microprogram.

DEL-STR-DBL SEQ

This sequence is the same as DEL-STR-SGL except the sequence is 3T. The sequence is FPOA→FDEL→

FESC. A write double memory cycle is initiated during state FDEL. Data is transferred to the RADO register on the cycles following state FDEL under microprogram control.

EDIT SEQ (EIS)

This sequence is FPOA-FPOP1-FPOP2 followed by FPOP3. There is an escape to microprogram control which following the setting up of registers, tables, etc. required for processing edit operands signals the hardware control circuits to enter state FPOP3.

The remaining EIS sequences can be considered as having states similar to that of the EDIT sequence.

TSXn

This sequence causes the processor 700 to compute the effective address and update the instruction counter. During a second cycle (FTSX1), the updated instruction counter is loaded into the RDI register for subsequent transfer to the specified index register. The computed effective address is loaded into TEAO and the processor 700 transfers control to that location (FPI-INIT).

The hardwired control states used during I cycle processing in accordance with the present invention and a brief description of the operations performed during such control states or cycles are as follows.

| I CYCLE CONTROL STATE/CYCLE | DESCRIPTION |
|---|---|
| FPOA | The FPOA Prepare Operand state is the starting control state for all instructions. During FPOA, an address is calculated and the op-code is translated via the CCS control store to control further actions. |
| FPOP | The FPOP Prepare Operand Pointer state is used to process EIS instruction descriptors. |
| FSTR | The FSTR Store state is used to transfer "store" data into the RADO register in the case of instructions requiring sequences, and to transfer the second (odd) word of double precision data to the RADO register in the case of instructions requiring store double sequences. |
| FSTR-DBL | The FSTR-DBL Store Double state is used to transfer the first (even) word of double precision data to the RADO register for those instructions requiring store double sequences. |
| FESC | The FESC Escape state is used to provide a variable delay to the I-Process pipeline. During state FESC, the ESC control store has complete control over the processor 700, and determines when to restart the I-Process pipeline. |
| FDEL | The FDEL Delay state provides a 1T delay to the I-Process pipeline. |
| FWF-IND | The FWF-IND Wait for Indirect Word state provides the control to transfer signals on the ZDI lines into the RSIR register. |
| FTRF | The FTRF Transfer state is used to request that the cache unit fetch a second block of instructions for loading into the I Buffer and to strobe a first instruction for a new instruction stream into the processor 700 RBIR register. |
| FTRF-NG | The FTRF-NG Transfer No Co state |

-continued

| I CYCLE CONTROL STATE/CYCLE | DESCRIPTION |
|---|---|
| | is used to reload the I Buffer address registers with the old instruction stream address. |
| FPIM-1 | The FPIM-1 Prepare Instruction Address for I Buffer Maintenance Type 1 state is enetered when the I Buffer runs out of instructions. During the FPIM-1 state, a block of instructions is requested for the I Buffer. Also, during the FPIM-1 state, a processor-hold condition occurs when the cache unit signals a Cache-Miss condition. |
| FPIM-2 | The FPIM-2 Prepare Instruction Address for I Buffer Maintenance Type 2 state enables a second block of instructions to be requested for the I Buffer. During the FPIM-2 state, there is no-processor-hold condition generated when the cache unit signals a Cache-Miss condition. Also, during state FPIM-2, the next instruction is strobbed into the processor's RBIR register. |
| FPI-INIT | The FPI-INIT Prepare Instruction Address for I Buffer Initialize state is used to reload the I Buffer after a transfer (store compare) or after a Type 3 restart. |
| FWF-IBUF | The FWF-IBUF Wait for I Buffer Ready state is entered when an instruction is needed from the I Buffer, and the I Buffer is in a not ready condition. |
| FPIM-EIS | The EIS Prepare Instruction Address for O Buffer Maintenance EIS state is entered following the FPOA cycle of an EIS multi-word instruction whenever the I Buffer does not contain enough descriptors to complete the processing of the instruction. |
| FWF-DESC | The FWF-DESC Wait for Descriptor state is entered when a descriptor is needed from the I Buffer, and the I Buffer is in a not ready condition. |
| FIDESC | The FIDESC Indirect to Descriptor state is the control state used to process EIS indirect descriptors. |
| FWF-IDESC | The FWF-IDESC Wait for Indirect Descriptor control state provides the control to transfer the cache word applied to the ZDI lines to the RSIR register 704-154. |
| FIT-I | The FIT-I Indirect and Tally Indirect control state is used to process non-EIS descriptors specifying indirect and tally indirect address modifications. |
| FIRT | The FIRT Indirect and Register Test control state is entered during the processing of n0n-EIS descriptors specifying indirect and register address modifications to determine whether the processing of that type of address modification is completed. |
| FTSX1 | The FTSX1 Transfer and Set Index control state is used to transfer the updated contents of the instruction counter to the RDI register in the case of transfer and set index instructions. |

As seen from FIG. 3c, signals corresponding to the I cycle control states are applied as inputs to a plurality of control flip-flops of block 704-104, decoder circuits of block 704-106, a number of control logic circuits of block 704-108 and to a plurality of control flag indicator flip-flops of block 704-110. It is also seen that the various indicator flip-flops of block 704-110 also receive microinstruction input signals via lines MEMD054-57 from execution control unit 704-4.

Figure 3D:
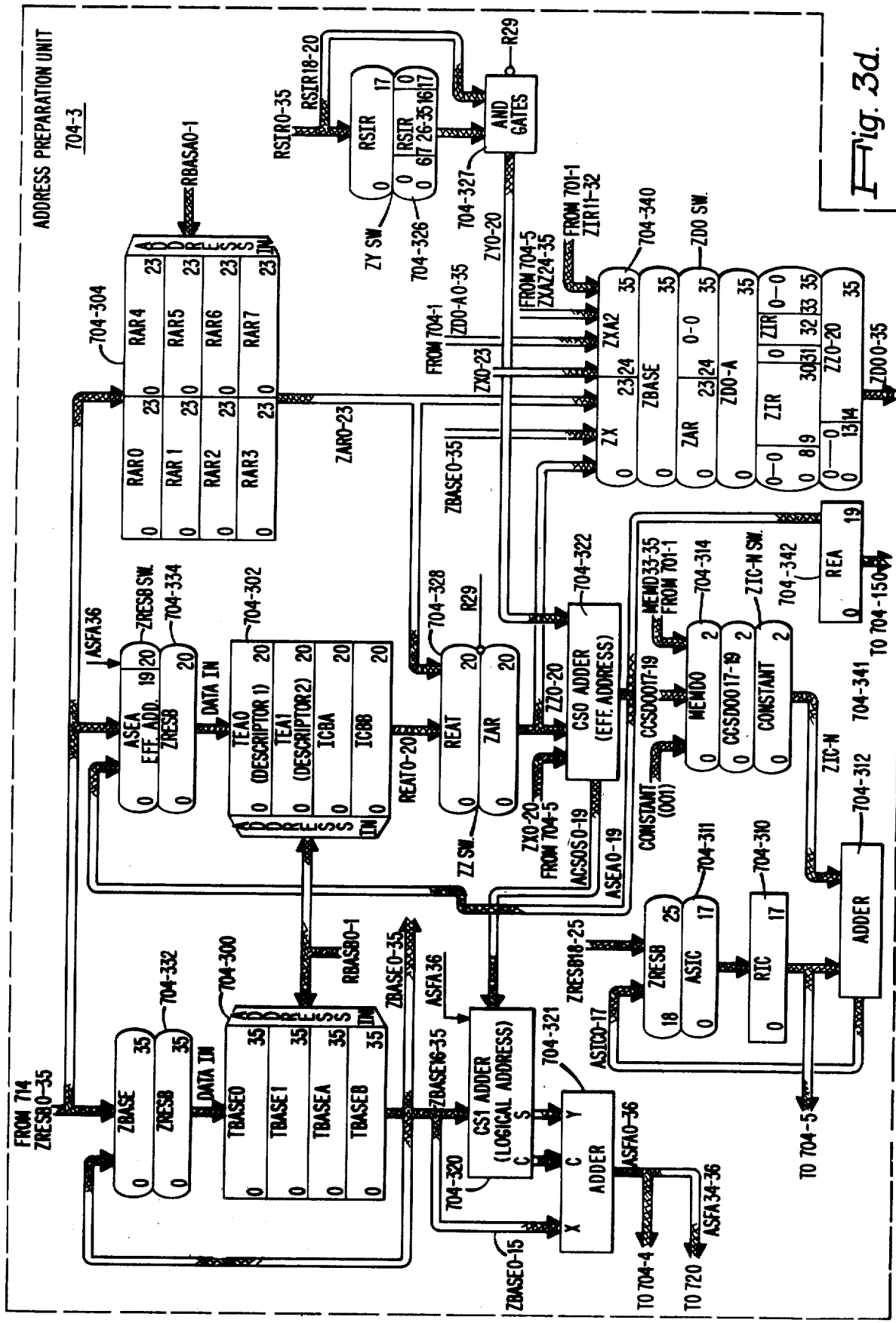

As seen from FIG. 3d, signals generated by the hardware control logic circuits 704-108 fall into one of three groups as a function of the units whose operations are being controlled. That is, the groups are instruction buffer control, hardware control and hardware memory control.

In each case, each group of signals are ored together with equivalent signals generated by other sources and then decoded. The other sources correspond to fields within the two different formats of the microinstruction word of FIG. 6a which are loaded into RCSR register 704-112 from the ECS output register 701-4.

One field corresponds to bits 32-83 of one format (large CU) and another field (short CU) corresponds to bits 32-41 of another format. These fields are decoded by a decoder 704-114 into the sets of bits indicated and combined within the decoders 704-116, 704-124, 704-126 and 704-128 as shown. Further decoding is done by the circuits of blocks 704-118, 704-135 and 704-120. The results of decoding such fields are either distributed throughout processor 700 or are stored in an RMEM register 704-130, an RSZ flip-flop 704-132, an FREQDIR flip-flop 704-136 and an FREQCAC flip-flop 704-134.

Additional decoding of the large and short CU fields and signals from the I cycle state circuits of block 704-112 is done via a decoder 704-106 and 704-107. The decoder 704-106 generates control signals for loading different ones of the registers and for enabling various multiplexer/selector switches within the processor 700. The decoder 704-107 operates to generate signals for setting and resetting a pair (RBASB) of base pointer B flip-flops 704-144. Other combinations of these signals are used to set and reset the descriptor number flip-flops of blocks 704-140 and 704-142.

As seen from FIG. 3c, the decoder 704-116 receives a control signal [EXH00 generated by the decoder circuits of block 704-117. These circuits receive signals from the RDESC register 704-140 and signals from the exhaust flip-flops of block 701-1. In accordance with the states of these signals, the circuits force signal [EXH00 to a binary ZERO to inhibit the generation of a cache memory command upon the occurrence of an exhaust condition. The signal [EXH00 is generated in accordance with the following Boolean expression:

[EXH000=DESCO·FE11+DESC1·FE2+DESC-2·FE3.

The flip-flop FNUM is normally set in response to the CCS-OP field of the microinstruction word. When set to a binary ONE, this indicates that the descriptor being processed is a numeric type.

The different flip-flops of block 704-104 will now be discussed in greater detail. In greater detail, the flip-flop FCHAR provides certain changes in the control of address generation. When the FCHAR flip-flop is set to a binary ONE during the processing of a load type instruction specifying character modification, then the contents of the RDI register is not changed under hardware control. This allows the RDI register to be loaded with data under microprogram control prior to starting the pipeline. Also, if the FCHAR flip-flop is set to a binary ONE during a store type instruction specifying character modification, then the execution address for this instruction is modified under hardware control to point to a unique address of the microinstruction sequence in the ECS control store that is to process this type of instruction.

The flip-flop FDT-FOUR provides additional control on the readout of the address register (ZAR$_{0-19}$) of block 704-304. Flip-flop FADR-WD provides additional control for the ZDO switch 704-340. When this flip-flop is set to a binary ONE, then the ZAR position of the ZDO switch is forced to select a word address. The flip-flop FADR-B provides additional control for the ZDO multiplexer switch. When set to a ONE, then the ZAR position of the ZDO switch is forced to select a byte address. The flip-flop FNUM is normally set in response to the CCS-OP field of the microinstruction word. When set to a binary ONE, this indicates that the descriptor being processed is a numeric type. The flip-flop FIG-LEN provides additional control over the loading of registers within the unit 722 (length registers) and over memory operations. When set to a binary ONE, the RXP and RLN registers within unit 722 are not loaded from the RSIR register 704-154 during control states FPOP.

The FINH-ADR flip-flop inhibits the operation of the address preparation unit 704-3. When set to a binary ONE, an address cycle (FPOA/FPOP) consists of adding the contents of a temporary effective address register REA-T+ZERO. The register REA-T will have been loaded with the address prior to doing a FPOA/FPOP cycle. The FABS flip-flop enables the generation of absolute addresses. When set to a binary ONE, a 24-bit absolute address is used. As concerns the flag or indicator flip-flops of block 704-110, flip-flop FID when set to a binary ONE provides an indication that indirect address modification during an instruction is required on the descriptor loaded into the RSIR register.

The FRL flip-flop when set to a binary ONE indicates that the length is specified in a register associated with the instruction loaded into various instruction registers. The three flip-flops FINDA, FINDB and FINDC provide indications used in processing memory type instructions. Flip-flop FINDA is set to a binary ONE when length is specified in a register or when flip-flop FAFI is set to a ONE. Flip-flop FINDB is set to a binary ONE when the descriptor does not include nine bit characters. The flip-flop FINDC is set to a binary ONE when the descriptor does include six bit characters.

The FAFI flip-flop is set to a binary ONE when the processor circuits detect that indicator bit 30 of IR register 701-41 was set to a binary ONE during the execution of an EIS instruction indicative of a mid instruction interrupt (required to adjust pointer and length values because of interrupt). The FTRGP, FTNGO and FTRF-TST flip-flops are set to binary ONES in conjunction with transfer type instructions. More specifically, the FTRGP flip-flop provides a microprogram indication of being set to a binary ONE when the processor circuits detect the read out of a transfer type of instruction during the execution of an execute double (XED) or repeat (RPTS) instruction. The FTNGO flip-flop provides a microprogram indication of being set to a binary ONE when the condition of transfer signalled by the execution control unit 701 was transfer NO GO (i.e., transfer did not take place). The FTRF-TST flip-flop of this group indicates when set to a binary ONE that the previous instruction executed by processor 700 was a transfer type instruction and that the current I cycle is to be executed conditioned upon the presence of a transfer GO (TRGO) signal from control unit 701.

Additionally, the circuits of block 704-110 include a number of flip-flops used in performing indirect addressing operations under hardwired control for other than EIS instructions. These include FIR, FIRT, FIRL and FRI flip-flops which are switched to binary ONES as functions of the different types of indirect address modifications required to be performed. For example, the FRI flip-flop signals a register then indirect address modification and is switched to a binary ONE when a register indirect (RI) indicator is a binary ONE. The FIR flip-flop is switched to a binary ONE when an indirect then register (IR) indicator is a binary ONE. This flip-flop signals the beginning of an indirect then register address modification. The FIRL flip-flop is switched to a binary ONE when an indirect then tally indirect (IT-I) indicator is a binary ONE. This flip-flop signals a last indirect operation. Another flip-flop TSX2 provides an indication used in processing transfer and set index instructions while a STR-CRP flip-flop is used during the processing of store instructions.

As seen from FIG. 3c, the outputs from the control flag flip-flops of block 704-110 are applied as inputs to the branch indicator circuits of block 701-1. Also, output signals from the control flag flip-flops are also applied as inputs to the I cycle flip-flops of block 704-102.

Register Section 704-150

As seen from FIG. 3c, the control logic unit 704-1 further includes a register section 704-150. This section contains the basic instruction register (RBIR) 704-152, the secondary instruction register (RSIR) 704-154, a base pointer A register (RBASA) 704-156 used for selecting one of the address registers RAR0 through RAR7 of block 704-304, a read index register A (RRDXA) 704-158 used for selection of index registers included within section 704-5 (not shown) and for selection of outputs from the ZDO multiplexer switch 704-340, a read index A save (RRDXAS) register 704-159, and a descriptor type register (RTYP) 704-160 indicating the type of data characters being pointed to by the descriptor value (e.g. 9-bit, 6-bit, 4-bit). The section 704-150 further includes a 1-bit instruction/EIS descriptor register designated R29 of block 704-162. The state of this bit in conjunction with the contents of the RBAS-A register 704-158 are used to select the particular address register used for address preparation. When register R29 of block 704-162 is set to a binary ZERO, this indicates that none of the address registers of block 704-304 are used during address preparation. The last registers of section 704-150 include the data in register (RDI) of block 704-164 and a read index register B (RRDXB) pointing to registers used by execution unit 714.

As seen from FIG. 3, the RBIR register 704-152 is loaded via a two position switch 740-170 connected to receive signals from the sources indicated (i.e., a switch ZIB-B 704-172 and lines ZDI 0–35). The RSIR register 704-154 similarly receives signals from the ZDI lines and switch 704-172. The RBASA register 704-156 receives signals from the ZDI line 0–2 in addition to a further switch ZBASA of block 704-174. The RRDXA register and RTYP register receive signals from the ZDI lines as well as a switch 704-176 and switch 704-178 as shown. Also, the RRDXA register receives signals from the RRDXAS register 704-159.

The switch 704-172 is a two position switch which receives inputs from the switches ZIB and ZRESB from the cache unit 750 and execution unit 714 respectively. The switch 704-174 is a three input switch which receives two inputs from the execution units 714 and the output of the ZIB switch of cache unit 750.

Switch 704-176 is a four input switch which receives two of its inputs from the execution unit 714 and a single input from cache unit 750. The first position of the ZRDXA switch 704-176 selects the output of a ZRDXM switch 704-185. One position of this switch provides a tag field value from bit positions 5–8, 14–17, and 32–35 of the RBIR register 704-152 and bit positions 32–35 of the RSIR register 704-154 selected from ZIDD switch 704-180 and a two position ZMF switch 740-176.

The second position of switch 704-185 provides a constant value from the output of the ECS output register 704-1 (CCM field 32-34). The signals from the lines ZIDD 27-35 are applied as inputs to control flag flip-flops of block 704-110. The switch 704-178 receives an input from the control store 704-2, an input from cache unit 750 and an input from execution unit 714.

The data input register 704-164 receives a series of input signals from a ZIDD switch 704-180 which connects in series to a ZDIA switch 704-181 whose output provides one input of a further switch 704-182 which directly loads into the RDI register 704-164. The ZDIA switch 704-181 provides a further input to a three input switch 704-183 which receives the other inputs indicated from cache unit 750 and execution unit 714.

The ZIDD switch 704-180 receives an effective address via switch 704-186 from the address preparation unit 704-3 as well as inputs from the RBIR register 704-152, the RSIR register 704-154 and a two position ZMF switch 740-187. The positions 18 through 35 of the REA position of switch 704-180 are derived from the ZDIA switch 704-181 as shown. The ZDIA switch 704-181 receives signals from the ZDI lines 0–35, a constant value generated from the inputs to a first switch position in addition to signals from the output of the ZIDD switch 704-80 and the ZRESB switch in execution unit 714. The switch 704-182 receives the output of the ZDIA switch and signals from the ZDI lines 0–35. The RRDXB register 704-189 is loaded by a three position switch 704-188. The switch receives via a first position signals from a RREG register included in the execution unit, a constant value from control store 701-2 via a second position and signals from the ZIDD switch via a third position.

The section 704-150 further includes a two position switch 704-185 and a scratchpad pointer register 704-186 whose output is used by the AACU 722 to form addresses for access to the scratchpad memory of the EU 714. The first switch position provides a constant value and is selected under hardware control (FPOA.R29). The second switch position applies as an output the contents of the RBASA register 704-156. This position is selected under both hardware and microprogram control (i.e., FPOA.R29 or MISCREG field).

It will be appreciated that the required timing signals for operating section 704 as well as other sections of processor 700 and cache unit 750 are provided by centrally located clock circuits. For example, in the preferred embodiment of FIG. 1, the clock circuits are located within the input/output processor 200. Such clock circuits can be considered as conventional in design and can comprise a crystal controlled oscillator and counter circuits. The timing or clocking signals from such clock circuits are distributed in a conventional manner to the various portions of the system of FIG. 1 for synchronized operation.

Address Preparation Unit 704-3

The address preparation unit 704-3 includes a number of registers and adders. The registers include a number of base registers (i.e., TBASE0 through TBASEB) of block 704-300 used for storing descriptor values of an instruction, a pair of temporary effective address registers (TEA0, TEA1) and a pair of instruction counters (ICBA, ICBB) included within block 704-302 used for addressing the instruction buffer and eight address registers (RAR0 through RAR7) of 704-304 used during address preparation operations. The unit 704-3 also includes an instruction counter 704-310.

The adders include adder 704-312 used to update instruction counter 704-310 via switches 704-311 and 704-314 and a pair of adders 704-320 and 704-322. The adder 704-322 is used to generate an effective address value which is stored in a register 704-342 applied as an input of the control unit 704-1. The effective address is generated from a number of sources which include ZY switch 704-326 whose output is applied via a number of AND gates of block 704-327, selected address registers of block 704-304 or selected temporary address registers TEA0 and TEA1 of block 704-302 applied via another switch 704-328 or the index address signals ZX0-20 from unit 704-5. Additionally, adder 704-322 is used to update the contents of the instruction counter of the cache instruction buffer.

As seen from FIG. 3d, the outputs from adder 704-322 are also applied as an input to the adder 704-320. The adder 704-320 is used to combine base value stored in any one of the temporary base registers TBASE0 through TBASEB with the address signals ACSOS0-19 from adder 704-322. The resulting bits are applied as an input to a further adder network 704-320 which generates a logical address which is applied to the lines ASFA0-36 via an adder 704-321. This adder sums the operand inputs together with the carry inputs from blocks 704-300 and 704-320. The effective address is used to obtain an absolute address when the system is operated in a paged mode. Since this operation is not pertinent to the present invention, it will not be disucssed further herein. For further information regarding such address development, reference may be made to U.S. Pat. No. 3,976,978.

The temporary base registers of block 704-300 are loaded via a switch 704-332. The switch receives an input from the execution unit 714 and the output from block 704-300. The execution unit 714 applies further inputs to the registers of block 704-302 via a switch 704-334 as well as to the address registers of block 704-304. An output multiplexer (ZDO) switch 704-340 enables the selection of the various registers within the address preparation unit 704-3 and unit 704-5 for transfer of their contents to the execution unit 714 via lines ZDO 0-35. Also, the ZDO switch 704-340 enables the contents of various ones of the registers and control flip-flops of unit 704-1 to be read out via a fourth position (ZDO-A). The fifth position enables the states of various indicators within the control store circuits of block 701-1 to be selected for examination.

Figure 3F:
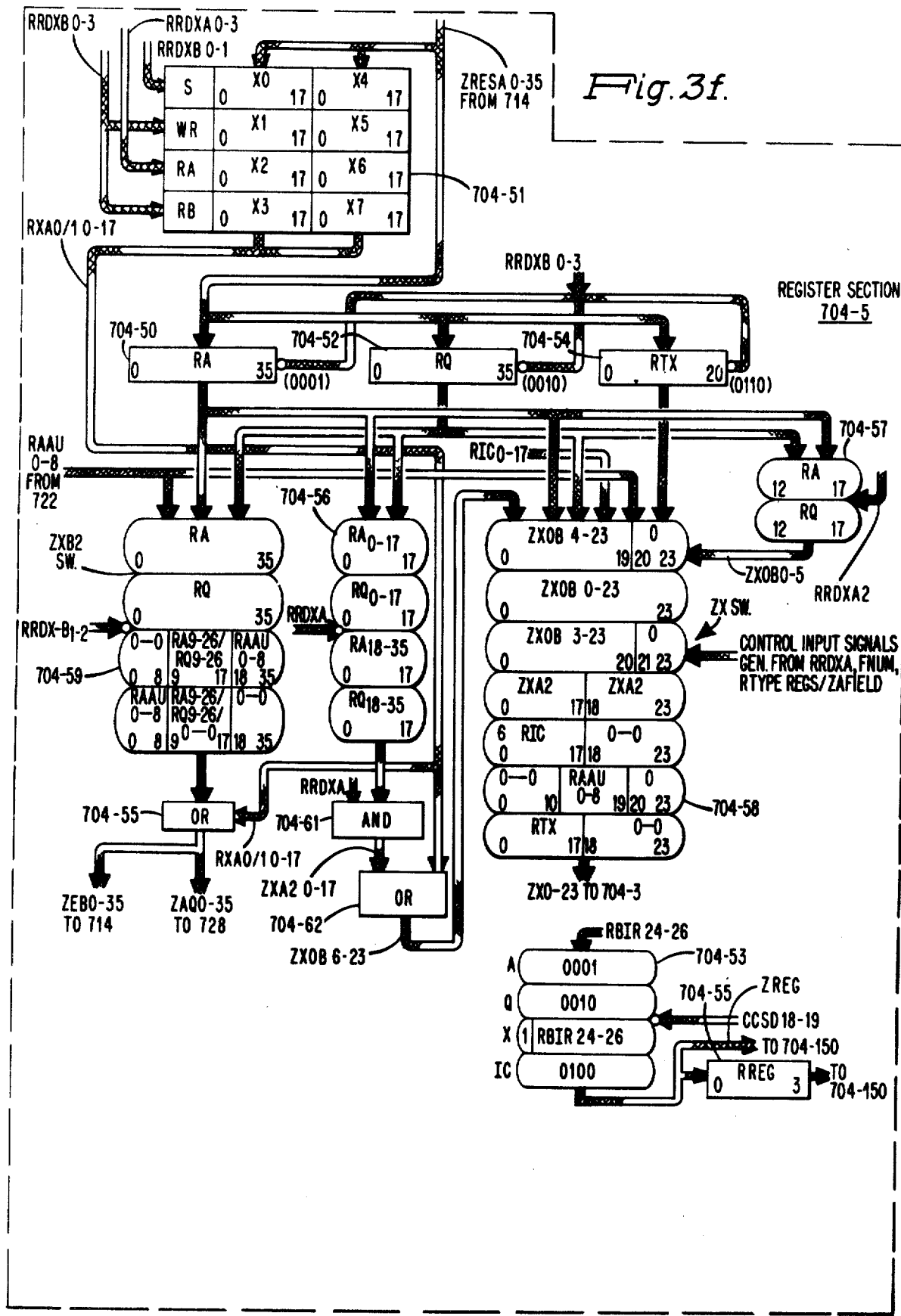

XAQ Register Section 704-5 and Data Address Output Section 704-4 FIGS. 3e and 3f The section 704-5 includes the accumulator RA register 704-50, the quotient QA register 704-52 and the temporary index (RTX) register 704-54 utilized by the control logic unit 704-1. Additionally, it includes a group of eight index (X0-7) registers included within block 704-51. These registers are loaded via the ZRESA bus in execution unit 714. The selection of the register to be loaded is controlled by the contents of the RRDXB register 704-189. It will be noted from FIG. 3f that selection of outputs from the registers of block 704-51 is controlled by the contents of both the RRDXA and RRDXB registers 704-158 and 704-189 respectively. The contents of program visible registers RA, RQ, X0-7 and RTX are read out to the unit 704-3 via a ZXA2 switch 704-56, a ZXOB switch 704-57 and a ZX switch 704-58. From there, the register contents can be transferred to execution unit 714 or to cache unit 750 via the ZDO switch in unit 704-3.

As seen from FIG. 3f, the output of ZXA2 switch 704-56 is applied via an AND gate 704-61 and an OR gate 704-62 in accordance with the contents of RRDA register 704-158.

The selection of outputs from the above mentioned switches are controlled by the contents of the RRDXA register 704-158, the FNUM flip-flop of block 704-104 and the RTYP register 704-160 in addition to bits 55-77 (ZX field). The ZXA2 switch 704-56 provides for the read out of the upper or lower 18 bits of RA and RQ registers 704-50 and 704-52 for address modification. The selected output signals from the ZXA2 switch and the ZXOB switch are applied to the ZX switch together with the RAAU, RTX and RIC register signals as shown.

The ZX switch selects as an output, bits of the RA/RQ/X registers for a 9-bit character string via a first position, X/RA/RQ bits for a 6-bit character string via a second position, RA/RQ/X bits for a 4-bit character string via a third position and X/RA/RQ bits for word type modification.

Positions five, six and seven are used for selecting the contents of the RAAU register, RIC register and RTX register respectively. A further ZXB2 switch 704-59 provides a second path to the unit 714 for read out of the program visible registers via the lines ZEB0-35. A similar path to the unit 728 is provided via the lines ZAQ0-35.

The section 704-4 includes the registers and switches used for transferring commands and data to the cache 750. Such transfer operations normally require at least two cycles, one for sending an address and another for sending the data. Bits 5-8 of a command word are derived from the output of a four position switch 704-40. This switch receives a first constant value via a first position, the contents of a RZN register 704-42 via a second position, a second constant value via a third position and a third constant value via a fourth position.

Bits 1-4 of a command are applied by the circuits of block 704-1 to an OR gate circuit 704-44 together with bits 5-8. The OR gate 704-44 also receives via a ZADO switch 704-46 bits 1-8 of an RADO register 704-48. The RADO register 704-48 is an address and data out register which receives via a first position of a ZADOB switch 704-48 a logical (virtual) address from address preparation unit 704-3 via the lines ASFA0-35 and data output signals from the EU 714 via lines ZRESB0-35. The positions of the ZADOB switch 704-48 is under the control of the FMTD field for small CU format and the RADO field in the case of large CU format.

As seen from the Figure, either the ZZN1-8 bits or the ZADO bits 1-8 are applied as outputs to the RADO/ZADO lines as a function of the state of control signal [RADO-ZADO. Bits 0 and 9 are always binary ONES while bits 10-35 are furnished by the RADO register 704-46.

Additionally, the unit 704-5 of the preferred embodiment includes a four position selector ZREG switch 704-53 which is controlled by the coding of the CCSR field. The output of the ZREG switch is used to load the RREG register 714-42 with constant values or with signals corresponding to bit positions 24-26 of the RBIR register 704-152. On a next cycle, signals corresponding to the contents of RREG register 714-42 are transferred to the RRDXB register 704-189. In the case of instructions which reference CCS codes specifying instructions within the STR-SGL or STR-DBL classes, the same signals are transferred to the RRDXA register 704-158. Further, the contents of RREG register 714-42 may be loaded into RBASA register 704-156 under microprogram control.

Figure 3G:
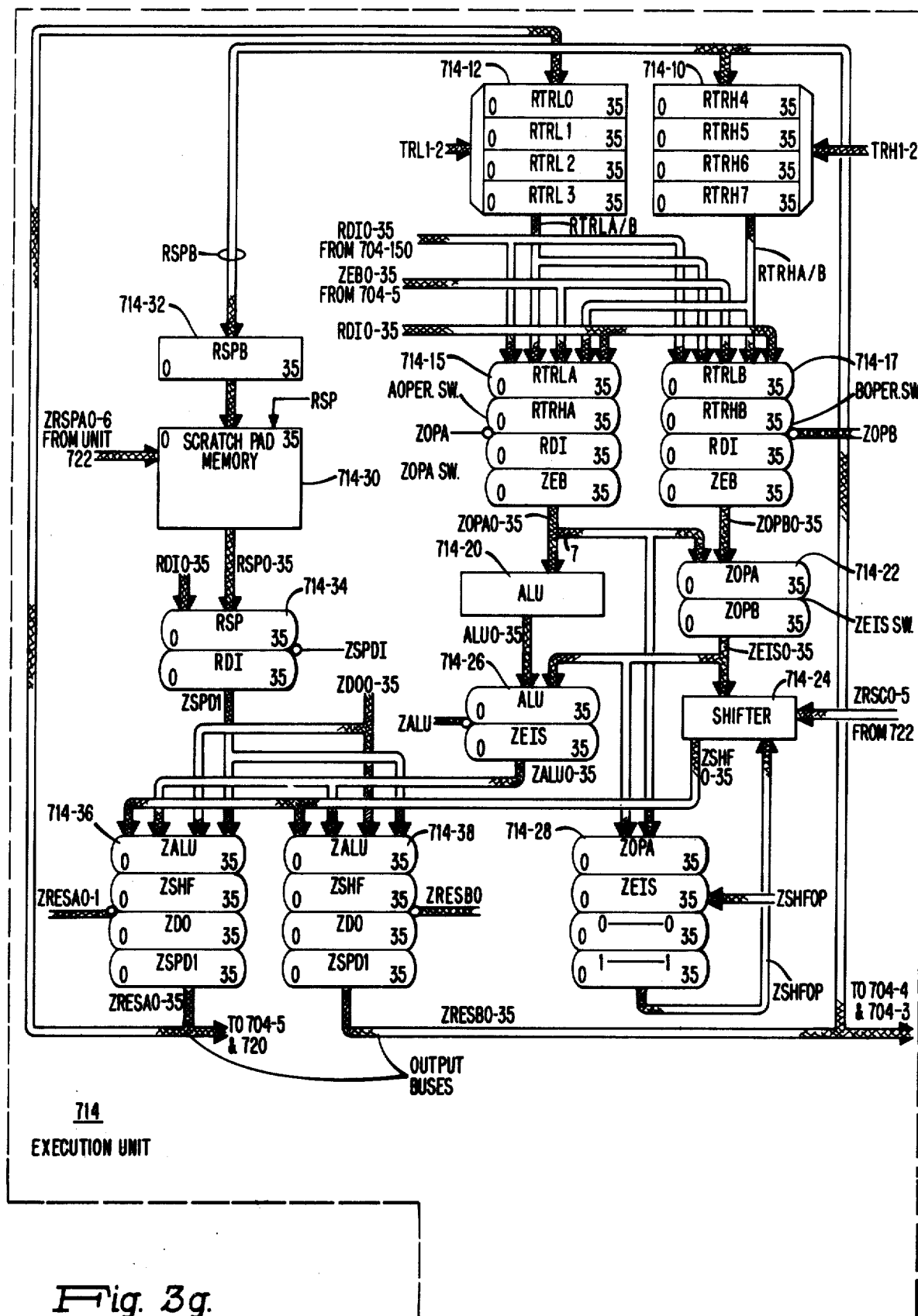

Execution Unit 714 - FIG. 3g

The unit 714 includes as major units, addressable temporary register banks 714-10 and 714-12, an arithmetic logic unit (ALU) 714-20, a shifter 714-24 and a scratchpad memory 714-30. Additionally, the unit 714 includes a number of multiposition data selector switches 714-15, 714-17, 714-22, 714-26, 714-28, 714-34, 714-36 and 714-38 to provide flexibility in selecting operands and output results.

In operation, the operands are selected via the ZOPA switch 714-15 and ZOPB switch 714-17 from one of the registers of the banks 714-12 and 714-10 or from other input lines such as ZEB0-35 or RDI0-35 as shown. The ALU 714-20 and shifter 714-24 performs operations upon the selected operands and the results are selected via the switches 714-24, 714-36 and 714-38 to be applied to the output bus lines ZRESA 0-35 and ZRESB0-35. Similarly, the contents of a scratchpad location selected via the contents of a scratchpad pad buffer 714-32 can be read out via the switches 714-34, 714-36 and 714-38.

The selected output results or other data are thereafter loaded into other registers within processor 700 including the temporary register banks 714-12 and 714-10 or the scratchpad memory 714-30 of execution unit 714.

In greater detail, the sources of operands are identical for both the ZOPA and ZOPB switches 714-15 and 714-17. The selection of switch position for the ZOPA switch and ZOPB switch is under the control of bits 9-12 and bits 13-16 of the microinstruction word. The ALU 714-20 performs logical, decimal or binary operations upon the selected operand data under the control of bits 24-28 of the microinstruction word of FIG. 6a.

The shifter 714-24 is a combinatorial logic network used to align, shift or rotate binary data under microprogram control. The input data signals from the ZSHFOP and ZEIS switches 714-28 and 714-22 can be viewed as being concatenated to form a single double word input. The shifter 714-24 provides a 36-bit output shifted in accordance with the shift count. The ZSHFOP switch 714-28 is controlled by bits 24-25 of the microinstruction word while the shift count is established by the sequence control constant fields (bits 138-143 of the microinstruction word of FIG. 6a which is appropriately selected via the auxiliary arithmetic control unit 722. For the purposes of the present invention, the ALU 714-20 and 714-24 may be considered conventional in design.

The scratchpad memory 714-30 provides a working space for storing various data required for the execution of certain instructions as well as various constants and descriptor values. For example, octal locations 10-15 are used to store an edit instruction table value required for carrying out edit operations. Writing into the scratchpad memory 714-30 involves first loading the RSPB buffer register 714-32 with input data applied via the ZRESB switch 714-38. During a next cycle, the contents of the register 714-32 are written into the location specified by the signals applied to the ZPSPA 0-6 lines by the AACU unit 722. Writing takes place when bit 22 of the microinstruction word (RSP field) is forced to a binary ONE.

As concerns the other switches, as mentioned, the results produced by the unit 714 are provided via the ZALU switch 714-26, the BSPDI switch 714-34, the ZRESA switch 714-36 and the ZRESB switch under microprogram control. The ZALU and ZSPDI switches provide a first level of selection to the ZRESA and ZRESB switches which provide a last level of selection. Since both the ZRESA and ZRESB switches have identical input sources, they can provide the same output data. The selection of ZALU switch data is under control of bits 30-31 (ZALU field) while the selection of ZSPDI data is under control of bit 23 (ZSPDI field). The selection of ZRESA and ZRESB data is under the control of bits 17-18 and bits 19-20 respectively of the microinstruction word of FIG. 6a.

The registers of banks 714-12 and 714-10 are addressed independently by bits 3-5 (TRL field) and bits 6-8 (TRH field) respectively. The first bit in each field specifies whether one of the four registers is to be addressed while the other 2 bits select the register to be addressed.

Character Unit 720 - FIG. 3h

It is seen that the unit 720 includes a bank of 4 registers 720-10, a number of registers 720-22, 720-24, 720-28, 720-30, 720-42, 720-46, 720-54, 720-63, 720-64, 720-68 and 720-70, conversion logic circuits 720-27, adder networks 720-32 and 720-34, comparator network 720-72 and a number of decoder/detector networks 720-36, 720-38, 720-44, 720-48, 720-50, 720-56, 720-58 and 720-74 interconnected via a number of multiposition selector switches 720-26, 720-40, 720-62, 720-12 through 720-20. The control and selection of such switches and the strobing of the various registers is under the control of a number of flip-flop circuits included in block 720-80 and a pair of zero detector circuits 720-82 and 720-84.

The RCH bank of registers 720-10 are used as operand buffer registers for storing information received from the EU 714 via the ZRESA lines 0-35. A first register (OP1) is used to store the operand specified by descriptor 1 or data sent to unit 728 or unit 722. A second register (OP2) is used to store the operand specified by descriptor 2. Third and fourth registers (TABLE ENTRY 1, TABLE ENTRY 2) are used to store edit insertion table entry values obtained from EU 714.

The RCN1 register 720-28 holds the actual character position data for descriptor 1 which is used to select a character to be selected by ZCU switch 720-12. The RCN2 register 720-30 holds signals designating the character position data of descriptor 2. The contents are used to select a character from switch 720-14.

The ZCU and ZCV switches 720-16 and 720-18 are under the control of the ZCU and ZCV flip-flops of block 720-80. The RCN 1 and RCN 2 registers 720-28 are loaded under the control of the CN1 and CN2 flip-flops of block 720-80 in response to signals generated by decoder 720-56. This is done as a function of the character type (4, 6 or 9-bit characters) defined by the contents of the RTF1 and RTF2 registers 720-42 and 720-46 and the starting character position signals generated by the conversion logic circuits of block 720-27. The circuits of block 720-27 convert signals ZCN0-2 applied via switch 720-26 corresponding to an input character position value into an output character position. For 9-bit characters, there is no conversion necessary (i.e., input character position=output character position).

The two bit RTF1 register 720-42 holds the character type information relative to descriptor 1 while the two bit RTF2 register 720-46 holds the character type information for descriptor 2. The one bit RTF3 register 720-52 holds the character type information for descriptor 3. When descriptor 3 consists of 9-bit characters, the detector 720-50 sets the RTF3 register to a binary ONE. In all other cases, the RTF3 register is set to a binary ZERO. As seen from the Figure, these registers are loaded via switch 720-40.

The five bit RMOP register 720-70 stores the "microoperation" values required for processing an edit instruction while the 4-bit RIF register 720-63 stores the information field (IF) values for such instructions. The 9-bit RCD register 720-64 is used during certain compare instruction operations for storing a first operand value. The 5-bit RTE8 register 720-68 stores the 5 most significant bits of the eighth edit insertion table entry value in response to a load signal generated by decoder 720-74 in response to a load command. The REFILL register 720-22 is used to store signals received from the unit 704-150 via the lines ZIDD 0–8. The RAD register 720-24 stores character position bits received from the unit 704-3 via the lines ASFA34-36.

The indicator flip-flops of block 720-80 store the result of an operation specified by the contents of the RMOP register 720-70. The indicators include a 2-bit MOP indicator A (MOPIA), a 3-bit MOP indicator B (MOPIB) and a 1-bit END indicator. The MOPIA indicators are decoded as follows:

00 go to MOP execute operation
01 go to LOAD MOP operation
10 Test MOPIB
11 N/A.

The MOPIB indicators provide additional status when the MOPIA indicators have the value "10". They are decoded as follows:

| | |
|---|---|
| 000 | test the state of a length 1 indicator for underflow (L1UDF set when the output of the AXP adder equals 0 means L1 exhausted) and the state of the CN1 overflow indicator (CN1 OVF). |
| 001 | test the state of a length 3 indicator for underflow (L3UDF set when the output of the AL adder equals 0, means L3 exhausted) and the state of a CN3 overflow indicator (CNLOVF) which is set when the output of the AP adder equals 0. |
| 010 | test the states of the L1UDF, CN1OVF, L3UDF and CN3OVF indicators. |
| 011 | decrement by 1, the length 2 value and test the states of the L3UDF and CN3OVF indicators during a first cycle and test the states of a length 2 underflow indicator (L2UDF) and the CN2OVF indicator during a second cycle. |
| 100 | test the states of the L3UDF, CN3OVF, L1UDF and CN1OVF indicators during a first cycle. Transfer the contents of the RAAU register to EU 714, decrement the length 3 value by 1 and increment the CN3 value by one during a second cycle. During a third cycle, test the states of the L3UDF and CN3OVF indicators. |
| 101 | load the table entry value. |
| 110 | change the table values. |
| 111 | N/A. |

The END indicator is set to indicate that the operation specified by the MOP value is complete.

The Auxiliary Arithmetic and Control Unit (AACU) 722 - FIG. 3i

The AACU 722 includes 3 parallel adder networks 722-2, 722-6 and 722-8 designated herein as a pointer adder network, an exponent adder network and a length adder network respectively. The pointer network 722-2 includes two banks of 4 registers (RP0-RP3 and RP4-RP7) 722-20 and 722-22. Each bank has its own multiposition switch (722-23 and 722-24) for selecting the data to be written therein and a pair of four position output switches for selecting the data to be read therefrom (i.e., switches 722-27, 722-28 and 722-29, 722-30). Additionally, bank 722-20 has a second input switch 722-32 whose output feeds the ZRPA switch 722-23 and provides for the selection of additional input data.

The ZRPC switch 722-32, the ZRPA switch 722-23 and the register bank 722-20 are jointly controlled by either bits 64–68 (ZRPAC field), bits 69–71 (ZRPAC-3 field) or bit 67 (ZRPAC-4 field) depending upon the microinstruction format. The ZRPA switch 722-23 can select one of the outputs from the ZRPC switch 722-32 via a first position, a value for loading a character offset for address modification/loading address register instructions for the character unit 720 via a second position and a character pointer value for a 9-bit character via a third position.

The ZPA switch 722-27 and the ZPB switch 722-28 select data from the RP0-RP3 register bank 722-20 under the control of bits 59–60 (ZPA) and bits 61–62 (ZPB) respectively. The ZRPB switch 722-24 and register bank 722-22 are jointly controlled by a single control field depending upon the type of microinstruction format bits 74–78 (ZRPB-0), bits 69–73 (ZRPB), bits 72–74 (ZRPB-3) or bit 68 (ZRBP-4). The ZRPB switch 722-4 can select the output of adder output switch 722-36 via a first position, an information field from the character unit 720 via a second position, a word or character pointer value for a 9-bit character via a third position and a character pointer value for a 9-bit character via a fourth and a fifth position.

The ZPC switch 722-29 and the ZPD switch 722-30 select data from the RP4-RP7 register bank 722-23 under the control of bits 57–58 (ZPC field) and bits 67–68 (ZPD field) respectively. As seen from FIG. 3, the outputs from the switches 722-27 through 722-30 are applied to the A and B operand switches 722-25 and 722-26. The outputs of these switches are applied to a pointer adder 722-34.

The ZAPA switch 722-25, the ZAPB switch 722-26 and the adder 722-34 are jointly controlled by a single control field bits 79-84 (AP field) or bits 82-83 (AP-3 field) depending upon the microinstruction format. As seen from the Figure, the ZAPA and ZAPB switches 722-25 and 722-26 select the outputs from the ZPA, ZPC, ZPB or ZPD switches or a constant value for application to adder 722-34.

A ZLX switch 722-36, a ZXC switch 722-38, a RSC register 722-40 and a ZRSC switch 722-42 operated under microprogram control are arranged to provide shift counts to the execution unit shifter. The ZSC switch 722-38 can also be used for loading data into the RP0-RP3 register bank 722-20 via the ZRPC and ZRPA switches 722-32 and 722-23 or into the RP4-RP7 register bank 722-23 via the ZRPB switch 722-24.

The selection of ZLX switch positions is controlled by bits 48-49 (ZLX field). The ZSC switch 722-38 is used to select one of the outputs of the ZLX switch 722-38 under the control of bits 50-52 (ZSC field). The RSC register 722-40 is loaded with the right most 6 bits from the output of the ZLX switch 722-38 under the control of bit 47 (RSC field). The two position ZRSC switch 722-42 selects which of two sources is to supply a shift count to the execution unit 714. Bit 84 (ZRSC field) selects either bits 138-143 (CNSTU/L field) or the RSC register 722-40 as a shift count source.

The last group of circuits shown in block 722-2 include a ZAAU switch 722-44 and a RAAU register 722-46 connected to receive the output of switch 722-44. The ZAAU switch 722-44 is used for transferring data to the register 722-46. From there the data is transferred via the section 704-5 to the execution unit 714 on the ZEB lines 0-35.

The inputs of the ZAAU switch 722-44 are selected by bits 50-52 (ZAAU field). The first position applies a 9-bit character output from the character unit 720 via the lines ZOC 0-8. The second and third positions are used for displaying the outputs from the length adder and exponent adders of blocks 722-6 and 722-8. The RAAU register 7-2-46 is loaded from the ZAAU switch 722-44 in response to bit 47 (RAAU field).

As seen from FIG. 3i, the exponent adder network 722-6 includes a single bank of 4 registers (RXPA-RXPD). The bank 722-60 has a multiposition switch 722-62 for selecting the data to be written therein and a pair of four position output switches for selecting data to be read therefrom (i.e., switches 722-64 and 722-66). The ZXP switch 722-62 and the RXPA-RXPD register bank 722-60 are controlled by bits 59-62 (ZXP field), bits 65-66 ZXP-1 field or bits 75-77 (ZXP-3 field).

A first position of the ZXP switch 722-62 is used to load the exponent result into register bank 722-60. The second position is used to store the result from the length adder 722-8. The next or third position is used for storing exponent values received from the character unit 720. Lastly, the fourth position is used for storing numeric scale factor information received from the RSIR lines 24-35.

The ZXPL switch 722-64 and ZXPR switch 722-66 select data from the register bank 722-60 under the control of bits 63-64 (ZXPL field) or bit 64 (ZXPL-1 field) and bits 65-66 (ZXPR field) respectively. The outputs from the switches 722-64 and 722-66 are applied as inputs to an A operand switch 722-68 and B operand switch 722-70 respectively. These switches apply selected inputs to a pair of 12-bit adders (AXP and AXM) of block 722-72 which generate an exponent output value applied to an output ZAXP switch 722-74. A single control field AXP (bits 69-73) controls the operation of the ZXPA switch 722-68, ZXPB switch 722-70, the adders, the ZAXP switch -22-74 and the loading of a RE register 722-76.

One adder AXM is arranged to receive the contents of the RE register 722-76 for providing absolute value when the sign of value generated by the AXP adder is negative (i.e., the AXP sign indicator not shown has control over the ZAXP switch selection).

The ZXPA switch 722-68 can select via a first position the contents of the RE register 722-76 or the output from the ZXPL switch 722-64 via a second position. The ZXPB switch 722-70 can select via a first position, a constant value, via a second position binary floating point exponent signals applied to th RDI lines 0-7, via a third position a numeric scale factor value applied to the RSIR lines 24-35, a fourth position the output from the ZXPR switch 722-66 and via a fifth position the output from the ZLNA switch 722-84.

The third adder network 722-8 for managing operand length data, similar to network 722-6, includes a single bank of 4 registers (RLN1-RLN4). The bank 722-80 has a multiposition switch 722-82 for selecting the data to be written therein and a pair of four position output switches for selecting data to be read therefrom (i.e., switches 722-84 and 722-86). The ZLN switch 722-82 and the RLN1-RLN4 register bank 722-80 are controlled by bits 59-63 (ZLN-1 field), bit 63 (ZLN-2 field) bits 79-81 (ZLN-3 field) or bits 79-83 (ZLN-4 field) depending upon microinstruction format.

The ZLN switch 722-82 applies the output of the length adder as an output via a first position, the output of the ZAXP switch 722-74 via a second position and a length field value from RSER lines 24-35 via a third position. Additionally, it applies a numeric length field value from RSIR lines 30-35 via a fourth position, a shift count value from RDI lines 11-17 via a fifth position and a length value from RCH lines 24-35 via a sixth position as inputs to register bank 722-80.

The ZLNA and ZLNB switches 722-84 and 722-86 select data from the register bank 722-80 under the control of bits 53-54 (ZLNA field) and bits 55-56 (ZLNB field) respectively as inputs to an A operand switch 722-88 and a B operand switch 722-90 respectively.

The outputs of these switches are applied as inputs to a 12-bit length (AL) adder 722-92. The ZALA switch 722-88, the ZALB switch 722-90 and AL adder 722-92 are all controlled by bits 74-78 (AL field). The ZALA switch 722-88 selects as an operand the output of the ZLNA switch via a first position, a constant field via a second position, the output of the ZPC switch via a third position and a numeric length field via a fourth position.

The ZALB switch 722-90 can select as an operand, a constant field via a first position, the output of the ZLNB switch 722-86 via a second position, the output of the ZXPL switch via a third position, a shift count value from RDI lines 11-17 via a fourth position, the output of the ZPC switch via a fifth position, the output of the ZPA switch via a sixth position and bit positions 6 and 7 of the ZPCswich 722-29 via a seventh position.

The unit 722 includes another group of circuits for furnishing a scratchpad address to unit 714. The circuits include a ZSPA switch 722-100, a RSPA register 722-102 and a ZRSPA switch 722-104, each controlled by bits 48–49 (ZSPA field), bit 47 (RSPA field) and bits 50–52 (ZRSPA field) respectively. The ZSPA switch 722-100 can select as an output, bits 91–97 corresponding to a scratchpad address field via a first position and the output of pointer adder 722-34 via a second position.

The ZRSPA switch 722-104 can select as an output, the contents of register 722-102 via a first position, a scratchpad address field via a second position and a descriptor value applied from the RSIR lines 32–35 via a third position and a value from the RSPR register of unit 704-150 via a fourth position. Additionally, the unit 722 includes a pair of registers 722-106 and 722-108 which are loaded with signals corresponding to bit positions 21–23 of RSIR register 704-154. One register is loaded when bit 53 of the microinstruction word of FIG. 6b or the FPOP flip-flop is a binary ONE. The registers are selected for loading in accordance with the states of the RDESC register 704-140 (00 or 10=R1DW; 011=R2DW).

The various control field signals used by the AACU 722 are derived from a decoder 722-110 which receives as inputs, the various microinstruction word bits loaded into a register 722-112.

CACHE UNIT 750 - FIG. 4

General Description

The cache unit 750 is divided into five primary sections: a command buffer section 750-1, a control section 750-3, a cache directory section 750-5, a cache storage section 750-7, instruction buffer section 750-9 and a diagnostic section 750-10.

Command Buffer Section 750-1

The command buffer section 750-1 includes a four word write command buffer 750-100 and a four word read command buffer 750-102 which are addressed via the counters 750-104 and 750-106. The write ZAC buffer 750-100 provides storage for a single ZAC write command while the read ZAC buffer 750-102 provides storage for up to four read ZAC commands.

The processor 700 transfers commands via the RADO/ZADO lines of interface 605 through the first position of a selector switch 750-110. The processor 700 transfers cache command information via the DMEM and DSZ lines through the first position of a selector switch 750-112. The states of these lines are held or stored in a register 750-114. As seen from the Figure, this information is also written into the buffers 750-100 and 750-102.

In addition to the cache command signals, the processor 700 sets a DREQCAC line. The processor 700 sets other control lines (e.g. HOLD-C-CU, CANCEL-C, CACFLUSH, BYPASS-CAC, READ IBUF, READ EVEN) when it wants to have the cache unit 750 perform other types of operations.

The states of the other control lines are decoded by a decoder 750-116 whose output is used to enable the ZAC buffers 750-100 and 750-102. Additionally, the processor 700 transfers zone bit signals for certain types of write commands via the lines DZD0-3. These signals are loaded into a RDZD register 750-132 via a switch 750-134. From there, the contents are applied via a switch 750-136 to a set of byte CBYSEL lines. Additionally, the signals on the DZO lines are applied to the MITS lines via a switch 750-139. Other zone signals (bits 5–8) are loaded into an RC address register 750-140 and thereafter applied to another set of byte CBYSEL select lines via a switch 750-142.

A plurality of busy bit registers 750-120 and 750-122 are used to determine which of the locations in the RZAC buffer 750-102 are available. The states of these registers are decoded via a priority decoder network 750-130 which selects the first available buffer location. The value developed is stored in the register 750-106 and is used as a write address for the read ZAC buffer 750-102. When the cache request involves doing a backing store (MEM memory) fetch (cache miss signaled by the state of signal BSPD), the appropriate busy bit or both busy bits are set in accordance with the number of SIU responses (ARDA signals) which will be generated. The busy bits are set by signals applied to a pair of lines SETBOTHBSY and SETONEBSY from a decoder, not shown, which decodes the particular command resulting in the application of a signal to one of the BSY lines. For example, a read single command (not bypassed) causes two SIU ARDA responses, each response for bringing in a pair of words. Thus, both busy bits are set. In the case of a read single bypass command, there is only one SIU ARDA response. Hence, only one busy bit is set. Resetting of the busy bits takes place in response to the ARDA line via a RSPB register 750-124 which receives signals from the SIU 100 via the RMIFS lines.

In greater detail, the contents of registers 750-120 and 750-122 are set in accordance with <u>the number</u> of ARDA responses as mentioned when a PENBIT signal is a binary ONE (i.e., the pending bit corresponding to the block is not set). The decoder circuit 750-130 decodes the states of the busy bits and sets counter register 750-106 to the appropriate address value specifying the next empty location within read RZAC buffer 750-102.

The same address signals PRACWO-1 are also applied to a second position of the switch 750-139 in the case of read commands. From there, the signals are loaded into a 4-bit MITS register 750-138 and applied to the MITS lines. The main memory 800 operates to return the coded signals to cache unit 750 via the MIFS lines upon transferring the requested pairs of data words of a block. Thereafter, the signals are loaded into a 4-bit RMIFS register 750-125 and then into the RSPB register 750-124 when the control state signal THCFD is a binary ONE. The received value causes the resetting of the appropriate busy bit indications stored in registers 750-120 and 750-122.

It will be noted that the RMIFS bit signals 2 and 3 are used to address read RZAC buffer 750-102 for read out of the appropriate command. Additionally, as explained herein, signals from an out pointer circuit (COUT), not shown, are used to access commands stored in read ZAC buffer 750-102. The busy bit indications stored in registers 750-124 and 750-126 are applied as inputs to the exclusive OR circuits of block 750-132. These circuits are operative to generate output signals indicative of the number of busy bits set. These outputs are in turn applied to different positions of a 4 position selector switch 750-133. By selecting the appropriate position or location, in response to the RMIFS bit signals 2 and 3, the switch 750-133 provides output signal SECRCV whose state determines when the cache unit 750 has received the second pair of words of a block. The SECRCV signal is applied as an input to block 750-3.

The outputs of the write ZAC buffer 750-100 and read ZAC buffer 750-102 are applied to different ones of a group of two position switches 750-150, 750-152, 750-154, 750-156 and 750-158. The output of ZAC buffer switch 750-150 is loaded into a SIU output register 750-174 via the switches 750-170 and 750-172. The output from the ZAC switch 750-152 is loaded into a pair of data register 750-180 via the switches 750-177 and 750-178.

The outputs of switches 750-154 and 750-158 are applied to a further switch 750-160 and stored in a holding register 750-162. The output of switch 750-156 is applied to a decoder 750-166 together with the DMEM outputs of switch 750-160. The other outputs from this switch are applied to a decoder 750-168. Additionally, the output of the switch 750-158 is applied to a decoder 750-164.

The decoder 750-166 decodes the cache commands received from processor 700 via the DMEMO-3 lines and those read out from the buffers 750-100 and 750-102 and generates signals for transferring commands to the cache storage 750-7 and directory 750-5. That is, the cache decoder 750-166 is used to control what information will be written into the cache storage 750-7 from the processor 700. The decoder 750-168 decodes the states of the BYPCAC and DSZ1 signals. It will be noted that the source of these last mentioned signals corresponds to processor 700 or switch 750-154.

The decoder 750-164 decodes the commands read out from the buffers 750-100 and 750-102 and generates signals for transferring commands to MEM memory (backing store) via the SIU 100. That is, the S decoder 750-164 is used to control the sending of information from the command buffers 750-100 and 750-102 to the SIU.

Additionally, the ZPSW switch 750-178 via a first position selects the ZAC command from the processor 700 on the RADO/ZADO lines for transfer to the SIU 100 on the DTS lines via the switch 750-172 or writes the main memory data into cache storage 750-7 via the RDO, RDI data registers 750-180. The second position of the ZPSW switch 750-178 applies the data output of the ZALT switch 750-177 to the DTS lines (ZAC data) or writes the main memory data from the DFS lines into cache storage 750-7 via the RDO, RDI registers 750-180 or transfers the ZAC commands to the processor 700 via the ZDI lines.

The ZACSW2 switch 750-170 is used to transfer a ZAC command (first position) or data from the ZAC buffer to the SIU 100 via the DTS lines (second position).

Control Section 750-3

This section includes a number of control state flip-flops which generate signals for sequencing the cache unit 750 through the required cycles of operation for processing the various commands. Additionally, the section includes the necessary logic circuits for generating the required control signals during the required cycles of operation. For the purposes of the present invention, these circuits may be implemented in a conventional manner. Therefore, in order to simplify the description herein, only a brief description and the Boolean expressions will be given for certain control state flip-flops and control logic circuits as required for an understanding of the operation of the present invention.

The control state flip-flops generate a series of timing sequences which control the following data transfer sequences:

(1) processor to cache, SIU (operation to cache and to SIU);
(2) processor to SIU (transfer write data to SIU);
(3) ZACBUF to cache (operation to cache);
(4) ZACBUF to SIU (operation to SIU);
(5) processor to ZACBUF (write data saved in buffer);
(6) SIU to cache, processor (2 words transferred);
(7) SIU to cache, processor (1 word transferred).

The transfers utilize the following flip-flops.

Control State Flip-Flops

The OATB flip-flop is the first flip-flop set in a first sequence which enables a transfer information from the SIU 100 to cache 750 and to the processor 750.

The OATB flip-flop is set for one cycle in accordance with the following Boolean expression: ARDA·DPFS.

The THCFD flip-flop is the next flip-flop set in the first sequence which enables the information received furing cycle OATB from the SIU 100 to be transferred to processor 700 via the ZDI lines. The THCFD flip-flop is set for one cycle in accordance with the following Boolean expression:

SET: $\overline{OETF} = ARDA \cdot \overline{DPFS}$.

The UG COGTH flip-flop when set permits the setting/resetting of a F/F bit, the setting of a pending bit, the setting of RR bits, writing MSA into the address of the directory section and writing data for write-single command into CACHE memory. It is set and reset in accordance with the following Boolean expressions:

SET: $\overline{HOLD} \cdot SET \cdot COGTH$.
RESET: $(\overline{HOLD})$: $\overline{CAC \cdot BSY1} \cdot NO \cdot HOLD \cdot \overline{CAC} \cdot CACBSY1 + NO \cdot HOLD \cdot CAC$.

The UGSOGTH flip-flop is the first set in a CPU to SIU sequence. When set, a first data word is put on the DTS lines. It is set for one cycle in accordance with the following Boolean expression:

SET: $\overline{HOLD} \cdot DWRT$ wherein DWRT = CWRT·SNG + CWRT·DBL + CWRT·RMT.

The CAOPR flip-flop is set in response to the read for an AOPR response. It is set for one cycle in accordance with the following Boolean expressions:

SET: $\overline{SSET} \cdot IN \cdot CLD \cdot IBUF(\overline{CBYP \cdot CAC} = \overline{BPSD}) + CPR \cdot RD$. $\overline{CBYP \cdot CAC \cdot BPSD} + (CRD \cdot SNG + CRD \cdot DBL) \cdot (\overline{CBYP \cdot CAC} + \overline{BPSD}) + CRD \cdot CLR + CRD \cdot RMT + CWRT \cdot SNG + CWRT \cdot DBL + CWRT \cdot RMT$.

The CPR-FF flip-flop is used for determining when the cache unit will respond to a DREQ·CAC signal from processor 700. When this flip-flop is set to a binary ONE during a previous cycle, the cache unit will not respond to a request except in the cases of PREREAD, INST-F1, INST-F2, LDQUAD, RD-SINGLE or RD-DBL type commands. It is set and reset in accordance with the following Boolean expressions:

SET: $(CINST \cdot F1 + CINST \cdot F2 + CLD \cdot QUAD + CRD \cdot DBL + CRD \cdot SNG)$. $(\overline{CBYP \cdot CAC} + \overline{BPSD}) + CPR \cdot RD \cdot \overline{CBYP \cdot CAC \cdot BPSD}$.
RESET: $\overline{HOLD} = \overline{RD \cdot BSY}$.

The RBPSD flip-flop is used for turning off the processor 700 in the case of HOLD-ON-MISS or BYP-CAC condition. When the data comes back from the SIU 100, this flip-flop is reset except for an INST-F1 cycle. In the case of IF-1, after 4 words have been received from the SIU, this flip-flop is reset. It is set and reset in accordance with the following Boolean expressions:

SET: SSET-IN·$\overline{\text{HOLD-CAN}}$·CRP-RMT+CRD-CLR+(CINST-F1+CRD-SNG+CRD-DBL)·(CBYP-CAC+BPSD)
RESET: $\overline{(\text{HOLD})}$=THCFD·SEC-RCV·CINST-F1+DATA-RECOV. $\overline{\text{INST-F1-FF}}$.

The ZC-DL flip-flop is the first set to a binary ONE for initiation of a ZAC buffer to cache timing sequence. This flip-flop remains set until all requests requiring completion of such sequences have been processed. It is set and reset in accordance with the following Boolean expressions:

SET: SSET-IN·PENBIT+UGCOGTH·CAC-BSY-1+PRE-OK·CAC-BSY1+TLTHM·CAC-BSY1
RESET: HOLD=HOLD-CAC+CAC-BSY-1+PREOK+UGTLTHM+PENBIT-WAIT.

The PRE-OK flip-flop is the first set to a binary ONE during the ZAC buffer to cache timing sequence. It is set and reset in accordance with the following Boolean expressions:

SET: ZC-DL·$\overline{\text{HOLD}}$·$\overline{\text{CAC}}$·$\overline{\text{CAC-BSY-1}}$·PRE-OK·OK·$\overline{\text{TLTHM}}$·PENBIT-WAIT·CEI
RESET: HOLD=HOLD-CAC·$\overline{\text{CAC-BSY1}}$.

The UGOK flip-flop is the second set to a binary ONE during the ZAC buffer to cache timing sequence. This flip-flop enables operations similar to those performed during a DREQ-CAC cycle. It is set and reset in accordance with the following Boolean expressions:

SET: PRE-OK·$\overline{\text{CAC-BSY1}}$·HOLD-CAC
RESET: HOLD=HOLD-CAC·$\overline{\text{CAC-BSY1}}$.

The PENBIT-WAIT flip-flop is set to a binary ONE when a read type request specifies the same address as a previous request for which all of the data has not been received from main memory. It is reset when all the outstanding read requests have been processed. It is set and reset in accordance with the following Boolean expressions:

SET: SSET-IN·PENBIT
RESET: HOLD=RDBSY.

The PENBIT-FF flip-flop is set to a binary ONE in response to a read single or read double request specifying the address of a previous read request whose data has not been received from main memory. It is reset during a PRE-OK cycle of operation. This flip-flop is used for stopping the operation of the processor. It is set and reset in accordance with the following Boolean expressions:

SET:SSET-IN·PENBIT·(CRD-DBL+CRD-SNG).
RESET: HOLD=$\overline{\text{PRE-OK}}$+HOLD-CAC+CAC-BSY-1.

The TLTHM flip-flop is the third set to a binary ONE during the ZAC buffer to cache timing sequence. This flip-flop is set in response to a read double command following an OK cycle of operation. It is set and reset in accordance with the following Boolean expressions:

SET: OK·$\overline{\text{CAC-BSY1}}$·($\overline{\text{BPSD}}$+CRD-DBL).
RESET: HOLD=HOLD-CAC·$\overline{\text{CAC-BSY1}}$.

The FRD-DBL flip-flop is used for establishing TLTHM cycle timing. When CAC-BSY1 is forced to a binary ONE during the TLTHM cycle, a flip-flop ZDBL-FF is set by the FRD-DBL flip-flop in the case of a read double command. This enables the cache unit to stop the operation of the processor when it is unable to forward a second word to the processor during the TLTHM cycle. The FRD-DBL flip-flop is set for one cycle in accordance with the following Boolean expression:

SET: CRD-DBL.

---

1. The CPSTOP signal is the signal which is used to turn off the processor 700.
   CPSTOP = FBPSD = REQ CAC ·[RDTYP · RZAC-ALL-BYS + PRFF · (PR-RD + INST-F2 + LDQUAD + RD-SNG + RD-DBL) + CAC-BSY1 + CAOPR + UGCOGTH]+ RBPSD + DBL · FF +PENBIT ·FF + (RD-IBUF/ZDI · CAC-BSY-1) + (RD-IBUF/ZDI · LD-QUAD-FF) + (UGCOGTH · RD-DBL · CAC-BSY1).

2. The CAC-BSY1 signal indicates when the cache unit is busy.
   CAC-BSY1 = OATB + THCFD.

3. The [$F/E-WRT signal is a write enable signal for setting and resetting the full/empty bits.

[$F/E-WRT = $\overline{\text{CAC·BSYT}}$ · (UGCOGTH) · $\overline{\text{UGSOGTH}}$· RD-DBL · $\overline{\text{BYC-CAC}}$ · $\overline{\text{DLY-BPSD}}$· (INST-F2 + LD-QUAD) · BYP-CAC · $\overline{\text{DLY-BPSD}}$.

4. The [$PEN1-WRT signal is a write enable signal for setting the operation pending bits.

[$PEN1-WRT = $\overline{\text{CAC-BSY1}}$ · (UGCOGTH) · (INST-F2 + LD-QUAD + PR-RD + RD-SNG · $\overline{\text{DLY-BBPSD}}$ + RD · DBL · $\overline{\text{DLY-BPSD}}$).

5. The [$PEN2-WRT signal is a write enable signal for resetting the pending bits when all data associated with a request has been received from main memory.
   [$PEN2-WRT = THCFD · SEC -RCV · (INST-F 2 + QUAD + PR-RD + RD-SNG + RD-DBL · $\overline{\text{BYP-CAC}}$).

6. The RZAC-ALL-BSY signal indicates the busy status of the RZAC buffer established in accordance with the states of the busy bits.
   RZAC-ALL-BSY = (RBB-00 + RBB-01) · (RBB-10 + RBB-11) · (RNN-20 + RBB-21) · (RBB-30 + RBB-31)

7. The [$RMIFS signal is a write strobe signal which allows the multiport identifier bits to be stored when data or status information is received from main memory. These bits identify which location in the RZAC buffer contains the ZAC word associated with the received data (i.e., the data pertains to which of the several possible outstanding read requests).
   [$RMIFS = ARDA + AST.

-continued

8. The ALTSW0-DT signal enables incoming data from main memory to be saved in the RD0 and RD1 registers.
   ALTSW0-DT = CAC-BSY 1.
9. The ALTSW2-DRT signal enables data from the ZAC buffer to be transferred to the RD0 and RD1 registers.

ALTSW2-DT = DS-ALT + $\overline{\text{ALTSW0-DT}}$.
   wherein DS-ALT = DS-11 + DS-12 + DS-13.
10. The signals OPSW0-DT through OPSW2-DT control the ZDI switch for transfers of data words from cache to processor 700 via the ZDI lines.
    OPSW0-DT = RD-IBUF/ZDI.

OPSW1-DT = $\overline{\text{RD-IBUF/ZDI}}$ (REQ-CAC + UGOGTH) · WDSEL0.
    OPSW2-DT = RD-IBUF/ZDI + WDSEL1 · (RD-SNG + INST-F1)

+ REQ-CAC · $\overline{\text{UGCOGTH}}$ · INST-F1

+ REQ-CAC · $\overline{\text{UGCOGTH}}$ · RDSNG

+ REQ-CAC · $\overline{\text{UGCOGTH}}$ · DBL-FF.
11. The signals ZACSW1-LC1 and ZACSW2-LC2 control the switch 750-702 which selects the source address for all cache memory chips. The sources are the processor 700 when receiving commands, the ZAC buffer and the CADR address register.

ZACSW1-LC1 = $\overline{\text{ZACSW1-LC4}}$ · $\overline{\text{CAC-BSY-1}}$ · UGCOGTH.
    ZACSW2-LC2 = CAC-BSY1 + UGCOGTH.
12. The signal DATA-RECOV enables the processor 700 to recover from a stop condition (e.g. restrobe registers).
    DATA-RECOV = THCFD · (CINST-F1 + CRD-SNC) ·

($\overline{\text{FMIFS-1}}$ · WDSEL0 + THCFD ·

CRD-DEL ($\overline{\text{FSMIFS-1}}$ · WDSEL0 +
    FMIFS-1 · WDSEL0 + FMIFS-1 ·
    WDSEL0 + CBYP-CAC) + THCFD ·
    CRD-RMT.
13. The RD-BSY signal establishes when certain state flip-flops are reset.
    RD-BSY = RBB-00 + RBB-01 + RBB-10 +
    RBB-11 + RBB-20 + RBB-21 +
    RBB-30 + RBB-31.
14. The SSET-IN signal is used to set certain state flip-flops.

SSET-IN = $\overline{\text{RBPSD}}$ · $\overline{\text{CDBL-FF}}$ · $\overline{\text{PENBIT-FF}}$ · $\overline{\text{UGCOGTH}}$ · $\overline{\text{CAOPR}}$ · $\overline{\text{CAC-BSY1}}$ ·

[$\overline{\text{CPR-FF}}$ · $\overline{\text{CPR-RD}}$ · $\overline{\text{CINST-F2}}$ · $\overline{\text{CLD-QUAD}}$ · $\overline{\text{CRO-SNG}}$ · $\overline{\text{CRD-DBL}}$ ] ·

[$\overline{\text{CRD-TYP}}$ · $\overline{\text{RZAC-ALL-BYS}}$] · DREQ-CAC.
15. SEC-RCV = $\overline{\text{RMIFS-2}}$ · $\overline{\text{RMIFS-3}}$ · [RBB-00 ⊕ RBB-01] +

$\overline{\text{RMIFA-2}}$ · RMIFS-3 · [RBB-10 ⊕ RBB-11] +

RMIFS-2 · $\overline{\text{RMIFS-3}}$ · [RBB-20 ⊕ RBB-21] +
    RMIFS-2 · RMIFS-3 · [RBB-30 ⊕ RBB-31].
16. The BPSD signal indicates a cache hit condition.

BPSD = $\overline{\text{BYP-CAC}}$ · $\sum_{i=0}^{3}$ (ZAD010-23 = SP-i-00 $\longrightarrow$ 14) ·

F/Ei · PENi wherein SP-i-00—14 corresponds to the address directory outputs (the saved address bits), F/Ei corresponds to the full/empty bit "i" and PENi corresponds to the pending bit "i".

It will be appreciated that in the above expressions that the symbols ·denotes an AND operation,
+ denotes an OR operation, and
⊕ denotes an Exclusive OR operation.

Cache Directory Section 750-5

This section includes a 4 level control directory 750-500 and a 4 level set associative address directory 750-502. The directory 750-502 includes 128 columns, each column being divided into 4 levels, 15 bits in length thereby providing space in each column for four blocks. The control directory 750-500 includes 128 10-bit locations, each of which stores a 10-bit word of control information. The control information for each of the blocks includes two round robin (RR) bits, 4 full/empty (F/E) bits and 4 operation pending bits as shown.

The full/empty bits indicate whether a particular directory address has any significance (i.e., is valid). For a cache hit to occur, the F/E bit must be set to a binary ONE. A binary ZERO indicates the presence of an empty block. The round robin bits provide a count which indicates which block was replaced last. This count is incremented by 1 under the control of the full/empty bits by a counter 750-512 and is used to identify the next block to be replaced. As seen from FIG. 3, this operation takes place when the round robin and full/empty bits are read out into a pair of output registers 750-504 and 750-506. The full/empty bits are also read into a register 750-510 which controls the incrementing of the round robin bits. That is, the round robin bits are used after all the full/empty bits are set to establish which of the full blocks is to be used for new data. The resulting value (ADDRR0-1) is applied as an input to switch 750-518. All of the full/empty bits are reset by an initialize signal. The full/empty bits can be set via a register 750-516. When the processor 700 issues a read request which is a miss, during the state UGCOGTH, a value "1000" is loaded into the register 750-516. This value is written into the control directory 750-500. On the next request, the value "1100" is loaded into the register 750-516 and etc. until all the full/empty bits are set.

The operation pending bits are used to indicate when a particular operation is still outstanding. For example, the pending bits when set indicates that all the read data for a particular block has not been received. Accordingly, during a read operation, when the address directory signals a hit, with the pending bit set, the cache unit 750 halts the operation of processor 700. Hence, no new request is made to main memory.

The network for setting and resetting the operation pending bits includes a 4-bit buffer register 750-520, a block decode register 750-524 and a decoder 750-512. The registers 750-520, during a write cycle of operation, are addressed by the signals PRZACW0-1 via an address register 750-522 and signals MIFS2-3 during a read cycle. The block decode register 750-524 forces different ones of the output signals BKDCOD0-3 to binary ONES under the following conditions: (1) If at least one full/empty bit is a ZERO, when that bit is set to a binary ONE, the corresponding pending bit is set via the decoder 750-512. When all the full/empty bits are set, the next value for the round robin count is encoded and that bit position within the set of four pending bits is set to a binary ONE. A pending bit is reset via the decoder 750-512 only when the cache 750 has received all of the information (i.e., 4 words) from SIU 100. The contents of the registers 750-520 indicate the position of the pending bit to be reset. The pending bits read out from control directory 750-500 are applied as an input to decoder 750-514 for updating as required.

The pending bits are set and reset under the following conditions:

SET: INSTF2(BYPCAC+CACMISS)+LDQUAD(BYPCAC+CACHEMISS) +PREREAD($\overline{BYPCAC}$·CACMISS)+READSINGLE·CACMISS+READDBL·$\overline{BYPCAC}$·CACMISS.
RESET: INSTF2+LDQUAD+PREREAD+·RESNG+RDDBL·BYPCAC.

The actual control signals are as listed previously.

The address directory 750-502, as mentioned, contains 128 sets of 4 words, each 15 bits in length. Each 15-bit word corresponds to the address of a 4 word block in the cache storage section 750-7. Whenever, a ZAC command is processed and involves either writing to or reading from cache unit 750, the 15 bits of the block address contained in the ZAC buffers 750-1h0 or 750-102 are compared on a "set basis" with the address contents of the directory 750-502 to determine the presence of a hit or miss condition. More specifically, the directory 750-502 makes its associations on bits 0-14 of the ZAC address for detection of a hit or miss condition. These bits correspond to the address signals applied to either the ZAC 11-18, 20-26 lines or to the ZADO/RADO 10-24 lines selected via an input two position ZACSW switch 750-530.

The address of the directory set is defined by a cache address (CADDL0-6) applied via a three position input switch 750-702. This enables the referencing of 4 block addresses which are read out and applied as one input to each of a group of 4 comparator circuits 750-536 through 750-542. Each of the comparator circuits compares its block address with bits 0-14 of the ZAC address. The results generated by the circuits 750-536 through 750-542 are applied to corresponding inputs of a first group of AND gates 750-544 through 750-550 together with corresponding ones of the full/empty bit signals from register 750-506. A second group of AND gates 750-552 through 750-558 combine the outputs from AND gates 750-544 through 750-550 with signals ZEXTBK0-3 indicative of which block is being selected applied via register 750-518.

The AND gates 750-552 through 750-558 provide a group of output block selection signals (i.e., signals CBSEL0-3) which are applied as inputs to a cache storage 750-700 and to a group of directory hit detection circuits of block 750-560. The circuits of block 750-560 include a group of AND gates 750-562 which logically combine signals indicative of the operation pending bits with the block selection signals, the results of which are "ored" by an OR gate 750-564 to provide a directory hit signal on line BPSD. The circuits of block 750-560 force the line BPSD to a binary ONE when the address bits 0-14 match the directory contents, the corresponding full/empty bit is a binary ONE, and the corresponding pending bit is a binary ZERO. It is assumed there are error conditions.

Cache Storage Section 750-7

The section 750-7 includes a storage unit 750-700 having 2048 (2 K), 40-bit word locations organized into 128 sets of 4 blocks. The unit is constructed from bipolar chips, conventional in design. The cache storage unit 750-700 is addressed by the 7-bit address CADDL0-6 applied via the switch 750-702. The address is stored in a holding register 750-704. This causes 4 blocks of 4 words to be applied as inputs to a group of 1 of 4 selection switches (not shown). The appropriate block (level) is determined by the states of the block select signals applied to the CBSEL0-3 lines. The signals applied to the CBYSEL0-7 lines via switch 750-708 provide the appropriate selection of even word and odd word bytes. Between words 0, 2 and 1, 3 the byte selection is independent and proceeds as follows:

| |
|---|
| OBYSEL0 (byte 0 select) for words 0, 2 |
| . |
| . |
| . |
| CBYSEL3 (byte 3 select) for words 0, 2 |
| CBYSEL4 (byte 0 select) for words 1, 3 |
| . |
| . |
| CBYSEL7 (byte 3 select) for words 1, 3. |

The signals applied via lines CWSEL0-3 via a decoder 750-706 is used for desginating the words. This ensures that the contents of the appropriate bit positions of the group of memory chips which comprise the unit 750-700.

The words of a selected block are applied as inputs to a number of sets of OR (NAND) gates 750-712 through 750-716. Each group of gates select the word of the selected block. The word outputs from the OR gates are applied as inputs to an instruction buffer 750-900 via a second position of a two position switch 750-902 and to the first 4 positions of an output ZDI switch 750-720 for forwarding to processor 700. The fifth position of the switch applies the word contents of registers 750-180 to processor 700 via a ZBP switch 750-902. Lastly, the sixth position of the ZDI switch 750-720 applies the output of the instruction buffer 750-900 via the ZIB lines 0–39.

As seen from the Figure, during a write cycle of operation, the word contents from the register 750-180 are applied as inputs to the unit 750-700.

Instruction Buffer Section 750-9

This section includes a 16 word instruction buffer 750-700 which receives data inputs from the registers 750-180 via the switch 750-902. As mentioned previously, the outputs from cache storage 750-700 are also written into the buffer 750-700 via the switch 750-902. Control signals and address signals applied via a switch 750-904 are decoded by a decoder 750-906 and are used to set a read address counter 750-908 and a write address counter 950-910 to the appropriate states. The address outputs of the counters are applied via a switch 750-912 and 750-914 to the buffer 750-900 and used to provide the appropriate addresses during read and write cycles of operation.

Diagnostic Section 750-10

As seen from FIG. 4, the cache unit 750 further includes a diagnostic section 750-10. This section is utilized in conjunction with PI interface for diagnostic and maintenance operations. As seen from FIG. 4, section 750-10 includes a 7-bit counter 750-1000, a pair of multiplexer detector circuits 750-1004 and 750-1006 and a decoder circuit 750-1002.

The counter 750-1000 can be loaded via the lines ZPIDT29-35 with signals corresponding to an address for accessing the locations within directory control 750-500 and directory 750-502 via switch 750-702. The decode circuit 750-1002 in response to signals applied via lines ZPIB9-10 generates output signals which are applied via lines PIBK0-3 as one input of the switches 750-532 and 750-534 as shown for selection of a particular block.

The switches 750-1004 and 750-1006 receive the sets of address and status signals from the control directory 750-500 and directory 750-502. More specifically, the switch 750-1004 includes 4 sections each having 4 inputs for receiving a particular combinarion of the signals RSPEN0-3, old pend 0-3, RDR F/E0-3, ADDRR0-1 and RDRRR0-1. Depending upon the coding of the signals applied to the ZPIB9-10 lines, the combination of 4 signals from one of the 4 sections will be selected for application to the lines ZDIR16A through ZDIR15D.

Similarly, the switch 750-1006 has 4 sections each having 15 inputs for receiving one of the 4 sets of address signals SP00-14 through SP30-14. This switch when enabled by a signal ENZDIR110 applies a set of upper address signals read out from directory 750-502. Parity bit signals not shown are also applied as inputs to the switch 750-1006. The output signals from lines ZDIR0-15 of switch 750-1006 as well as the signals from lines ZDIR16A through 16D of switch 750-1004 are applied to additional inputs included as part of the OR circuits 750-712. These signals are in turn transferred through the circuits of processor 700 via position 1 of ZDI switch 750-720 to the unit initiating the PI command. As explained herein, the initiation, transfer and processing of PI commands through the PI interface takes place in the manner described in U.S. Pat. No. 4,006,466 and 4,017,839 and U.S. Pat. application Ser. No. 755,907, now U.S. Pat. No. 4,090,239, which are assigned to the same assignee as named herein.

DESCRIPTION OF OPERATION

With reference to FIGS. 1–9d, the operation of the present invention will now be described in connection with the processing of several different types of instructions having formats illustrated in FIGS. 9a through 9d.

However, before discussing these instructions, reference will first be made to the state diagram of FIG. 7. This diagram illustrates the sequencing of the I cycle control state storage circuits of block 704-102 as a function of the coding of the "CCS" sequence field applied via the lines 704-210. As seen from FIG. 7, the control state FPOA ia a beginning state for processing all instructions.

The FPOA state is entered when the FPOA control state flip-flop of block 704-102 of FIG. 3 switches to a binary ONE. This flip-flop is set to a binary ONE under hardware control in accordance with the following Boolean expression:

SET = [$\overline{\text{HOLDI}}$·(DIBFRDY·$\overline{\text{DIBFEMTY}}$·[$\overline{\text{STRCPR}}$·$\overline{\text{DXEDRPTS}}$·DPIPE1-4).

That is, the FPOA cycle is entered following an [END cycle when there is no hold condition relating to the pipeline (i.e., signal $\overline{\text{HOLDI}}$ = 1), the instruction buffer 750-900 is not empty (i.e., $\overline{\text{DIBFEMTY}}$ = 1), it has at least one instruction ready for transfer to processor 700 (i.e., DIBFRDY = 1), the previous instruction did not produce a store compare condition (i.e., [$\overline{\text{STRCPR}}$ = 1), is not an execute or repeat instruction (i.e., $\overline{\text{DXEDRPTS}}$ = 1) and the pipeline has been restarted (i.e., DPIPE1-4 = 1).

When in control state FPOA, the RBIR register 704-152 stores the instruction op-code as well as the remainder of the instruction word having one of the formats illustrated in FIGS. 9a and 9b. Also, the RSIR register 704-154 stores the same instruction word. In the case of an instruction having the format of FIG. 9a, the RBASA register 704-156 stores the upper three bits of the y field while the RRDX-A register 704-158 stores the td portion of the instruction word TAG field. The R29 flip-flop 704-162 stores the value of the AR bit 29 of the instruction word.

During control state FPOA, the hardware circuits of block 704-101 decode the CCS sequence field read out from the CCS control store 704-200 in response to the 10-bit op-code (bits 18–27) applied via the RBIR register 704-152. It is the coding of the CCS sequence field which establishes what path the processing of the instruction is to follow. Accordingly, the coding of the CCS sequence field determines the types of operations performed during the FPOA and subsequent cycles which complete as much processing of each instruction as possible under hardware control. Examples of the specific operations are set forth in the section "Hardwired Control State Actions" included herein.

Considering the paths in greater detail, it is seen from FIG. 7 that the hardware circuits of block 704-102 sequence from the FPOA state to control state FTRF-NG when a control flag flip-flop FTRF.TST indicates that the previous instruction was within the transfer class and that the condition for transfer or branching was not met ([TRGO=1). During control state FTRF-NG, the processor hardware circuits generate signals for reinitializing the instruction buffer as a function of the contents of the instruction counter. This enables the discontinuance of that stream of instructions and a change back to the current stream of instructions whose address is indicated by the instruction buffer circuits. The FTRF-NG control state is then followed by one of the cycles FPI-INIT through FWF-IBUF as a function of the coding of the I buffer status lines.

In the case of normal instruction processing, the path followed as a consequence of decoding the CCS sequence field is that labelled FTRF-TST+[TRGO. This path indicates that the previous instruction was not within the transfer class (FTRF-TST=1) or if it was within such class the condition for transfer is going to be met ([TRGO=1). Hence, this path indicates continued processing of a transfer class instruction under hardware control. It will be noted that if the previous instruction was a transfer class instruction (FTRF-TST=1) and if the current instruction is a transfer class instruction (TRF), then the hardware circuits of block 704-102 remain in control state FPOA (i.e., follow path TRF to FTRF-TST).

The point X in FIG. 7 denotes from the coding of the CCS sequence field whether the particular instruction is in the EIS class, the ESC class or TRF·EA class, the EIS·ESC·[EA·TRF class or the EIS·ESC·[EA class. In the case of the EIS class, the coding of CCS sequence field determines how many descriptors are needed for that particular EIS instruction. Each of the EIS instructions has the multiword format illustrated in FIG. 9b and can require up to three descriptors. The CCS fields for all instructions requiring one, two and three descriptors are grouped together within the decoding circuits. Additionally, signals applied via address lines of the instruction buffer circuits of the cache unit 750 are decoded to determine how many descriptor values or words are presently stored in the instruction buffer. These sets of signals are compared and when there are not enough descriptors presently in the I buffer to complete the instruction, then the circuits of block 704-102 switch from FPOA to control state FPIM-EIS. During control state FPIM-EIS, the processor circuits generate signals for conditioning the cache unit 750 to perform an instruction fetch operation for fetching four more words from main memory or backing store which are loaded into the instruction buffer.

Once the required numbers of descriptors have been fetched and the cache unit 750 signals that the instruction buffer is ready (IBUFRDY=1), the hardware circuits of block 704-102 are at point C. If the instruction buffer is not ready (IBUF-RDY=1), the hardware circuits 704-102 switch to control state FWF-DESC wherein the processor 700 waits for the descriptor. When the instruction buffer is ready (IBUFRDY=1), the hardware circuits are again at point C.

It will be noted that all EIS type instructions (CCS codes 110000-111111) follow a path to point C. If the CCS field indicates that the instruction is a bit type EIS instruction (BIT=1), then the hardware circuits 704-102 switch control state (FESC) without performing any FPOP cycles of operation. If the CCS sequence field indicates that the instruction is not within the bit type class (i.e., $\overline{BIT}=1$), the hardware circuits 704-102 switch to control state FPOP for one cycle of operation. It will be appreciated that the number of descriptors within the EIS multiword instruction determines the number of FPOP cycles.

A maximum number of descriptors are processed under hardware control before the circuits 704-102 switch to control state FESC enabling control to be transferred to a microprogram routine within the execution control store 701-2. For those EIS multiword instructions which require address preparation on three descriptors, the hardware circuits 704-102 remain in the FPOP control state for executing two cycles during which the processor circuits generate addresses for the first and second descriptors before switching to control state FESC.

It is seen from FIG. 7 that depending upon the type of instruction as defined by control sequence field and the type of address preparation required, address preparation for the different descriptors proceeds until it is determined that address preparation can no longer continue under hardware control. More specifically, during the FPOP cycle, address preparation is performed for descriptors of the classes of instructions which include instruction types NUM2 through MVT conditioned on the fact that the descriptor is not an indirect descriptor ($\overline{FID}=1$), that the descriptor does not specify an indirect length ($\overline{FRL}=1$) and it is not a Type 6 descriptor ($\overline{TYP6}=1$) or address preparation is to be completed under hardware control (FINH-ADR=1) in addition to other unusual situations which cannot be handled under hardware control (i.e., $\overline{FAFI}=1$). When the circuits of block 704-104 force signal FINH-ADR to a binary ZERO, this indicates the the address preparation had been completed under microprogram control and therefore does not have to be performed during a FPOP cycle.

The circuits of block 704-110 force signal FAFI to a binary ONE when the address preparation can be accomplished during the FPOP cycle and there are no special conditions such as the occurrence of a mid instruction interrupt.

Lastly, the condition RDESC=00 is defined by the states of flip-flops of block 704-142 and indicates the occurrence of a first FPOP cycle during which the processor circuits prepare the address of the first descriptor.

In the event that there are some special type of conditions presently defined by the function f, the hardware circuits of block 704-102 switch to control state FESC. This enables the transfer of control to routines stored in the ECS control store 701-2 for continuing the processing of the instruction under microprogram control.

Additionally, in accordance with the preferred embodiment of the present invention, the circuits of block 704-102 include flip-flops which provide control states FIDESC and FWF-IDESC for processing under hardware control indirect operand descriptors for EIS instructions.

For a first indirect descriptor, it becomes necessary to hold up completion of the I cycle for a cycle and let the execution unit 714 complete its operation. As soon as the E cycle is completed, the processor circuits under hardware control fetch the indirect descriptor. In greater detail, when the CCS field indicates that the instruction is an EIS instruction and bit 31 of the RSIR register is a binary ONE (see FIG. 9c), this means that the first descriptor of the EIS instruction is an indirect operand.

During control state FPOA, the hardware circuits of block 704-102 hold up completion of the I cycle (i.e., HOLD-I = 1) for one cycle. That is, a control flip-flop FPOAID included within block 704-102 is switched to a binary ONE in response to a first clock pulse which forces the [HOLDIOO signal to a binary ZERO. Upon the occurrence of a next clock pulse, the FPOAID flip-flop is reset to a binary ZERO which allows the [HOLDIOO signal to be forced to a binary ONE (see expressions listed under FPOA control state in "Hardwired Control State Actions" section).

For the remaining EIS descriptors, the hardware circuits of block 704-102 do not hold up the completion of any more I cycles following control state FPOA. From FIG. 7, it is seen that the control state FPOP is entered. However, the hardware circuits of block 704-102 immediately switch to control state FIDESC upon detection of an indirect descriptor. This state is followed by a switching to control state FWF-IDESC and a return to control state FPOP completing the processing of a first indirect operand descriptor. These states are repeated for each descriptor word specified by the MF field of the instruction word as having an indirect operand (see FIG. 9b).

Considering instructions other than EIS type instructions, it will be noted from FIG. 7 that when the CCS sequence field indicates that the instruction is within the escape class or within the transfer class and require indirect address modification, the hardware circuits 704-102 immediately switch from control state FPOA to the FESC control state. As mentioned, control is transferred to the appropriate microprogram routines stored in ECS control store 701-2. Thereafter processing of the instruction proceeds under microprogram control. As indicated in FIG. 7, the occurrence of certain microinstruction codes causes the hardware circuits 704-102 to switch to control state FPOP.

The arrangement for transferring control and the conditions under which control is transferred need not be discussed further herein. However, for further information, reference may be made to the patent applications listed in the introduction. For the purpose of the present invention, it need only be understood that the hardware circuits of block 704-102 passes control to the ECS control store 701-2 for completion of certain types of instructions which cannot executed in a pipeline mode of operation.

The above mentioned instructions include EIS type instructions as well as those instructions in which the hardware circuits of block 704-102 switch to control state FESC during the processing thereof. It will be noted that in accordance with the present invention, the particular coding of the CCS sequence field enables the processor 700 to detect an early point in time whether an instruction can be executed in the pipeline mode of operation.

It can also be seen from FIG. 7 that non-EIS type instructions other than transfer class instructions ($\overline{TRF}$ = 1) which require indirect addressing and are not within the escape class ($\overline{ESC}$ = 1) follow a path which causes the hardware control circuits of block 704-102 to switch to control state FWF-IND. For execute double and repeat instructions, XED or RPT, the hardware control circuits 704-102 switch to control store FESC. Thereafter, indirect address preparation is performed under microprogram control.

In accordance with the preferred embodiment of the present invention, indirect address modification operations for instructions having the format shown in FIG. 9a are performed under hardware control. These include register then indirect (RI), indirect then register (IR) and indirect then tally (IT). Other IT address modification operations requiring other than indirection are performed under microprogram control.

As seen from FIG. 7, when register indirect address modification is required (i.e., the tm field specifies a register than indirect type modification), the hardware control circuits of block 704-102 switch from the FWF-IND control state to the FPOA control state provided that the CCS field indicates that the instruction is not an execute double or repeat instruction (i.e., RI·X-ED·RPTS = 1).

The RI address modification is a 2T operation (i.e., FPOA (RI)→FWF-INT→FPOA). During control state FPOA, when the tm portion of the instruction word contents of the RSIR register 704-158 indicate RI address modification, the processor circuits inhibit the loading of the CCS field address into the ECS address register 701-10 of FIG. 3b. Also, the processor 700 takes action to fetch from memory the indirect word specified by the effective address resulting under R type modification (i.e., generates a read single memory command as explained herein).

During control state FWF-INT, the processor 700 under hardware control transfers in for the indirect word, having the format shown in FIG. 9d, from cache unit 750 and forces the RI flip-flop of block 704-110 to a binary ONE. The RI flip-flop remains a binary ONE for the duration of the next FPOA control state. This flip-flop is used to force the R29 register 704-162 to a binary ZERO since the indirect word fetched from memory has its AR bit 29 set to a binary ONE (see FIG. 9d).

As seen from FIG. 7, when the tm field of the instruction specifies an indirect then register address indirect modification and the instruction is other than an execute double or repeat (i.e., (IR+FIR)·$\overline{XED·RPTS}$ = 1), the hardware control circuits of block 704-102 switch from the FWF-IND control state to the FIRT control state. The IR modification is a 3T operation (i.e., FPOA-(IR)→FWF-IND→FIRT→FPOA). The same operations mentioned in connection with RI modification are carried out during control state FPOA.

During control state FWF-IND, the control state flip-flop FIRT and the FIR flip-flop are forced to binary ONES. This state is followed by control state FIRT during which the original contents of the RRDXA register 704-158 saved in the RRDXAS register 704-159 are transferred to RRDXA register 704-158 where the address modification specified by the indirect word is either of R or IT type. At this point, the development of an effective address is complete (last indirection).

Also, the control flip-flop FIRL is forced to a binary ONE. The FIRL (flip-flop indirect last) flip-flop remains a binary ONE for the duration of the next FPOA control state. Since the operation is not complete, the FIR flip-flop remains at a binary ONE during control state FPOA.

During the next control state FPOA, the FIRL flip-flop forces the R29 register 704-162 and RSIR tag bits 30–31 to binary ZEROS. This completes the I cycle of operation for that instruction. A similar sequence is followed in the case of a non-execute double or repeat instruction requiring an indirect then tally address modification. This is a 3T operation (i.e., FPOA (IT)→FWF-IND→FIT-I→FPOA). During control state FWF-IND, in addition to loading the indirect word into the processor registers (i.e., ZDI→RSIR, RDI and RRDX-A, R29), the control state flip-flop FIT-I is forced to a binary ONE and the RRDXAS register 704-159 is forced to ZEROS.

During control state FIT-I, the ZERO contents of RRDXAS register 704-159 are loaded into RRDXA register 704-158. Also, the FIRL flip-flop is forced to a binary ONE. Similar to that described above, the R29 register 704-162 and RSIR tag bits 30-31 are forced to binary ZEROS by the FIRL flip-flop. The "Hardwired Control State Actions" section illustrates the various operations described above in greater detail.

As seen from FIG. 7, non-EIS type instructions which are not within the escape class and do not require generation of an effective address (EIS·ESC·EA) follow a path to point XX. These instructions have the format of FIG. 10a and their tm portion of their TAG fields are coded to specify no indirection (i.e., 00 code). As indicated, the tm portion of an instruction is tested for indirection during the FPOA cycle and when indirection is not specified, the control flag [EA is forced to a binary ONE state.

As seen from FIG. 7, the various groups of instructions following this path are those which reference CCS sequence fields coded to specify sequences listed within group A, group B, group C, TRF, STR-SGL, STR-HWU and STR-DBL. Instructions requiring group A sequences as well as those instructions whose processing has reached point B follow the path to point XXX. Point XXX in FIG. 7 indicates the point at which processor 700 has completed the I cycle processing of an instruction and must then fetch the next instruction from the I buffer for processing. Before that can be done, the processor 700 must make certain that the instruction just completed has not placed it in an execute double or repeat loop (i.e., the instruction is not an XED or RPT instruction). If the processor 700 has been placed in a loop, the hardware circuits of block 704-102 switch to control state FXRPT followed by control state FESC. This ensures that the processor 700 does not fetch the next instruction but instead control is transferred to the ECS control store 701-2 wherein the next operation(s) are carried out under microprogram control. More specifically, during control state FXRPT, the processor 700 under hardwired control forces the ECS control store 701-2 to the appropriate address and during control state FESC transfers control from the hardware circuits.

When the CCS sequence field indicates that the instruction is not an execute double or repeat type of instruction and that the control flag STR-CPR is a binary ONE indicating that the instruction buffer must be reloaded because of a store operation, the hardware circuits of block 704-102 switch to control state FPI-INIT. The STR-CPR flag is set to a binary ONE during a cache write operation when the address of the cache command equals the address of the instruction block. During this state, the processor 700 initializes the instruction buffer via the circuits of block 704-128. Thereafter, the hardware circuits of block 704-102 switch to control state FPIM-2 to fetch the next instruction. This state is followed by a return to control state FPOA as shown in FIG. 7.

When the CCS sequence field indicates that the instruction is neither an execute double or repeat instruction and the instruction buffer does not have to be reloaded because of a store compare operation ([STR-CPR = 1), the hardware circuits of block 704-102 switch to one of three control states FPIM-1, FPOA and FWF-IBUF as shown. In the case where the instruction buffer is empty (IBUF-EMPTY = 1), it switches to control state FPIM-1 to enable the fetching of instructions to fill the instruction buffer. After the instruction buffer has been filled, the hardware circuits of block 704-102 switch to control state FPOA to begin the processing of the next instruction. In the case where the buffer is not empty, (IBUF-EMPTY = 1) but is ready for read out of the next instruction (IBUFRDY = 1) the hardware circuits of block 704-102 immediately switch back to control state FPOA.

It will be noted from FIG. 7 that in the event the instruction buffer is not in a ready condition (IBUFR-DY = 1), the hardware circuits of block 704-102 switch to the FWF-IBUF control state and remain in that state until the instruction buffer is ready (IBUF-RDY = 1). When it is ready, the hardware circuits of block 704-102 switch to control state FPOA.

It will be noted that instructions which reference CCS fields coded to specify the sequences listed in group B follow the path labelled group B wherein the hardware circuits of block 704-102 switch from control state FPOA to control state FESC. Similarly, instructions which reference CCS fields coded to specify the sequences listed in group C cause the hardware circuits of block 704-102 to switch to control state FDEL followed by control state FESC. In each case, there instructions require operations which cannot be executed by processor 700 under hardware control but which required certain microinstruction routines for completing the processing thereof.

As seen from FIG. 7, the instructions which reference CCS fields coded to specify STR-SGL or STR-HWU sequences are processed under hardware control provided these instructions do not require character address modifications (FCHAR = 1). In such cases, the hardware circuits of block 704-102 switch to control state FSTR.

Those instructions which reference CCS field codes specifying an STR-DBL sequence, the hardware circuits of block 704-102 switch from control state FPOA to the FSTR-DBL control state followed by control state FSTR. In the case of each of three types of sequences mentioned, the hardware circuits of block 704-102 follow a path back to point B for fetching the next instruction from the instruction buffer.

In accordance with the preferred embodiment, the path labelled TSXn is followed when the CCS field is coded to specify the TSX instructions within the class. Initially, the path is the same as that followed by instructions within the ESC-EA class. Hence, similar operations in generating an effective address are performed by processor 700 during control state FPOA. Additionally, the instruction counter is updated by being incremented by one.

The hardware circuits of block 704-102 then switch to control state FTSX1. During this state, the updated instruction counter contents are loaded into the RDI register 704-164. The hardware circuits of block 704-102 switch control flag flip-flop FTSX2 to a binary ONE and thereafter switch to control state FPI-INIT. The control flag flip-flop FTSX2 causes the processor 700 to reference effective address generated during control state FPOA and stored in TEA0 during control state FPI-INIT. It will be appreciated that normally, the processor 700 references the address value IC+0+0 during control state FPI-INIT. The hardware circuits of block 704-102 then switch to control state FPIM-2 followed by control state FPOA.

It will be appreciated that FIG. 7 only discloses the hardware operations relative to the I cycle of operation. As mentioned, the processing of a given instruction is performed to the extent possible under hardware control. Depending upon the class into which an instruction falls as specified by the CCS field establishes the operations performed during the FPOA control state and subsequent control states. As explained herein and as seen from the section, Hardwired Control State Actions, the hardware circuits of block 704-102 as a function of the coding of the CCS sequence field, generates the appropriate type of cache command during control state FPOA. This action as well as the other actions occurring during the control states of FIG. 7 are as indicated in the following section.

---

HARDWIRED CONTROL STATE ACTIONS SECTION
FPOA CONTROL STATE

1. If $\overline{\text{FINH-ADR}} = 1$ then
   $[Y(29) + X(RRDX-A) + ADR(29)] \rightarrow ASEA$;
   $[Y(29) + X(RRDX-A) + ADR(29)] + ZBASE \rightarrow ASFA$;
   of $RSIR_{30-31} = 00$ then $1 \rightarrow EA^*$;
   If $RSIR_{30-31} \neq 00$ then $0 \rightarrow EA$; $RBAS-A(29) \rightarrow RSPP$;

2. If FINH-ADR = 1 then
   $[0 + 0 + REA-T] \rightarrow ASEA$;
   $[0 + 0 + REA-T] + ZBASE \rightarrow ASFA$;
   $1 \rightarrow EA$ 3. $ASEA \rightarrow REA$; $ASFA \rightarrow RADO$
   [$CACHE-REG = 1]

4. If $\overline{\text{FTRF-TST}} = 1$ then $0 \rightarrow FTNGO$

5. If FMSK-29 = 1 then MASK R29 to 0
   If FIRL = 1 then MASK RSIR 30, 31 to 00
   $0 \rightarrow FIR$
   $0 \rightarrow FRI$
   $0 \rightarrow FIRL$ 6. $(FTRF-TST \cdot \overline{(TRGO)} \cdot \overline{TRF} \cdot \overline{EA} \cdot \overline{EIS}) = 1$ and
   if $EA \cdot (LD-SGL + LD-HWU + RD-CLR + EFF-ADR + NO-OP)$ then
   $1 \rightarrow END$; and
   if $EA \cdot (STR-SGL + STR-HWU + STR-DBL) = 1$ then
   $ZREG \rightarrow RRDX-A$; $0 \rightarrow R29$; and
   if $TSXn \cdot EA = 1$ then $IC + 1 \rightarrow IC$
   $CCS \rightarrow CCS-REG$; $CCS-O_{0-1} \rightarrow RTYP_{0-1}$ and
   if EA [DEL-STR-SGL + DEL-STR-DBL + TSXn + INST-GR] +
   $[\overline{EA} \cdot \overline{ESC}] = 1$ where INST-GR = LD-SGL-ESC + LD-DBL-ESC
   30 LD-HWU-ESC + EFF-ADR-ESC + ESC-EA then $00 \rightarrow RBAS-B$ 7. if $\overline{\text{FTRF-TST}} \cdot TRF \cdot EA = 1$ then
   a. [INIT-IBUF = 1];
   b. $CCS \rightarrow CCS-REG$;

8. If $FTRF-TST \cdot \overline{(TRGO)} \cdot EIS$
   If FREQ-DIR = 1 then [HOLD I = 1]

If $\overline{\text{FREQ-DIR}} = 1$ then $RBIR_{27-35} \rightarrow ZIDD_{27-35} \rightarrow R29$,
   RRDX-A, FID, FRL;
   If BIT = 1 then $01 \rightarrow RTYP_{0-1}$;
   If MTM-MTR = 1 then $00 \rightarrow RTYP_{0-1}$;

If $\overline{BIT} \cdot \overline{MTM-MTR} = 1$ then $ZIB \rightarrow RTYP_{0-1}$
   $RIR_{30} \rightarrow FAFI$;
   $ZIB \rightarrow RSIR, RBAS-A$;

If $\overline{(\text{NEED-DESC})} \cdot (IBUF-RDY) = 1$ then $\overline{\text{FTRF-TST}} = 1$ then [READ-IBUF/ZIB (CUR) = 1]
   FTRF-TST = 1 then [READ-IBUF/ZIB (OPS) = 1]
   $CCS \rightarrow CCS-REG$ 9. If $\overline{\text{FPOA-ID}} \cdot RSIR_{31}$ then $HOLD-I \rightarrow 1$ If $\overline{\text{FPOA-ID}} \cdot RSIR_{31} \cdot \overline{\text{HOLD-E}}$ then $1 \rightarrow FPOA-ID$;

If $FPOA-ID \cdot \overline{\text{HOLD-E}}$ then $0 \rightarrow FPOA-ID$

10. If FTRF-TST = 1 and
    If [TRGO = 1 then Toggle FABUF-ACTV; If XED-RPTS = 1
    then $1 \rightarrow FTRGP$ If $\overline{\text{END}} = 1$ then [RDI/ZRESB = 1]

11. If $\overline{\text{TRGO}} = 1$ then Inhibit IV Strobe;
    $1 \rightarrow FTNGO$

HARDWIRED CONTROL STATE ACTIONS SECTION
FPOA CONTROL STATE 12. 0→FTRF-TST

*The bracket sign ( [ ) has been omitted from the term EA throughout for sake of clarity.

DMEM AND VALUES GENERATED DURING CONTROL STATE FPOA

[MEM, [SZ for FPOA
If $\overline{\text{FTRF-TST}}$ . $\overline{\text{[TRGO}}$ = 1 then [MEM = None;
If ($\overline{\text{FTRF-TST}}$ + [TRGO) . ESC = 1 then [MEM = None;
If ($\overline{\text{FTRF-TST}}$ + [TRGO) . $\overline{\text{EIS}}$ = 1 then [MEM = None;
If ($\overline{\text{FTRF-TST}}$ + [TRGO) . $\overline{\text{ESC}}$ . $\overline{\text{EIS}}$ . $\overline{\text{EA}}$ = 1 then [MEM = Read Single; [SZ = Sgl;
($\overline{\text{FTRF-TST}}$ + [TRGO) . EA
If ESC-EA + DEL-STR-SGL + TSXn + DEL-STR-DBL + NO-PO = 1 then [MEM = None;
If LD-SGL + LD-SGL-ESC + LD-SGL-DEL then
$\overline{\text{FCHAR}}$ . RRDX-A = $\overline{\text{DU}}$ . $\overline{\text{DL}}$ = 1 then [MEM = Read Single; [SZ = Sgl;
$\overline{\text{FCHAR}}$ . RRDX-A = DU = 1 then [MEM = Direct; [SZ = HWU;
$\overline{\text{FCHAR}}$ . RRDX-A = DL = 1 then [MEM = Direct; [SZ = HWL;
FCHAR = 1 then [MEM = None
If LD-HWU + LD-HWU-ESC + LD-HWU-DEL = 1 then
RRDX-A = $\overline{\text{DU}}$ . $\overline{\text{DL}}$ = 1 then [MEM = Read Single; [SZ = HWU
RRDX-A = DU = 1 then [MEM = Direct; [SZ = HWU
RRDX-A = DL = 1 then [MEM = Direct; [SZ = ZERO
If STR-SGL = 1 then
 if $\overline{\text{FCHAR}}$ = 1 then [MEM = Write Single; [SZ = Sgl and
 if FCHAR = 1 then [MEM = None
If TRF = 1 then
 if $\overline{\text{FTRF-TST}}$ . FABUF-ACTV = 1 then [MEM = Inst. Fetch-1; [SZ = B and
 if $\overline{\text{FTRF-TST}}$ . $\overline{\text{FABUF-ACTV}}$ = 1 then [MEM = Inst. Fetch-1; [SZ = A and
 if FTRF-TST = 1 then [MEM = None
If EFF-ADR + EFF-ADR-ESC = 1 then [MEM = Direct; [SZ = HWU
If LD-DBL + LD-DBL-ESC + LD-DBL-FP-ESC = 1 then [MEM = Read Double
If RD-CLR = 1 then [MEM = Read Clear
If STR-DBL = 1 then [MEM = Write Double; [SZ = DBL
If STR-HWU = 1 then [MEM = Write Single; [SZ = HWU
If LD/STR-SGL-ESC = 1 then [MEM = Read Single; [SZ = Sgl; [R/W = 1
If LD/STR-HWU-ESC = 1 then [MEM = Read Single; [SZ = HWU; [R/W = 1

FSTR CONTROL STATE

1. REG(RRDX-A)→ZX;
2. [ENAB-ZX-A2 = 1;
3. ZX, ZX-A2→ZDO;
4. ZRESB→RADO;
5. [END = 1.

FSTR-DBL CONTROL STATE

1. REG(RRDX-A)→ZX;
2. [ENAB-ZX-A2 = 1;
3. ZX, ZX-A2→ZDO;
4. ZRESB→RADO;
5. 0010→RRDX-A;
6. 1→R29.

FESC CONTROL STATE

1. If [DIBUF/PIPE = 10 + 11 or [PIPE = 001 + 100 then [END = 1.
2. If [DIBUF/PIPE = 11 or [PIPE = 100] then 1→FWF-REL.

FWF-IND CONTROL STATE

ZDI→RDI
If (RI + IR + IT-I) = 1 then ZDI→RSIR
ZDI→RRDX-A, R29
If RI·($\overline{\text{DXED-RPTS}}$) = 1 then 1→FRI If (IT-I) ·  = 1 then 0→RRDXAS$_{0-3}$ If IR ·  = 1 then RRDX-A→ZRDXAS$_{0-3}$ and 1→FIR.

FIT-I CONTROL STATE

1. RRDXAS→RRDX-A$_{0-3}$
2. 1→FIRL

-continued

FIRT CONTROL STATE

1. If $\overline{RSIR-31}$ = 1 then RRDXAS→RRDX-A and
   1→FIRL

FXRPT CONTROL STATE

1. CCS→CCS-REG

FTSX1 CONTROL STATE

1. IC→ZX
2. ZX→ZDO
3. ZRESB→RDI
4. 1→FTSX2

FDEL CONTROL STATE

1. [0 + 0 + REA-T]→ASEA; and
   [0 + 0 + REA-T] + ZBASE→ASFA.
2. ASEA→REA; ASFA→RADO; and
   $ZBASE_{33-35}$→$RBASE_{33-35}$; and
3. [$CACHE-REG = 1.
4. If DEL-STR-SGL = 1 then [MEM = WRITE SGL; [SZ=SGL.
5. If DEL-STR-DBL = 1 then [MEM = WRITE DBL; [SZ=DBL.
6. If $\overline{DEL-STR-SGL \cdot DEL-STR-DBL}$ = 1 then [MEM = NONE.
7. If LD-SGL-DEL + LD-DBL + LD-HWU-DEL = 1 then [END.

FPI-INIT CONTROL STATE

1. If $\overline{FTSX2}$ = 1 then [0 + RIC + 0]→ASEA;
   If FTSX2 = 1 then [0 + 0 + REA-T]→ASEA;
   ASEA + ZBASE→ASFA.
2. 0→FTSX2
3. ASEA→REA; ASFA→RADO.
4. [$CACHE-REG = 1.
5. ASEA→REA-T.
6. Toggle FABUF-ACTV.
7. [MEM = INST-FETCH1.
8. [INIT-IBUF-OPS = 1.

FTRF CONTROL STATE

1. [4 + 0 + REA-T]→ASEA and
   [4 + 0 + REA-T] + ABASE→ASEA.
2. ASEA→REA; ASFA→RADO (force 00→$RADO_{32-33}$).
3. [$CACHE-REG = 1.
4. RBAS-B→ZBAS-C; O, REA→RDI; 1→FTRF-TST.
5. ZDI→RBIR, RSIR, RBAS-A, RRDX-A, R29.
6. [READ-IBUF/ZIB (OPS) = 1.

FTRF-NG CONTROL STATE

1. [0 + 0 + REA-T]→ASEA; and
   [0 + 0 + REA-T] + ZBASE→ASFA.
2. [END = 1.

FPIM-1 CONTROL STATE

1. [4 + 0 + REA-T]→ASEA and
   [4 (forces 00→$RADO_{32-33}$) + 0 + REA-T] + ZBASE→ASFA.
2. ASEA→REA; ASFA→RADO (force 00→$RADO_{32-33}$) and
   [$CACHE-REG = 1.
3. ASEA→REA-T; and
   [MEM = INST-FETCH1; and
   RBAS-B→ZBAS-C.

FPIM-2 CONTROL STATE

1. [4 + 0 + REA-T→ASEA.
2. ASEA→REA; and ASFA→RADO (force 00→$RADO_{32-33}$); and
   [$CACHE-REG.
3. If $\overline{ASFA-C27}$ = 1 then ASEA→REA-T; ASFA, ZWS→RIB-VA,
   RIB-WS; and
   [MEM = INST-FETCH2; IPTR-CUR-SEL→[SZ;
   and
   If ASFA-C27 = 1 then [MEM = NONE; and
   RBAS-B→ZBAS-C, and
   ZDI→RBIR, RSIR, RBAS-A, RRDX-A, R29, and
   [READ-IBUF/ZIB = 1.

FWF-IBUF CONTROL STATE

1. If IBUF-RDY = 1 then [READ-IBUF/ZIB (CUR), and
   ZIB→RBIR, RBAS-A, RRDX-A, R29.

FPIM-EIS CONTROL STATE

1. [4 + 0 + REA-T]→ASEA; and
   [4 + 0 + REA-T] + ZBASE→ASFA.
2. ASEA→REA, and ASFA→RADO (force 00→$RADO_{32-33}$);
   [$CACHE-REG = 1.
3. ASEA→REA-T; and
   [MEM = INST-FETCH1; and
   RBAS-B→ZBAS-C; ASFA-C27→FEIS-STR-CPR; and
   ZIB→RSIR, RBAS-A; and
   If $\overline{BIT} \cdot \overline{MTM-MTR}$ = 1 then ZIB→$RTYP_{0-1}$; and
   If IBUF-RDY = 1 then [READ-IBUF/ZIB, and
   CCS→CCS-REG.

FWF-DESC CONTROL STATE

1. If IBUF-RDY = 1 then [READ-IBUF/ZIB; and

-continued

CCS→CCS-REG.
ZIB→RSIR, RBAS-A; and
If BIT . MTM-MTR = 1 then ZIB→$RTYP_{0-1}$.

FPOP CONTROL STATE

1. If $\overline{FINH-ADR}$ = 1 then
   [Y(29) EIS + X (RRDX-A, RTYP, FNUM) + ADR (29, $RTYP_0$)]→ASEA;
   [Y(29) EIS + X (RRDX-A, RTYP, FNUM) + ADR (29, $RTYP_0$)] + ZBASE→ASFA.
2. If FINH-ADR = 1 then
   [0 + 0 + REA-T]→ASEA;
   [0 + 0 + REA-T] + ZBASE→ASFA.
3. If FID = 1 then
   HOLD-E = 1
   RSIR→ZIDD
   ZIDD→RRDX-A, R29
4. ASEA→REA; ASFA→RADO;
   [$CACHE-REG = 1;
   If $\overline{FIG-LEN}$ = 1 then ZLN→RLEN
5. ASEA→REA-T (RDESC);
   [FID + FRL + FAFI]→FINDA; (TYP=6)·$\overline{FINH-ADR}$→FINDC;
   TYP=9 + $\overline{FINH-ADR}$→FINDB; FINDC + [SET-FINDC→DINDC;
   FINDA + [SET-FINDA→DINDA;
   FINDB + [SET-FINDB→DINDB.
6. RDESC = 00 (First Descriptor)
   If $\overline{FNUM \cdot EDIT}$ = 1 then
   $RSIR_{21-23}$→R1DW; $RTYP_{0-1}$→RTF1;
   If $\overline{FIG-LEN}$ = 1 then $RSIR_{24-35}$→RXPA, RLN1
   If $\overline{FINH-ADR}$ = 1 then $ASFA_{34-35}$→RP4
   $ASFA_{34-35}$→RP0 if $\overline{RSIR21}$ = 1
   $ASFA_{34-36}$→RP0 if RSIR21 = 1.
   If $\overline{FNUM}$ . EDIT = 1 then
   $RSIR_{21-23}$→R1DW; $RTYP_{0-1}$→RTF1; $ASFA_{34-36}$→
   $RCN1_{0-2}$
   $RSIR_{24-29}$→RXPA;
   If FIG-LEN = 1 then $RSIR_{30-35}$→RLN1
   If $\overline{RSIR_{21}}$ = 1 then $ASFA_{34-35}$→RPO
   If $RSIR_{21}$ = 1 then $ASFA_{34-36}$→RPO.
   If FNUM = 1 then
   $RSIR_{24-29}$→RXPA; $RSIR_{21-23}$→R1DW; RTYP0(0)→RTE1;
   $ASFA_{34-36}$→$RCN1_{0-2}$
   $\overline{FIG-LEN}$ = 1 then $RSIR_{30-35}$→RLN1
   If $\overline{RSIR_{21}}$ = 1 then $ASFA_{34-35}$→RP0
   If $RSIR_{21}$ = 1 then $ASFA_{34-36}$→RP0.
   A. If [$\overline{FID}$ · $\overline{FRL}$ · $\overline{FAFI}$ · ($\overline{TYP=6}$ + FINH-ADDR)] = 1 then
      1. 0→FINH-ADR, FIG-LEN
      2. If $\overline{MTM-MTR}$ wherein DREV = MRL + TCTR + SCAN-REV = 1 then 1 =
         [READ-IBUF/ZIB; ZIB→RSIR, RBAS-A;
         01→RDESC; If $\overline{TRANC}$ = 1 then $IR_{30}$→FAFI;
         If $\overline{TRANC}$ = 1 then $RBIR_{9-17}$→$ZIDD_{27-35}$→R29,
         RRDX,A, FID, FRL;
         If TRANC = 1 then ZIB→R29, RRDX-A;
         If $\overline{SCAN}$ · $\overline{CMPC}$ · $\overline{CMPCT}$ = 1 then ZIB→RTYP;
         If EDIT = 1 then 0→FNUM.
      3. If [TCT + SCAN-FWD + MVT + CONV] · [$\overline{ZLN_{24-35} = 0}$ +
         FIG-LEN] · $\overline{FEIT}$ then
         MEM = PRE-READ.
      4. If (NUM2 + NUM3 + EDIT) ($\overline{ZLN_{30-35} = 0}$ + FIG-LEN) ·
         $\overline{FEIT}$ then
         [MEM = PRE-READ.
      5. If MLR ($\overline{ZLN_{24-35} = 0}$ + FIG-LEN) · $\overline{FEIT}$ = 1 then
         (TYP=9) · $\overline{FESCD}$ = 1 then [MEM = LD QUAD;
         1 = [INIT-IBUF; and if
         (TYP=9 · $\overline{FESCD}$ = 1 then [MEM = PRE-READ.
      6. If (CMPC + CMPCT) ($\overline{ZLN_{24-35} = 0}$ + FIG-LEN) · $\overline{FEIT}$
         = 1 then
         (TYP=9) · $\overline{FESCD}$ = 1 then [MEM = RDSGL; [SZ=ZONED;
         (TYP=9 · $\overline{FESCD}$ = 1 then [MEM = PREREAD.
      7. If OTHERWISE = 1 then [MEM = NONE.
   B. If [$\overline{FID}$ · $\overline{FRL}$ · $\overline{FAFI}$ · ($\overline{TYP=6}$ + FINH-ADR)] = 1 then
      1. [MEM = NONE.
7. RDESC = 01 (Second Descriptor)
   If $\overline{EDIT}$ · $\overline{FNUM}$ = 1 then
   $RSIR_{21-23}$→R2DW, RTYP0-1→RTF2;
   If $\overline{FINH-ADR}$ and $\overline{RSIR21}$ = 1 then $ASFA_{34-35}$→RP1
   RSIR21 =  _   RP1   36
   $ASFA_{33-35}$→RP6.
   If $\overline{FNUM}$ · EDIT = 1 then
   $RSIR_{21-23}$→R2DW, RTYP0-1→RTF2;
   $ASFA_{34-36}$→$RCN2_{0-2}$.
   If $\overline{FIG-LEN}$ = 1 then $RSIR_{30-35}$→RLN2.
   If FNUM = 1 then

```
   RSIR24-29→RXPB; RSIR21-23→R2DW;
      RTYP0;(0)→RTF2; ASFA34-36→RCN20-2.
   If FIG-LEN = 1 then RSIR30-35→RLN2.
   A. IF FID · FRL · FAFI · (TYP=6 + FINH-ADR) = 1 then
      1. 0→FINH-ADR, FIG-LEN.
      2. If (NUM3 + EDIT) = 1 then
            RBIR0-8→ZIDD27-35→R29, RRDX-A,
            FID, FRL;
         [READ-IBUF/ZIB (CUR); IR30→FAFI
            ZIB→RSIR, RBAS-A, RTYP.
      3. If (NUM2 + NUM3 + EDIT) (ZLN30-35 = 0
            + FIG-LEN) · FE2I then
            [MEM = PRE-READ,
            10→RDESC if NUM2 + NUM3.
      4. (ZLN24-35 = 0 + FIG-LEN) · FE2I.
      5. If (CMPC + CMPCT) = 1 then [MEM = PR-RD.
      6. If OTHERWISE = 1 then [MEM = NONE.

B. If FID · FRL · FAFI (TYP=6 + FINH-ADR) = 1 then
      1. [MEM = NONE.
8. RDESC = 10 (Third Descriptor)
   If FNUM · EDIT = 1 then
      RSIR21-23→R1DW, If RTYP0-1=00 = 1 then 1→RTF3
                      If RTYP0-1≠00 = 1 then 0→RTF3
   If FIG-LEN = 1 then RSIR24-35→RLN1
   IF FINH-ADR = 1 then ASFA34-35→RP4;
                      If RSIR21 =then ASFA34-35→RPO
                      If RSIR21 = 1 then ASFA34-36→RPO.
   If FNUM · EDIT = 1 then
      RSIR21-23→R1DW, If RTYP0-1=00 = 1 then 1→RTF3
                      If RTYP0-1=00 ≠ 1 then 0→RTF3
   If FIG-LEN = 1 then RSIR30-35→RLN1
   If RSIR21 = 1 then ASFA34-35→RPO
   If RSIR21 = 1 then ASFA34-36→RPO.
   If FNUM = 1 then
      RSIR21-23→R1DW; If RTYP0=0 = 1 then 1→RTF3
                      If RTYP0≠0 = 1 then 0→RTF3
   If FIG-LEN = 1 then RSIR30-35→RLN1
   If RSIR21 = 1 then ASFA34-35→RPO
   IF RSIR21 = 1 then ASFA34-36→RPO.
   A. IF [FID · FRL FAFI (TYP=6 + FINH-ADR)] = 1 then
      1. [MEM = NONE.
   B. If [SET-FESC = 1 then 1→FESCD.

FIDESC CONTROL STATE
1. [Y(29) + X(RRDX-A) + ADR(29)]→ASEA;
   [Y(29) + X(RRDX-A) + ADR(29)] + ZBASE→AFA;
   ASEA→REA; ASFA→RADO;
   [CACHE REG = 1;
   If DU + DL = 1 then [MEM = READ-SNGL; [SZ = SINGLE); 1 =
   [HOLD-E; 0→FID; RBIR30→FAFI;
   If RDESC = 00 then RBIR27-35→ZIDD→R29,
      RRDX-A, FRL;
   If RDESC = 01 then RBIR9-17→ZIDD→R29, RRDXA,
      FRL;
   If RDESC = 10 then RBIR0-8→ZIDD→R29, RRDX-A,
      FRL.

FWF-IDESC CONTROL STATE
1. ZDI→RBIR, RBAS-A;
   HOLD-E = 1
   If RDESC = 00 and
      if BIT · MTM-MTR = 1 then ZDI = RTYP
   If RDESC = 01 and
      if (SCAN + CMPC + CMPCT) = 1 then ZDI→RTYP
   If RDESC = 10 then ZDI→RTYP.
```

| | | ABBREVIATIONS OF TERMS USED IN THE HARDWIPED CONTROL STATE ACTIONS SECTION |
|---|---|---|
| 1. | Y(29) | = $\overline{R29}$ = RSIR$_{0-17}$→ZY |
| | | R29 = RSIR$_{3,3,3,3-17}$→ZY |
| 2. | Y(29) EIS | = $\overline{R29}$ = RSIR$_{0-20}$→ZY |
| | | R29 = RSIR$_{3,3,3,3-20}$→ZY |
| 3. | X(RRDX-A) | = $\overline{RSIR_{30}}$ = ENAB-ZX as a function of RRDX-A |
| | | RSIR$_{30}$ = DISABLE ZX |
| 4. | ADR(29) | = $\overline{R29}$ = 0→ZZ$_{0-20}$ |
| | | R29 = ZAR$_{0-19}$→ZZ$_{0-19}$; 0→ZZ$_{20}$ |
| 5. | RBAS-A(29) RSPP | = $\overline{R29}$ = 0010→RSPP$_{0-3}$ |

-continued
ABBREVIATIONS OF TERMS USED IN THE
HARDWIPED CONTROL STATE ACTIONS SECTION

| | | |
|---|---|---|
| | | $R29 = 1,RBAS\text{-}A_{0\text{-}2} \rightarrow RSPP_{0-3}$ |
| 6. | [READ-IBUF/ ZIB(CUR) | = [READ-IBUF/ZIB<br>$\underline{FABUF\text{-}ACTV} = 0 \rightarrow DRDB$<br>$\overline{FABUF\text{-}ACTV} = 1 \rightarrow DRDB$ |
| 7. | [READ-IBUF/ ZIB(OPS) | = [READ-IBUF/ZIB<br>$\underline{FABUF\text{-}ACTV} = 1 \rightarrow DRDB$<br>$\overline{FABUF\text{-}ACTV} = 0 \rightarrow DRDB$ |
| 8. | [END | = If $\overline{XED\ RPT\ RPL\ RPD\ XEC}$ then<br>ZIB→RBIR, RSIR, RBAS-A, RRDX-A, R29;<br>If $\underline{FTRF\text{-}TST}.\overline{TRGO} = 1$ and<br>If $(\overline{IBUF\text{-}EMPTY}.IBUF\text{-}RDY) = 1$ then<br>[READ-IBUF/ZIB(OPS);<br>If $\overline{FTRF\text{-}TST} = 1$ and<br>If $\overline{EIS} + \overline{FTRFNG} = 1$ then $IC + 1 \rightarrow IC$;<br>If $EIS.\overline{FTRFNG} = 1$ then $IC + CCS\text{-}R_{1\text{-}3} \rightarrow$<br>IC;<br>If $(\overline{IBUF\text{-}EMPTY}.IBUF\text{-}RDY) = 1$ then<br>[READ-IBUF/ZIB(CUR);<br>If $\overline{FTRF\text{-}TST} = 1$ then $0 \rightarrow FINH\text{-}ADR.$ |
| 9. | RI | = $RSTR\ \overline{30}\ .\ 31.$ |
| 10. | IR | = $RSIR\ 30\ .\ 31.$ |
| 11. | IT-I | = $(RSIR\ 30\ .\ \overline{31})\ (RRDX\text{-}A0.\overline{1.2}.3).$ |
| 12. | X(RRDX-A, RTYP, FNUM | = ENABLE ZX as a function of RRDX-A, RTYP, FNUM. |
| 13. | ADR(29, RTYP$_0$) | = $\overline{R29} = 0 \rightarrow ZZ_{0-20}$<br>$R29 = ZAR_{0-19} \rightarrow ZZ_{0-19}$;<br>$RTYP_0 = ZAR20 + 21.22 +$<br>$\underline{21.23} \rightarrow ZZ20$<br>$\overline{RTYP_0} = 0 \rightarrow ZZ20.$ |
| 14. | ASEA→REA-T (RDESC) | = ASEA→REA-T<br>RDESC = 00 = 000→ZBAS-C<br>RDESC = 01 = 001→ZBAS-C<br>RDESC = 10 = (01, FABUF-ACTV)→<br>ZBAS-C. |
| 15. | [SRTYP-B | = If $\underline{BIT} = 11 \rightarrow RTYP\text{-}B_{0-1}$<br>If $\overline{BIT} = RTYP_0, RTYP_1.\overline{FNUM} \rightarrow$<br>$RTYP\text{-}B_{0-1}.$ |
| 16. | [SCACHE-REG | = STROBE CACHE CONTROL REGISTERS. |
| 17. | CCS→CCS-REG | = ZREG(CCS-R→RREG→RRDX-B on next clock pulse; CCS-02→FNUM. |
| 18. | TYP9 | = $RTYP_0\uparrow +\underline{RTYP0}$ . FNUM. |
| 19 | TYP6 | = $RTYP_{0\ 1}$ . FNUM. |

Now, the operation of the apparatus of the present invention will be described with reference to several instructions. By way of example discussed with specific reference to the flow chart of FIG. 8, it is assumed that the instruction buffer contains a pair of instructions which corresponds to a load A (LDA) followed by an add to A (ADA) instruction. These instructions have the format shown in FIG. 9a. For ease of explanation and the description given above, it will be assumed that the tm portion of the tag field of each instruction does not specify an indirect address operation. Also, it is assumed that the instructions do not specify a direct upper (DU) or direct lower (DL) type of operation.

The first instruction (LDA) is assumed to have an address specifying the first word (0) of a 4 word block which does not reside in cache unit 750 while the second instruction (ADA) has an address specifying the third word of the same 4 word block. The fastest time that a block can be forwarded by main memory 800 to cache unit 750 is two words followed by a free cycle during which no information is forwarded which is followed by two more words. During that free cycle, the processor 700 is able to execute the ADA instruction except that as explained herein the required data word will have not been received from main memory 800. The following example illustrates how the arrangement of the present invention prevents interference between commands resulting from processing the two instructions and eliminates the issuance of duplicate commands. This is done while the amount of overlap necessary in processing instructions in a pipelined fashion.

The operation codes of the LDA and ADA instructions referenced locations in the CCS control store 701-2 including CCSS fields having the code 000000. This means that the LDA and ADA instructions are included within the LD-SGL class.

Referring to FIG. 7, it is seen that the processor hardware circuits in completing the I cycle operation takes path FPOA→point XXX43 FPOA. During the FPOA control state, the processor 700 performs under hardware control the following operations. It generates an effective address as a function of the contents of R29 register 704-162, RBAS-A register 704-156 and RRDX-A register 704-158. The resulting effective address is loaded into the REA register. It is also added to the base address and thereafter loaded into the RADO register 704-46 of FIG. 3e. Since the tm portion, the instruction tag field does not specify indirection, the control flag EA is forced to a binary ONE. Also, a code (RBIR 24-26) specifying the A register is loaded into RREG register 714-42 of FIG. 3g.

As mentioned, the CCS field referenced by the LDA instruction is coded to specify a LD-SGL sequence. Since the td portion of the tag field of the instruction does not specify a DU or DL operation, the processor circuits of block 704-108 generate a read signal command to be issued to cache unit 750 under hardware control.

In greater detail, the generated address corresponding to the descriptor absolute address loaded into the RADO register 704-46 serves as the command address. Additionally, command bits 104 and zone bits 5–8 are generated by the circuits 704-118 of FIG. 3c and switch 704-40. These signals are applied through switch 704-40 in place of bits 1–8 from switch 704-46 while bits 0 and 9 are forced to ZEROS. The zone bits 5–8 are set to binary ONES since they are not used for read commands. Command bits 1–4 are converted to a command code of 0111 by the decoder circuits of block 704-118. This command code specifies a memory read quad operation for fetching a 4 word block from main memory 800.

The circuits of block 704-108 in response to the CCS field and control state signals from block 704-102 operate to generate hardware cache memory command control signals [MEMOTB through [MEM3TB. In the case of a cache read single command, the signals [MEMOTB through [MEM3TB correspond to a code of "1000". The circuits of block 704-108 generate the signals [MEMOTB through [MEM3TB in accordance with the following Boolean expressions:

[MEM0TB through [MEM3TB forces REQCAC flip-flop 704-134 to a binary ONE. This signals the cache unit 750 of the command. During control state FPOA, the processor 700 under hardware control performs an [END operation wherein it updates the instruction counter and loads the next instruction (ADA) into the RBIR, RSIR, RBAS-A, RRBX-A and R29 registers. Also, the hardware circuits of block 704-102 switch back to control state FPOA to begin execution of the ADA instruction during the next or second cycle of operation.

The ADA instruction also requires one cycle for completion. The processor 700 carries out the same operations as discussed in connection with the LDA instruction. The only difference is in the E cycle wherein a different microinstruction is specified by the CCS address.

During the next cycle which corresponds to a second FPOA cycle, the cache unit 750 executes a cache cycle of operation in parallel with the I cycle operations.

As concerns cache unit 750, in response to the DREQCAC line being switched to a binary ONE, the read single (ZAC) command applied to lines ZPSWA0-39 is written into an empty location of the RZAC buffer 750-102 specified by the contents of counter 750-106. As mentioned, the address of this location is determined by

```
[MEMO-TB  = FELSTRG
           + TERMG.EA.EIS.ESC.TRF
           + TERMG.FCHAR.EA.DU-DL.(STRG + RDCLR
           +LDDBLG + LDHWUG + LDSGLG).
[MEM1-TB  = FPOA.TRF.EA.FTRF-TST
           + FTRF + FPIM-2 + FPI-INIT + FPIM-1
           +FPIM-EIS + FDEL.DELSTRG
           + FPOA.TERMG.EA.FCHAR.STRG
           + EIS TERMA + EIS TERMB.
[MEM2-TB  = TERMG.EA.[LDDBLG + STRDBL
           + FDEL.DEL-STR-DBL]
           + EIS TERMA + EIS TERMB.
[MEM3-TB  = FTRF + FPIM2
           + TERMG.EA.[(DU-DL).FCHAR + RD-CLR + EFFADRG]
           + EISTERMA.
wherein TERMG  = FPOA.(FTRF-TST + [TRG0);
     EIS TERMA = FPOP.DESCO.FE11N.(CMPC + CMPCT + SCAN-FWD
               + MVT + TCT + CONV + DNUM2 + DNUM3 + EDIT)
               + FPOP.DESC1.FE2N (DNUM2 + DNUM3 + EDIT
               + CMPC + CMPCT); and,
     EIS TERMB = FPOP.DESCO.FE11N.MLR
```

These expressions show the relationship between the CCS codes and the command signals applied to the DNEM lines.

Other circuits included within block 704-108 decode the CCS field and generate the [SZ signals which indicate which half of the RDI register 704-164 is to be loaded. The [SZ signals serve as a size indicator providing information as to whether it is a direct upper (DU) or direct lower (DL) operation or single operation. In the case of a read single operation, the [SZ signals are binary ZEROS.

The circuits of block 704-106 force the register strobe signals [CACHE-REG and [CCS to binary ONES. The signal [CACHE-REG loads the read single command code into the RMEM register 704-130 while the [CCS signal loads the address of the CCS word applied via the bus 704-204 to be loaded into the ECS address register 701-10 of FIG. 3b. The cache command code stored in RMEM register 704-130 is applied via the decoder circuits of block 704-118 to the DMEM lines while the command word loaded into the RADO register 704-46 is applied to the cache unit 750 via the RADO/ZADO lines. Also, the decoder 704-120 in response to signals the states of the busy bits. However, by way of example, it is assumed that the buffer 750-102 is empty and all the busy bits are reset. Therefore, the ZAC command is written into location 0. This entry is made independently of whether there is a hit or miss condition (i.e., state of BPSD).

Figure 8:
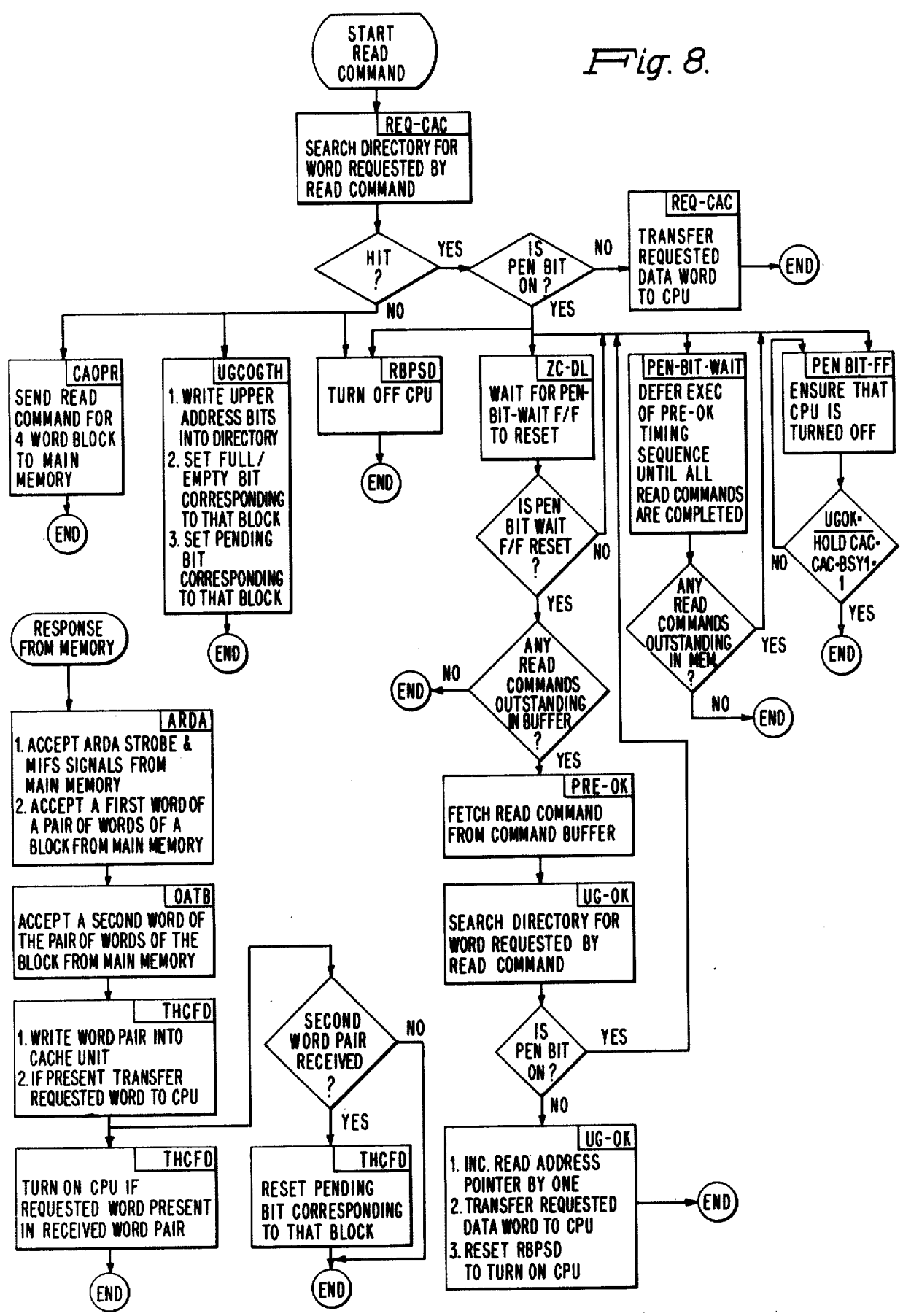
FIG. 8 is a flow diagram used in explaining the operation of a preferred embodiment of the present invention.

Referring to FIG. 8, it is seen that when the REQCAC line is a binary ONE, the cache unit 750 accesses the directories 750-500 and 750-502 and cache storage 750-700 utilizing the address signals from the RADO lines 25–33 applied via switch 750-702. This is done with the decoding of the cache command applied to the lines DMEM0-3 by decoder 750-166.

The comparison circuits 750-536 through 750-542 compare the LDA instruction address with the address read out from directory 750-502. Since the word specified by the LDA instruction is not in cache, the circuits 750-560 hold hit signal BSPD at a binary ZERO. However, during the directory search cycle, before the cache unit 750 detects a hit or miss condition, the ZAC command is loaded into SIU output register 750-174 via the ZPSWA switch 750-110 and ZPSW switch 750-178. The cache unit 750 assumes a miss condition.

As seen from FIG. 8, since the result of the directory search cycle is a miss, the decoding of the read single cache command causes the control state flip-flops CAOPR, UGCOGTH and RBPSD of blocks 750-3 to be set to binary ONES. This causes the cache unit 750 to execute the three parallel operations indicated in FIG. 8 during the next cycle of operation which corresponds to a directory assignment cycle. Because of the miss condition, the cache unit 750 sets the busy bits (a pair) and advances by one the address pointer (not shown) to the next empty location (location 1). Since this is read quad command, a pair of busy bits are set to binary ONES and the resulting value is loaded into the MIFS register 750-138. This coding is used to identify which words of the read quad command are outstanding.

Under the control of the UGCOGTH control state flip-flop, the cache unit 750 performs a directory assignment cycle wherein the upper address bit signals included with the ZAC command address previously written into RZAC buffer 750-102 are passed through ZAC switch 750-152 and instead of being compared as in the previous cycle are written into directory 750-502 at the location specified by the address applied CADDL0-6 of the block designated by the contents of block register 750-524. The block address as described above is generated in accordance with the state of the full/empty (F/E) bits or the round robin (RR) bit when all of the full/empty bits are set indicating that all of the blocks are full and one must be replaced. As mentioned, these bits are read out during the directory search cycle and decoded to establish the available block address.

As seen from FIG. 8, the cache unit 750 generates signals which set the full/empty bit corresponding to the specified block to a binary ONE thereby indicating that the location contains valid data. Also, the cache unit 750 sets the pending bit corresponding to that same block to a binary ONE in accordance with the state of signals BKDCD0-3. These signals are applied via an OR circuit of block 750-512. It will be noted from FIG. 4, that decode of the block location being written into corresponding to signals BKDCD0-3 are also written into a register location of block 750-520 specified by address signals PRZACW0-1. This indicates which pending bit to reset at a later time when the 4 word of the requested block have been received.

The pending bit when set indicates that the operation is now outstanding. Additionally, during the directory assignment operation, the cache unit 750 under the control of the CAOPR flip-flop makes a request to the SIU 100 for a memory operation.

In greater detail, the CAOPR flip-flop forces the AOPR to a binary ONE signaling the SIU 100 of the memory request. At that time, the cache unit 750 applies the ZAC command to the DTS lines together with the appropriate memory identifier signals and steering signals being applied to the MITS and SDTS lines respectively. The memory identifier signals generated by the setting of the busy bits in response to the read quad command are applied via the MITS register 750-138 previously loaded via register 750-106 and switch 750-139. The steering signals are generated in a conventional manner by means, not shown. For further information regarding the use of steering signals, reference may be made to U.S. Pat. No. 4,006,466.

The SIU 100 signals acceptance of the cache memory request by forcing line ARA to a binary ONE. As seen from FIG. 8, the cache unit 750 under the control of the RBPSD flip-flop turns off processor 700 by forcing the CPSTOP00 line to a binary ZERO. This completes the series of parallel actions generated in response to the signal applied to the DREQCAC line which is indicated by the END symbols.

At this time, all flip-flops except the RBPSD flip-flop (i.e., CAOPR, UGCOGTH, etc.) are reset to binary ZEROS until the occurrence of a next cache request.

As seen from FIG. 8, the remaining operations performed by cache unit 750 occur as a result of responses from main memory 800 indicated by forcing the ARDA line to a binary ONE. It is assumed here that the main memory 800 is able to process the cache read quad command immediately wherein it is operative during a next cycle to transfer a first pair of data words of the requested block. Upon such transfer, the SIU 100 forces the ARDA line to a binary ONE indicating that the even word of the pair (assume word 0) is available on the DFS lines. The SIU 100 also forces the DPFS line to a binary ONE indicating a double word transfer.

During the time the ARDA line is a binary ONE, the cache unit 750 loads the first data word into the RP register 750-179. Also, multiport identifier signals from the MIFS lines indicating the pair of words being transferred are loaded into the RMIFS register 750-125. It is assumed that the MIFS signals indicate that word 0 and 1 of the desired 4 word block are being received (e.g. a code of 000).

Bits 2 and 3 of the MIFS signals stored in register 750-125 are used to access the ZAC read command stored in location 0 of the RZAC buffer 750-102. The address is applied via the ZAC switch 750-152 to the cache storage 750-700 and directories 750-500 and 750-502.

In parallel, with accessing directories 750-500 and 750-502 and cache storage 750-700, the first data word is transferred to the RDO register 750-180. The signal applied to the DPFS line switches the OATB flip-flop to a binary ONE. Under control of this flip-flop, the second word (word 1) is loaded into RP register 750-179. Thereafter, it is loaded into the RD1 register 750-180. Upon the occurrence of a next clock pulse, the THCFD flip-flop switches to a binary ONE. Under the control of this flip-flop, the pair of words (words 0 and 1) are written into the block location of cache storage 750-700 specified by the ZAC command address bits via ZAC switch 750-152. Also, the first busy bit is reset in accordance with the coding of the MIFS1-3 signals.

As seen from FIG. 8, the cache unit 750 transfers the requested data word (word 0) to the processor 700 by forcing signals OPSW0-2 to predetermined pattern for enabling the transfer of word 0 via ZDO switch 750-9 and ZBP switch 750-902.

Also, the cache unit 750 forces the DATA-RECOV signal to a binary ONE enabling the data word to be strobed into the processor's data register. At the end of the THCFD cycle, the RBPSD flip-flop is permitted to reset to a binary ZERO. This causes the CPSTOP00 line to switch to a binary ONE turning on processor 700. However, the processor 700 does not perform any operations until the following cycle.

At this point, only the first pair of words has been received and there are still two words outstanding. The processor 700 having completed the I cycle operations relative to the ADA instruction will have generated another ZAC read command in the same manner previously described. The difference is that this command includes an address specifying word 3 of the block being fetched. However, since the processor 700 was being turned off, cache unit 750 did not accept the second read command applied to the RADO/ZADO lines. Once the processor 700 is turned on, the cache unit 750 is operative to accept the read command coded to specify a read quad operation applied to the RADO/ZADO lines. At this time, the DMEM lines are again set to specify a cache read single command while the DREQCAC line is set to a binary ONE. In a similar manner, the cache unit 750 writes the second read command into location 1. Also, during this cycle, processor 700 completes its execution of the LDA instruction under microprogram control. That is, the requested data word is loaded into the A register as a function of the contents of the RRDX-B register.

In the manner previously described, the cache unit 750 performs a directory search by applying the upper address bits to the directories 750-500 and 750-502. This time, while the comparator circuits of blocks 750-536 through 750-542 generate an output indicative of a hit, the pending bit inhibits the directory hit/miss detection circuits 750-560 from forcing signal BPSD to a binary ONE. Also, the signal PENBIT used to generate the signals for setting the busy bit indications is a binary ZERO. This inhibits the setting of such indications within the registers 750-120 and 750-122.

As seen from FIG. 8, since pending bit for the requested block has been set to a binary ONE, cache unit 750 is operative to perform the 4 sets of indicated parallel actions. Of course, when the pending bit is not set to a binary ONE, the cache unit 750 transfers the requested word to processor 700. First, the set pending bit causes the PBPSD flip-flop to be switched to a binary ONE which in turn results in the processor 700 being turned off. It remains turned off until the requested data word is received from main memory 800.

Also, the set pending bit inhibits control flip-flop CAOPR from being set to a binary ONE. Thus, from the operation of the circuits generating requests to main memory 800, the command is viewed effectively as a miss forced by the set pending bit. This action prevents the issuance of a duplicate command to main memory 800.

It can be seen from FIG. 8 that the set pending bit causes the ZCDL, the PENBIT-WAIT and PENBIT flip-flops to be set to binary ONES. The ZCDL flip-flop establishes a waiting state used as explained herein to reinitiate the execution of other commands stored in the RZAC buffer 750-102. Thus, when conflicts concerning redundant commands or overlap conditions which could result in transferring incorrect data to processor 700 are detected by the cache unit 750 resulting in the setting of a pending bits, this causes the ZC-DL flip-flop to be set to binary ONE.

The PENBIT-WAIT flip-flop when set to a binary ONE defers the execution of the sequence of operations beginning with state PRE-OK until all outstanding memory commands requesting data from main memory whose execution has been blocked by the setting of the pending bit have been processed. Of course, this is with the exception of the command currently being executed by cache unit 750.

The PENBIT flip-flop when set essentially establishes the conditions that existed during the initial receipt of the command (DREQCAC) that were not responded to because of the pending bit being set to a binary ONE. Until requested data has been received, the ZCDL flip-flop remains set to a binary ONE. While a binary ONE, it ensures that processor 700 remains turned off in all cases.

In the present example, next the main memory 800 forwards the first word (word 2) of the requested 4 word block to cache unit 750. That is, upon such transfer the SIU 100 again forces the ARDA line to a binary ONE indicating that the even word of the pair (word 3) is available on the DFS lines. Again, the SIU 100 also forces the DPFS line to a binary ONE indicating a double word transfer.

During the time the ARDA line is a binary ONE, the cache unit 750 loads the third data word into the RP register 750-179. Also, multiport identifier signals from lines MIFS coded to indicate the transfer of a second pair of words of the requested block are loaded into the RMIFS register 750-125. That is, the MIFS signals indicate that words 2 and 3 are being received (e.g. code of 100).

Additionally, the MIFS signals select the portion corresponding to location 0 to establish whether the word pair being received is the second pair. Since it is the exclusive OR circuit 750-131 forces the BB set signal to a binary ONE. This causes signal SECRCV to be forced to a binary ONE. In the manner previously described, MIFS bit signals 2 and 3 are used to access location 0 of RZAC buffer 750-102 which stores the first ZAC read command now being executed. The command address is applied via the ZAC switch 750-152 to the cache storage 750-152 to the cache storage 750-700 and directories 750-500 and 750-502.

In parallel with such accessing, word 3 is transferred to the RDO register 750-180.

Upon the switching of the OATB flip-flop, the second word (word 3) is loaded into THE RP register 750-179. Thereafter, it is loaded into the RD1 register 750-180. Upon the occurrence of a next clock pulse, the THCFD flip-flop switches to a binary ONE. Under the control of this flip-flop, the second pair of words (words 2 and 3) are written into the block location of cache storage 750-700 specified by the ZAC command address bits applied from ZAC switch 750-152.

Also, the second busy bit is reset in accordance with the coding of the MIFS1-3, signals at the end of cycle THCFD. Since signal SECRCV is a binary ONE, this causes the pending bit to be reset to a binary ZERO. Resetting takes place via an AND circuit included within block 750-512. The circuit ANDs the complemented signals RSPEN0-3 with the present contents of the pending bit signals read out from the read pending section of directory control 750-500. The RMIF bit signals 2 and 3 are used to select the register storing the previously written BKDCD0-3 signals, the complement of which correspond to signals RSPEN0-3. The result is that the previously set pending bit is masked out and the resulting value is written back into directory control 750-500. Thus, only the previously set pending bit is reset to a binary ZERO.

As seen from FIG. 8, upon completing the execution of the first read single command, the PENBIT-WAIT flip-flop is permitted to reset to a binary ZERO. The reason is at this time there are no outstanding read commands involving main memory (i.e., not awaiting receipt of further data from memory). The operations for this series of actions are completed as indicated by the END symbol. The resetting of the PENBIT-WAIT flip-flop enables the cache unit 750 to initiate the timing sequence following state ZCDL.

Since processor 700 has not completed the processing of the second read command, the read address pointer value supplied from an out counter, not shown, has not been advanced. Thus, when this value is compared against the address indicative of the next empty location, the result indicates there is still a read command residing in RZAC buffer 750-102.

Accordingly, the PRE-OK flip-flop is switched to a binary ONE. When set, this flip-flop indicates that the cache unit 750 tried to execute a read command and formed the pending bit set which corresponds to the block specified by the command address. Under the control of the PRE-OK flip-flop, the read command stored in location 1 specified by the out counter (COUT) is accessed and the command address is applied via ZAC switch 750-152 to the directories 750-500 and 750-502 and cache storage 750-700.

Following the fetching of the command, the PRE-OK flip-flop is reset while the UG-OK flip-flop is set to a binary ONE. This flip-flop enables the cache unit 750 to perform operations similar to those performed in response to the setting of the DREQCAC line. However, such actions will not include the turning off of processor 700, the making of a directory assignment and the sending of a memory request.

Under the control of the UG-OK flip-flop, the cache unit 750 performs a directory search operation. Since the initiation of this sequence of operations is being performed for a read command whose operation was deferred, the comparator circuits of blocks 750-536 through 750-542 generate an output indicative of a hit condition. Since the pending bit associated with the specified block has been reset, the cache unit 750 performs the remaining operations indicated.

It will be noted that when the UG-OK flip-flop was set to a binary ONE, this enabled the PENBIT flip-flop to be reset to a binary ZERO (i.e., UGOK.HOLD-CAC.CACBSY1=1). This in turn completed the actions associated with the PENBIT flip-flop as indicated by the END symbol. Accordingly, this permits the processor 700 to be turned on during state UG-OK. However, before that, the out counter address is incremented by one and the requested data word (word 3) is transferred to processor 700. At that time, the signal DATARECOV is forced to a binary ONE enabling the strobing of the processor's registers. This completes the sequence of actions at the end of which the UG-OK flip-flop is reset to a binary ZERO. During the next cycle of operation, processor 700 under microprogram control executed the ADA instruction. That is, the execution unit adder 714-20 adds the contents of the A register selected as a function of the RRDXB register contents applied to the ZEB lines to the value applied to the RDI lines by cache unit 750. The result is transferred to the A register via the ZRESA bus and switch 714-36.

It will be appreciated that if there are more deferred commands, the same sequence is executed but the ZCDL flip-flop is not permitted to reset to a binary ZERO. The ZCDL flip-flop is only permitted to reset when there are no more commands outstanding. An example where additional read commands may be deferred is the situation where processor 700 issues two pre-read commands followed by a read single command. For further information regarding pre-read commands, reference should be made to the copending patent application "Data Processing System Programmable Pre-Read Capability".

Additionally, it will be noted that the arrangement of the present invention prevents conflicts during the fetching of new instructions. For example, it is assumed that processor 700 begins the processing of a transfer instruction. During the I cycle operation, the processor 700 generates a pair of commands accompanied by cache I fetch 1 and I fetch 2 commands applied via the DMEM lines. In the manner previously described, the cache unit 750 is operative to set a first pending bit in response to the I fetch 1 command and a second different pending bit in response to the I fetch 2 command. When the cache unit 750 receives the 4 words of a block from main memory 800, it turns on processor 700 which begins the execution of a first instruction within the first fetched block. That is, the I fetch 2 command is handled similar to a pre-read command in that the processor 700 can continue its operation during the fetch operation.

Such instruction is assumed to be a load A instruction which includes an address designating one of the words of the block being fetched in response to the I fetch 2 cache command.

Accordingly, the cache unit 750 in response to the read single command generated in response to the load A instruction is operative upon detecting the presence of the set pending bit to defer execution of the read command until all of the words of the block specified by the I fetch 2 command have been received. Also, the processor 700 is turned off. When the words of the second block have been received, the cache unit 750 performs operations similar to those described in connection with the second read command discussed above.

From the foregoing, it is seen how the arrangment of the present invention prevents interference between memory commands as well as the issuance of duplicate commands. Additionally, the arrangment of the invention can be used to facilitate diagnosis of the cause of processor errors or failures. In the system of FIG. 1, the input/output processor 200 has the capability to issue PI commands for the purpose of examining the contents of different registers within processor 700.

Additionally, this includes the capability of examining the contents of storage sections within cache unit 750. Assuming the presence of an apparent failure within processor 700, the processor 700, the processor 200 would issue a PI command coded to specify that the flush counter 750-1000 be loaded with a particular address.

Upon the decoding of the PI command, the appropriate signals are generated which cause an address value applied to lines ZPIDT29-35 to be loaded into the counter 750-1000.

Next, the processor 200 issues a second PI command coded to specify a read operation. A predetermined portion of command signals are applied via the ZPIB9-10 to the decoder circuits 750-1002. During cache read operation, the circuit 750-1002 generates signals which select the appropriate set of control directory signals (i.e., signals RSPEN0-3, OLDPEND0-3, RDR F/E0-3, etc.). These signals together with the upper address signals from directory 750-502 are applied to the OR circuits of block 750-712 and forwarded to the processor 200 via the PDTS lines of PI interface 602. By examining the states of the pending bit signals, the processor 200 is able to establish unsuccessful completion of the process of issuing a memory request and receiving back all of the words of a block. In such an instance, the processor 200 fetches from directory 750-502 the address corresponding to a set pending bit. Upon receiving such address signals and appending the signals to the lower address signals, processor 200 could then access main memory 800 to find out what instruction or data was being executed or accessed at the time of failure. Thus, by being able to examine the pending bit contents of control directory 750-500, it is possible within a short amount of time to narrow down the problem to a particular area.

From the foregoing, it is seen how the arrangement of the present invention provides for an improved cache unit having the features and advantages mentioned.

APPENDIX A
SINGLE WORD INSTRUCTIONS
DATA MOVEMENT

| | |
|---|---|
| LDA | Load A |
| LDQ | Load Q |
| LDAQ | Load AQ |
| LDAC | Load A and Clear |
| LDQC | Load Q and Clear |
| LDXn | Load Xn (n = 0, 1, ...7) |
| LXLn | Load Xn from Lower (n = 0, 1, ...7) |
| LCA | Load Complement A |
| LREG | Load Registers |
| LCQ | Load Complement Q |
| LCAQ | Load Complement AQ |
| LCXn | Load Complement Xn (n = 0, 1, ...7) |
| EAA | Effective Address to A |
| EAQ | Effective Address to Q |
| EAXn | Effective Address to Xn (n = 0, 1, ...7) |
| LDI | Load Indicator Register |
| STA | Store A |
| STQ | Store Q |
| STAQ | Store AQ |
| STXn | Store Xn into Upper (n = 0, 1, ...7) |
| SXLn | Store Xn into Lower (n = 0, 1, ...7) |
| SREG | Store Register |
| STCA | Store Character of A (6 bit) |
| STCQ | Store Character of Q (6 bit) |
| STBA | Store Character of A (9 bit) |
| STBQ | Store Character of Q (9 bit) |
| STI | Store Indicator Register |
| STT | Store Timer Register |
| SBAR | Store Base Address Register |
| STZ | Store Zero |
| STC1 | Store Instruction Counter plus 1 |
| STC2 | Store Instruction Counter plus 2 |
| ARS | A Right Shift |
| QRS | Q Right Shift |
| LRS | Long Right Shift |
| ALS | A Left Shift |
| QLS | Q Left Shift |
| LLS | Long Left Shift |
| ARL | A Right Logic |
| QRL | Q Right Logic |
| LRL | Long Right Logic |
| ARL | A Left Rotate |
| QLR | Q Left Rotate |
| LLR | Long Left Rotate |

FIXED POINT ARITHMETIC

| | |
|---|---|
| ADA | Add to A |
| ADQ | Add to Q |
| ADAQ | Add to AQ |
| ADXn | Add to Xn (n = 0, 1, ...7) |
| ASA | Add Stored to A |
| ASQ | Add Stored to Q |
| ASXn | Add Stored to Xn (n = 0, 1, ...7) |
| ADLA | Add Logic to A |
| ADLQ | Add Logic to Q |
| ADLAQ | Add Logic to AQ |
| ADLXn | Add Logic to Xn (n = 0, 1, ...7) |
| AWCA | Add With Carry to A |
| AWCQ | Add With Carry to Q |
| ADL | Add Low to AQ |
| AOS | Add One to Storage |
| SBA | Subtract from A |
| SBQ | Subtract from Q |
| SBAQ | Subtract from AQ |
| SBXn | Subtract from Xn (n = 0, 1, ...7) |
| SSA | Subtract Stored from A |
| SSQ | Subtract Stored from Q |
| SSXn | Subtract Stored from Xn (N = 0, 1, ...7) |
| SBLA | Subtract Logic from A |
| SBLQ | Subtract Logic from Q |
| SBLAQ | Subtract Logic from AQ |
| SBLXn | Subtract Logic from Xn (n = 0, 1, ...7) |
| SWCA | Subtract With Carry from A |
| SWCQ | Subtract Wtih Carry from Q |
| MPY | Multiply Integer |
| MPF | Multiply Fraction |
| DIV | Divide Integer |
| DVF | Divide Fraction |
| NEG | Negate A |
| NEGL | Negate Long |

BOOLEAN OPERATIONS

| | |
|---|---|
| ANA | AND to A |
| ANQ | AND to Q |
| ANAQ | AND to AQ |
| ANXn | AND to Xn (n = 0, 1, ...7) |
| ANSA | AND to Storage A |
| ANSQ | AND to Storage Q |
| ANSXn | AND to Storage Xn (n = 0, 1, ...7) |
| ORA | OR to A |
| ORQ | OR to Q |
| ORAQ | OR to AQ |
| ORXn | OR to Xn (n = 0, 1, ...7) |
| ORSA | OR to Storage A |
| ORSQ | OR to Storage Q |
| ORSXn | OR to Storage Xn (n = 0, 1, ...7) |
| ERA | Exclusive OR to A |
| ERQ | Exclusive OR to Q |
| ERAQ | Exclusive OR to AQ |
| ERXn | Exclusive OR to Xn (n = 0, 1, ...7) |
| ERSA | Exclusive OR to Storage A |
| ERSQ | Exclusive OR to Storage Q |
| ERSXn | Exclusive OR to Storage Xn (n = 0, 1, ...7) |

COMPARE

| | |
|---|---|
| CMPA | Compare With A |
| CMPQ | Compare With Q |
| CMPAQ | Compare With AQ |
| CMPXn | Compare With Xn (n = 0, 1, ...7) |
| CWL | Compare With Limits |
| CMG | Compare With Magnitude |
| CMK | Compare Masked |
| SZN | Set Zero Negative Indicators from Memory |
| SZNC | Set Zero Negative Indicator from Storage and Clear |
| CANA | Comparative AND With A |
| CANQ | Comparative AND With Q |
| CANAQ | Comparative AND With AQ |
| CANXn | Comparative AND With Xn (n = 0, 1, ...7) |
| CNAA | Comparative NOT With A |
| CNAQ | Comparative NOT With Q |
| CNAAQ | Comparative NOT With AQ |
| CNAXn | Comparative NOT With Xn (n = 0, 1, ...7) |

FLOATING POINT

| | |
|---|---|
| FLD | Floating Load |
| DFLD | Double Precision Floating Load |
| LDE | Load Exponent Register |
| FST | Floating Store |
| DFST | Double Precision Floating Store |
| STE | Store Exponent Register |
| FSTR | Floating Store Rounded |
| DFSTR | Double Precision Floating Store Rounded |
| FAD | Floating Add |
| UFA | Unnormalized Floating Add |
| DFAD | Double Precision Floating Add |
| DUFA | Double Precision Unnormalized Floating Add |
| ADE | Add to Exponent Register |
| FSB | Floating Subtract |
| UFS | Unnormalized Floating Subtract |
| DFSB | Double Precision Floating Subtract |
| DUFS | Double Precision Unnormalized Floating Subtract |
| FMP | Floating Multiply |

| | |
|---|---|
| UFM | Unnormalized Floating Multiply |
| DFMP | Double Precision Floating Multiply |
| DUFM | Double Precision Unnormalized Floating Multiply |
| FDV | Floating Divide |
| FDI | Floating Divide Inverted |
| DFDV | Double Precision Floating Divide |
| DFDI | Double Precision Floating Divide Inverted |
| FNEG | Floating Negate |
| FNO | Floating Normalize |
| FRD | Floating Round |
| DFRD | Double Precision Floating Round |
| FCMP | Floating Compare |
| FCMG | Floating Compare Magnitude |
| DFCMP | Double Precision Floating Compare |
| DFCMG | Double Precision Floating Compare Magnitude |
| FSZN | Floating Set Zero and Negative Indicators from Memory |

TRANSFER OF CONTROL

| | |
|---|---|
| TRA | Transfer Unconditionally |
| TSXn | Transfer and Set Index Register |
| TSS | Transfer and Set Slave |
| RET | Return |
| TZE | Transfer on Zero |
| TNZ | Transfer on Not Zero |
| TMI | Transfer on Minus |
| TPL | Transfer on Plus |
| TRC | Transfer on Carry |
| TNC | Transfer On No Carry |
| TOV | Transfer on Overflow |
| TEO | Transfer on Exponent Overflow |
| TEU | Transfer on Exponent Underflow |
| TTF | Transfer on Tally Runout Indicator OFF |
| TTN | Transfer on Tally Runout Indicator ON |
| TPNZ | Transfer on Plus and Nonzero |
| TMOZ | Transfer on Minus or Zero |
| TRTN | Transfer on Truncation Indicator ON |
| TRTF | Transfer on Truncation Indicator OFF |

MISCELLANEOUS

| | |
|---|---|
| NOP | No Operation |
| BCD | Binary To Binary-Coded-Decimal |
| GTB | Gray to Binary |
| XEC | Execute |
| XED | Execute Double |
| MME | Master Mode Entry |
| DRL | Derail |
| RPT | Repeat |
| RPD | Repeat Double |
| RPL | Repeat Link |
| RCCL | Read Calendar Clock |
| SPL | Store Pointers and Lengths |
| LPL | Load Pointers and Lengths |

ADDRESS REGISTER

| | |
|---|---|
| LARn | Load Address Register n |
| LAREG | Load Address Registers |
| SARn | Store Address Register n |
| SAREG | Store Address Registers |
| AWD | Add Word Displacement to Specified AR |
| A9BD | Add 9-bit Character Displacement To Specified AR |
| A6BD | Add 6-bit Character Displacement To Specified AR |
| A4BD | Add 4-bit Character Displacement To Specified AR |
| ABD | Add Bit Displacement to Specified AR |
| SWD | Subtract Word Displacement from Specified AR |
| S9BD | Subtract 9-bit Character Displacement from Specified AR |
| S6BD | Subtract 6-bit Character Displacement from Specified AR |
| S4BD | Subtract 4-bit Character Displacement from Specified AR |
| SBD | Subtract Bit Displacement from Specified AR |
| AARn | Alphanumeric Descriptor to ARn |
| NARn | Numeric Descriptor to ARn |
| ARAn | ARn to Alphanumeric Descriptor |
| ARNn | ARn to Numeric Descriptor |

MASTER MODE

| | |
|---|---|
| DIS | Delay Until Interrupt |
| LBAR | Load Base Address Register |
| LDT | Load Timer Register |
| LLUF | Load Lockup Fault Register |
| SCPR | Replaced with SFR |
| SFR | Store Fault Register |
| LCCL | Load Calendar Clock |
| RIMR | Read Interrupt Mask Register |
| LIMR | Load Interrupt Mask Register |
| RRES | Read Reserved Memory |
| CIOC | Connect I/O Channel |

EXTENDED MEMORY

| | |
|---|---|
| LBER | Load Base Extension Register |
| LMBA | Load Master Bar A |
| LMBB | Load Master Bar B |
| SBER | Store Base Extension Register |
| SMBA | Store Master Bar A |
| AMBB | Store Master Bar B |
| MLDA | Master Load A |
| MLDQ | Master Load Q |
| MLDAQ | Master Load AQ |
| MSTA | Master Store A |
| MSTQ | Master Store Q |
| MSTAQ | Master Store AQ |
| RPN | Read Processor Number |
| HALT | Halt |

MULTIWORD INSTRUCTIONS
ALPHANUMERIC

| | |
|---|---|
| MLR | Move Alphanumeric Left to Right |
| MRL | Move Alphanumeric Right to Left |
| MVT | Move Alphanumeric With Translation |
| CMPC | Compare Alphanumeric Character String |
| SCD | Scan Character Double |
| SCDR | Scan Character Double in Reverse |
| TCT | Test Character and Translate |
| TCTR | Test Character and Translate in Reserve |
| SCM | Scan With Mask |
| SCMR | Scan With Mask in Reserve |

NUMERIC

| | |
|---|---|
| MVN | Move Numeric |
| CMPN | Compare Numeric |
| AD3D | Add Using three Decimal Operands |
| AD2D | Add Using two Decimal Operands |
| SB3D | Subtract Using 3 Decimal Operands |
| SB2D | Subtract Using 2 Decimal Operands |
| MP3D | Multiply Using 3 Decimal Operands |
| MP2D | Multiply Using 2 Decimal Operands |
| DV3D | Divide Using 3 Decimal Operands |
| DV2D | Divide Using 2 Decimal Operands |

BIT STRING

| | |
|---|---|
| CSL | Combine Bit Strings Left |
| CSR | Combine Bit Strings Right |
| SZTL | Set Zero and Truncation Indicator with Bit Strings Left |
| SZTR | Set Zero and Truncation Indicator with Bit Strings Right |
| CMPB | Compare Bit Strings |

CONVERSION

| | |
|---|---|
| DTB | Decimal to Binary Convert |
| BTD | Binary to Decimal Convert |

EDIT MOVE

| | |
|---|---|
| MVE | Move Alphanumeric Edited |
| MVNE | Move Numeric Edited |

MULTIWORD

| | |
|---|---|
| CMPCT | Compare Characters and Translate |
| MTR | Move to Register |
| MTM | Move to Memory |
| MVNX | Move Numeric Extended |
| CMPNX | Compare Numeric Extended |
| AD3DX | Add Using three Decimal Operands Extended |
| AD2DX | Add Using two Decimal Operands Extended |
| SB3DX | Subtract Using 3 Decimal Operands Extended |
| SB2DX | Subtract Using 2 Decimal Operands Extended |
| MP3DX | Multiply Using 3 Decimal Operands Extended |

-continued

| | |
|---|---|
| MP2DX | Multiply Using 2 Decimal Operands Extended |
| DV3DX | Divide Using 3 Decimal Operands Extended |
| DV2DX | Divide Using 2 Decimal Operands Extended |
| MVNEX | Move Numeric Edited Extended |

VIRTUAL MEMORY MANAGEMENT
PRIVILEGED INSTRUCTIONS

| | |
|---|---|
| LDWS | Load Working Space Registers |
| STWS | Store Working Space Registers |
| LDSS | Load Safe Store Register |
| STSS | Store Safe Store Register |
| LDAS | Load Argument Stack Register |
| LDPS | Load Parameter Stack Register |
| LPDBR | Load Page Table Directory Base Register |
| SPDBR | Store Page Table Directory Base Register |
| LDDSD | Load Data Stack Descriptor Register |
| STDSD | Store Data Stack Descriptor Register |
| LDDSA | Load Data Stack Address Register |
| STDSA | Store Data Stack Address Register |
| CAMP | Clear Associative Memory Paged |
| CCAC | Clear Cache |
| EPAT | Effective Address and Pointer to Test |

ALL MODE INSTRUCTIONS

| | |
|---|---|
| LDφ | Load Option Register |
| STφ | Store Option Register |
| STPS | Store Parameter Stack Register |
| STAS | Store Argument Stack Register |
| PAS | POP Argument Strck |
| LDDn | Load Descriptor (Register) n |
| SDRn | Store Descriptor Register n |
| STPn | Store Pointer n |
| LDPn | Load Pointer (Register) n |
| STDn | Store Descriptor Register n |
| EPPRn | Effective Pointer to Pointer (Register) n |
| LDEAn | Load Extended Address n |
| CLIMB | Domain Transfer |

It will be appreciated that many modifications may be made to the preferred embodiment of the present invention without departing from its teachings.

While in accordance with the provisions and statutes there has been illustrated and described the best form of the invention known, certain changes may be made to the system described without departing from the spirit of the invention as set forth in the appended claims and, in some cases, certain features of the invention may be used to advantage without a corresponding use of other features.

What is claimed is:

1. A cache unit for use with a data processing unit for providing fast access to instructions and data fetched from a main store coupled to said cache unit in response to memory commands received from said data processing unit, each command including a command code and an address, said cache unit comprising:

a register for storing a memory command received from said processing unit for forwarding to said main store;

a buffer store including a plurality of addressable word locations arranged into a plurality of sets of blocks of word locations, each set and each block being defined by a set address and a block address respectively;

a data directory having a plurality of locations corresponding in number to the number of sets in said buffer store and being addressable by said set addresses, each location of said data directory storing block addresses of blocks of words within the associated set stored in said buffer store, said data directory responsive to said set address corresponding to a low order portion of said command address to read out said block addresses corresponding to a high order portion of said command address;

a control directory having a plurality of locations corresponding in number to said number of sets and being addressable by a set address, each location of said control directory including a number of control bits for indicating pending operations;

comparison means coupled to said data directory for comparing said block addresses read from said data directory with the high order portion of said command address and generating match-no match detection signals indicative of whether or not the data being requested is stored in said buffer store;

detection circuit means coupled to said comparison means and to said control directory, said detection circuit means for generating a cache hit-miss detection signal indicative of whether or not the cache unit is required to fetch the requested data from said main store; and, control means coupled to said register, said buffer store, said data directory, said control directory and to said detection circuit means, said control means when conditioned by a cache miss detection signal generated in response to a memory read command loaded into said register being operative to generate signals for switching to a first state a predetermined one of said number of control bits corresponding to the specified block and for writing the command block address into the associated data directory location, said predetermined one of said control bits when in said first state indicating that an operation involving a transfer of the requested data is pending, said control means being inhibited upon the read out of said predetermined one of said control bits in response to a subsequent memory command from issuing said subsequent command to said main store for the same data for reexecuting said subsequent command upon completion of said operation.

2. The cache unit of claim 1 wherein said control means includes a first plurality of bistable elements operatively coupled to said register, said control directory, said data directory and to said processing unit control means, said first plurality of bistable elements generating said signals including a turn off signal for inhibiting said processing unit control means from generating further memory commands to prevent interference between commands.

3. The cache unit of claim 1 wherein said cache unit control means includes means operative in response to said memory command to generate signals for forwarding said memory command stored in said register to said main store upon the occurrence of said miss detection signal and said means being inhibited by said predetermined one of said control bits read out in response to a memory command to generate signals for forwarding said memory command to said main store.

4. The cache unit of claim 3 wherein said cache control means further includes a second number of bistable elements operatively coupled to said buffer store, said first number of bistable elements in response to signals from said main store indicating a data transfer being operative to generate signals for writing previously requested data received from said main store into said buffer store at the address specified by said memory command whose operation is outstanding.

5. The cache unit of claim 4 wherein said second number of bistable elements generate signals for switching said predetermined one of said control bits from said first state to said second state upon receiving said signals from said main store indicating the completion of said data transfer.

6. The cache unit of claim 5 further including a buffer for storing outstanding read commands received from said processing unit, said cache control means further including a third number of bistable elements, said third number of bistable elements coupled to said buffer, said control directory, said data directory and to said buffer store, said second number of bistable elements upon the completion of said data transfer operation generating a predetermined sequence of control signals for reexecuting each memory read command stored in said buffer awaiting the completion of said pending operation.

7. The cache unit of claim 4 wherein said first number of bistable elements generate signals for transferring the requested data to said processing unit and for switching one of said bistable elements to a reset state for enabling said processing unit control means to generate further memory commands.

8. The cache unit of claim 1 wherein each control directory location further includes a corresponding number of full/empty status bits for indicating the full and validity status of the set associated therewith, said control directory including a control bit updating network coupled to said control directory and to said cache control means, said control bit updating network being conditioned by said signals to switch corresponding ones of said full/ empty status bit and said predetermined one of said control bits to said first states coincident with the writing of said block address into said data directory.

9. The cache unit of claim 8 wherein each control directory location further includes a plurality of count bits and wherein each set includes a plurality of blocks, each data directory and each control directory location storing the block addresses and status information respectively for each of said plurality of blocks, said comparison means including a plurality of comparator circuits corresponding in number to said number of blocks, each comparator circuit being connected to receive said high order portion of said command address for comparison with a corresponding one of the block addresses of said plurality of blocks read out from the data directory location addressed by said low address portion of said command and each comparator circuit comparing the block specified by said count bits of the corresponding control location generating said match-no match signal for conditioning said detection circuit means.

10. The cache unit of claim 9 wherein said data processing unit includes control means for generating signals including said memory commands and associated cache commands, said command code of each memory read command being coded to specify main memory quad operation for fetching a block of data words and said associated cache command being coded to specify the operation to be performed by said cache unit, and said cache control means including decoder means operative in response to said associated cache command to switch said predetermined one of said control bits as a function of said cache command as follows:
SET=INST-F2 (BYP-CAC+CAC-MISS)+L-DQUAD (BYP-CAC+CAC-MISS)+PRE-READ $(\overline{BYP-CAC}\cdot CAC\text{-}MISS)+$READ-SINGLE·CAC-MISS+READ-DBL·$\overline{BYP\text{-}CAC}$·CAC-MISS.

11. The cache unit of claim 10 wherein said control directory includes an updating network coupled to a number of bistable registers for storing signals indicating which one of said number of control bits corresponding to the block of said set has a pending operation, said updating network being conditioned by said cache control means upon receipt of all of the data words of said block to reset said one control bit as a function of said cache command as follows: RESET=INST-F2+LDQUAD+PRE-READ+RD-SGL+RD-DBL·$\overline{BYP\text{-}CAC}$.

12. The cache unit of claim 1 further including diagnostic apparatus operatively coupled to said control directory, said data directory and to said buffer store, said diagnostic apparatus including:
logic switching connected to receive signals representative of the contents of said control directory location and the address contents of said data directory location read out in response to said set address; and,
decode circuit means coupled to said logic switching means, said decode circuit means being operative to decode command signals for conditioning said logic switching means to transfer selected ones of said signals to a source for subsequent examination for locating faults within said cache unit and said processing unit.

13. A data processing system comprising:
a processing unit for processing instructions, said processing unit being coupled to a cache unit for transferring and receiving information to and from said cache unit and said processing unit including:
control means for generating signals including memory commands and associated cache commands required for the execution of said instructions;
a main store including a plurality of word locations for storing data and instructions, said plurality of word locations being arranged into a plurality of sets of blocks of word locations, each set being defined by a set address and each block being identified by a block address;
said cache unit operatively coupled to said main store for providing to said processing unit immediate access to said data and instructions fetched from said main store, said cache unit including:
a command buffer for storing said memory commands received from said processing unit, said command signals including a command code and an address;
a buffer store including a plurality of addressable word locations arranged into a plurality of sets of blocks of word locations defined by said set addresses and block addresses;
an addressable data directory having a plurality of locations corresponding in number to the number of sets in said buffer store and being addressable by said set addresses, each location of said data directory storing block addresses of blocks of words within the associated set stored in said buffer store, said data directory responsive to said set address corresponding to the low order portion of said command address to read out said block addresses corresponding to the high order portion of said command address;
a control directory having a plurality of locations corresponding in number to said number of sets and being addressable by a set address, each location of said control directory including a number of control bits for indicating pending operations;

comparison means coupled to said data directory for comparing said block addresses read from said data directory with the high order portion of said command address and generating match-no match detection signals indicative of whether or not the data being requested is stored in said buffer store;

detection circuit means coupled to said comparison means and to said control directory, said detection circuit means for generating a cache hit-miss detection signal indicative of whether or not the cache unit is required to fetch the requested data from said main store; and, control means coupled to said command buffer, said buffer store, said data directory, said control directory and to said detection circuit means, said control means when conditioned by a cache miss detection signal generated in response to a memory read command loaded into said register being operative to generate signals for switching to a first state a predetermined one of said number of control bits corresponding to the specified block and for writing the command block address into the associated data directory location, said predetermined one of said control bits when in said first state indicating that an operation involving a transfer of the requested data is pending, said control means being inhibited upon the read out of said predetermined one of said control bits in response to a subsequent memory command from issuing said subsequent command to said main store for the same data for reexecuting said subsequent command upon completion of said operation.

14. The cache unit of claim 13 wherein said cache control means includes a first plurality of bistable elements operatively coupled to said register, said control directory, said data directory and to said processing unit control means, said first plurality of bistable elements generating said signals including a turn off signal for inhibiting said processing unit control means from generating further commands to prevent interference between commands.

15. The cache unit of claim 13 wherein said cache unit control means includes means operative in response to said memory command to generate signals for forwarding said memory command stored in said output register to said main store upon the occurrence of said miss detection signal and said means being inhibited by said predetermined one of said control bits read out in response to a memory command to generate signals for forwarding said memory command to said main store.

16. The cache unit of claim 15 wherein said cache control means further includes a second number of bistable elements operatively coupled to said buffer store, said first number of bistable elements in response to signals from said main store indicating a data transfer being operative to generate signals for writing previously requested data received from said main store into said buffer store at the address specified by said memory command whose operation is outstanding.

17. The cache unit of claim 16 wherein said second number of bistable elements generate signals for switching said predetermined one of said control bits from said first state to said second state upon receiving said signals from said main store indicating the completion of said data transfer.

18. The cache unit of claim 17 further including a third number of bistable elements, said third number of bistable elements coupled to said buffer, said control directory, said data directory and to said buffer store, said second number of bistable elements upon the completion of said data transfer operation generating a predetermined sequence of control signals for reexecuting each memory read command stored in said command buffer awaiting the completion of said pending operation.

19. The cache unit of claim 16 wherein said first number of bistable elements generate signals for transferring the requested data to said processing unit and for switching one of said bistable elements to a reset state for enabling said processing unit control means to generate further memory commands.

20. The cache unit of claim 13 wherein each control directory locations further includes a corresponding number of full/empty status bits for indicating the full and validity status of the set associated therewith, said control directory including a control bit updating network coupled to said control directory and to said cache control means, said control bit updating network being conditioned by said signals to switch corresponding ones of said full/empty status bit and said predetermined one of said control bits to said first states coincident with the writing of said block address into said data directory.

21. The cache unit of claim 13 wherein said data processing unit control means for generating signals including said memory commands and associated cache commands, said command code of each memory read command being coded to specify main memory quad operation for fetching a block of data words and said associated cache command being coded to specify the operation to be performed by said cache unit, and said cache control means including decoder means operative in response to said associated cache command to switch said predetermined one of said control bits as a function of said cache command as follows:

SET = INST-F2(BYP-CAC+CAC-MISS)+L-DQUAD $\overline{(BYP-CAC+CAC-MISS)}$+PRE-READ $(\overline{BYP-CAC}\cdot CAC-MISS)$+READ-SINGLE·CAC-MISS+READ-DBL·BYP-CAC·CAC-MISS.

22. The cache unit of claim 21 wherein said control directory includes an updating network coupled to a number of bistable registers for storing signals indicating which one of said number of control bits corresponding to the block of said set has a pending operation, said updating network being conditioned by said cache control means upon receipt of all of the data words of said block to reset said one control bit as a function of said cache command as follows:

RESET = INST-F2+LDQUAD+PRE-READ+RD-SGL+RD-DBL·$\overline{BYP-CAC}$.

23. The cache unit of claim 13 further including diagnostic apparatus operatively coupled to said control directory, said data directory and to said buffer store, said diagnostic apparatus including:

logic switching connected to receive signals representative of the contents of said control directory location and the address contents of said data directory location read out in response to said set address; and, decode circuit means coupled to said logic switching means, said decode circuit means being operative to decode command signals for conditioning said logic switching means to transfer selected ones of said signals to a source for subsequent examination for locating faults within said cache unit and said processing unit.

24. A cache unit for use with a data processing unit for providing fast access to instructions and data fetched from a main store coupled to said cache unit in response to memory commands received from said data processing unit, each command including a command code and an address, said cache unit comprising:

a register for storing a memory command received from said processing unit for forwarding to said main store;

a buffer store including a plurality of addressable word locations arranged into a plurality of sets of blocks of word locations, each set and each block being defined by a set address and a block address respectively;

a directory comprising a plurality of sections including:

a data directory section having a plurality of locations corresponding in number to the number of sets in said buffer store and being addressable by said set addresses, each location of said data directory storing block addresses of blocks of words within the associated set stored in said buffer store, said data directory section responsive to said set address corresponding to a low order portion of said command address to read out said block addresses corresponding to a high order portion of said command address; and, a control directory section including a number of subsections, each having a plurality of locations corresponding in number to said number of sets and being addressable by a set address, each location of one of said subsections including a number of control bits for indicating pending operations;

comparison means coupled to said data directory for comparing said block addresses read from said data directory with the high order portion of said command address and generating match-no match detection signals indicative of whether or not the data being requested is stored in said buffer store, said comparison means including:

detection circuit means coupled to receive said match-no match signals and to said control directory section, said detection circuit means for generating a cache hit-miss detection signal indicative of whether or not the cache unit is required to fetch the requested data from said main store; and, control means coupled to said register, said buffer store, said directory and to said detection circuit means, said control means when conditioned by a cache miss detection signal generated in response to a memory read command loaded into said register being operative to generate signals for switching a predetermined one of said number of control bits to a first state and for writing the command block address into the associated data directory section location, said predetermined one of said control bits when in said first state indicating the presence of a pending operation, said control means upon the read out of said predetermined one of said control bits in response to a subsequent memory command being inhibited from issuing said subsequent command to said main store for the same data for reexecuting said subsequent command upon completion of said operation.

25. The cache unit of claim 24 wherein said control means includes a first plurality of bistable elements operatively coupled to said register, said directory and to said processing unit control means, said first plurality of bistable elements generating said signals including a turn off signal for inhibiting said processing unit from generating further memory commands to prevent interference between commands.

26. The cache unit of claim 24 wherein said cache unit control means includes means operative in response to said memory command to generate signals for forwarding said memory command stored in said register to said main store upon the occurrence of said miss detection signal and said means being inhibited by said predetermined one of said control bits read out in response to a memory command to generate signals for forwarding said memory command to said main store.

27. The cache unit of claim 26 wherein said cache control means further includes a second number of bistable elements operatively coupled to said buffer store, said first number of bistable elements in response to signals from said main store indicating a data transfer being operative to generate signals for writing previously requested data received from said main store into said buffer store at the address specified by said memory command whose operation is outstanding.

28. The cache unit of claim 27 wherein said second number of bistable elements generate signals for switching said predetermined one of said control bits from said first state to said second state upon receiving said signals from said main store indicating the completion of said data transfer.

29. The cache unit of claim 28 further including a buffer for storing outstanding read commands received from said processing unit, said cache control means further including a third number of bistable elements, said third number of bistable elements coupled to said buffer, said directory, and to said buffer store, said second number of bistable elements upon the completion of said data transfer operation generating a predetermined sequence of control signals for reexecuting each memory read command stored in said buffer awaiting the completion of said pending operation.

30. The cache unit of claim 27 wherein said first number of bistable elements generate signals for transferring the requested data to said processing unit and for switching one of said bistable elements to a reset state for enabling said processing unit control means to generate further memory commands.

31. The cache unit of claim 24 further including diagnostic apparatus operatively coupled to said directory and to said buffer store, said diagnostic apparatus including:

logic switching connected to receive signals representative of the contents of said control directory and data directory section locations read out in response to said set address; and, decode circuits means coupled to said logic switching means, said decode circuit means being operative to decode command signals for conditioning said logic switching means to transfer selected ones of said signals to a source for subsequent examination for locating faults within said cache unit and said processing unit.

* * * * *